(12) United States Patent
Ciolfi et al.

(10) Patent No.: US 7,809,545 B2
(45) Date of Patent: Oct. 5, 2010

(54) SYSTEM AND METHOD FOR USING EXECUTION CONTEXTS IN BLOCK DIAGRAM MODELING

(75) Inventors: John Edward Ciolfi, Wellesley, MA (US); Ramamurthy Mani, Needham, MA (US); Donald Paul Orofino, Sudbury, MA (US); Mojdeh Shakeri, Southborough, MA (US); Marc Ullman, Framingham, MA (US); Murali Yeddanapudi, Watertown, MA (US)

(73) Assignee: The MathWorks, Inc., Natick, MA (US)

( * ) Notice: Subject to any disclaimer, the term of this patent is extended or adjusted under 35 U.S.C. 154(b) by 1169 days.

(21) Appl. No.: 10/414,644

(22) Filed: Apr. 16, 2003

(65) Prior Publication Data

US 2004/0210592 A1 Oct. 21, 2004

(51) Int. Cl.
G06F 9/45 (2006.01)
G06F 9/44 (2006.01)
G06F 9/06 (2006.01)
G06F 9/00 (2006.01)

(52) U.S. Cl. .................. 703/22; 717/105; 717/106; 717/107; 717/108; 717/109

(58) Field of Classification Search ............... 703/19, 703/22; 717/105–109
See application file for complete search history.

(56) References Cited

U.S. PATENT DOCUMENTS 5,363,320 A 11/1994 Boyle et al.
5,821,934 A * 10/1998 Kodosky et al. ............ 715/763
6,820,042 B1 * 11/2004 Cohen et al. ................. 703/2
7,047,176 B2 * 5/2006 Klevans et al. ............ 703/21
7,139,692 B2 * 11/2006 Cohen et al. .............. 703/21

OTHER PUBLICATIONS

The Mathworks, "Simulink, model-based and system-based design", Using Simulink, Version 5, Jul. 2002, 50 pgs -Chapter 2 only.*
Deng et al., "Model-checking Middleware-based Event-drive Real-time Embedded Software", Nov. 2002, pp. 1-26.*
The Mathworks, Using Simulink, Version 5, Jul. 2002, 476 pages.*
The MathWorks, "Simulink, Model-Based and System-Based Design," The MathWorks, Inc., Version 5 (2002).
Deng, William, et al., "Model-checking Middleware-based Event-driven Real-time Embedded Software," http://projects.cis.ksu.edu/docman/view.php/8/20/SAnToS-TR2003-2.pdf (2002).

(Continued)

Primary Examiner—Kamini S Shah
Assistant Examiner—Suzanne Lo
(74) Attorney, Agent, or Firm—Lahive & Cockfield, LLP; Kevin J. Canning; John S. Curran

(57) ABSTRACT

A method of controlling the conditional execution of elements and subsystems in a block diagram is disclosed. Data structures known as Execution Contexts are created and associated with individual block diagram elements and subsystems. The Execution Contexts allow execution of the associated element or subsystem upon satisfaction of a specified pre-condition. The Execution Contexts may be inherited by other elements and subsystems in the block diagram and propagated programmatically throughout the block diagram. The use of the Execution Contexts allows for efficient code generation and block diagram execution, as well as supporting modular design concepts.

35 Claims, 35 Drawing Sheets

OTHER PUBLICATIONS de Niz, Dionisio, et al., "Geodesic-A Reusable Component Framework for Embedded Real-Time Systems," http://www-2.cs.cmu.edu/(dionisio/personal-publications.html (2002).

Jamal, Von Rahman, et al., "Zeitkritische Regelungen unter LabVIEW, Das inverse Pendel unter der regelungstechnischen Lupe," *Elektronik*, vol. 50(18):86, 89-94 (2001).

Klinger, Motti, "Reusable Test Executive and Test Programs Methodology and Implementation Comparison Between HP VEE and Labview," *IEEE Systems Readiness Technology Conference*, pp. 305-312 (1999).

* cited by examiner

Sorted List:

0:0 Sine Wave 1
0:1 Sine Wave 2
0:2 Function-Call Generator
0:3 Function-Call Subsystem
0:4 Integrator
0:5 Gain (algebraic id 0#1)
0:6 Sum (algebraic variable for id 0#1)
0:7 Out1

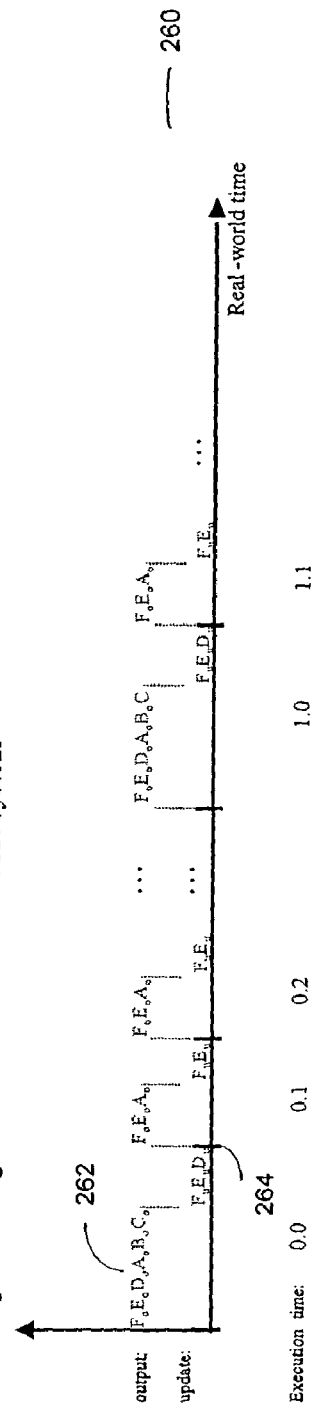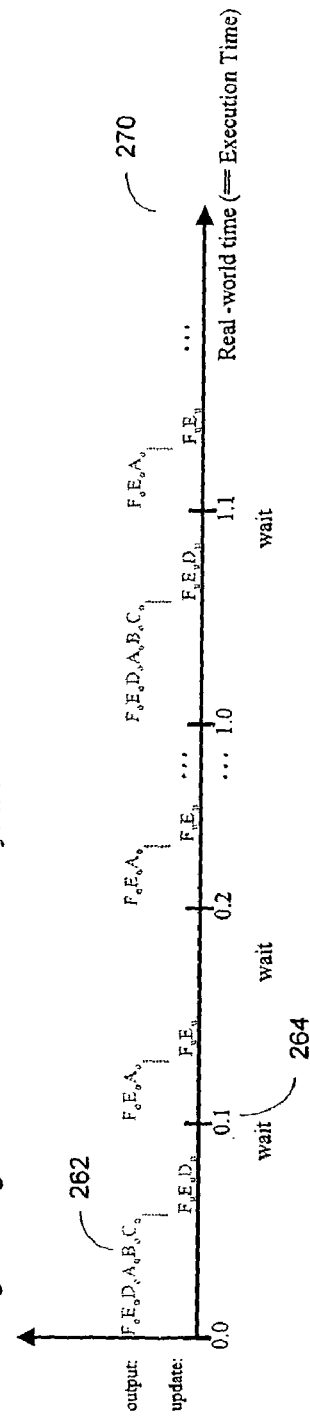
Figure 11B

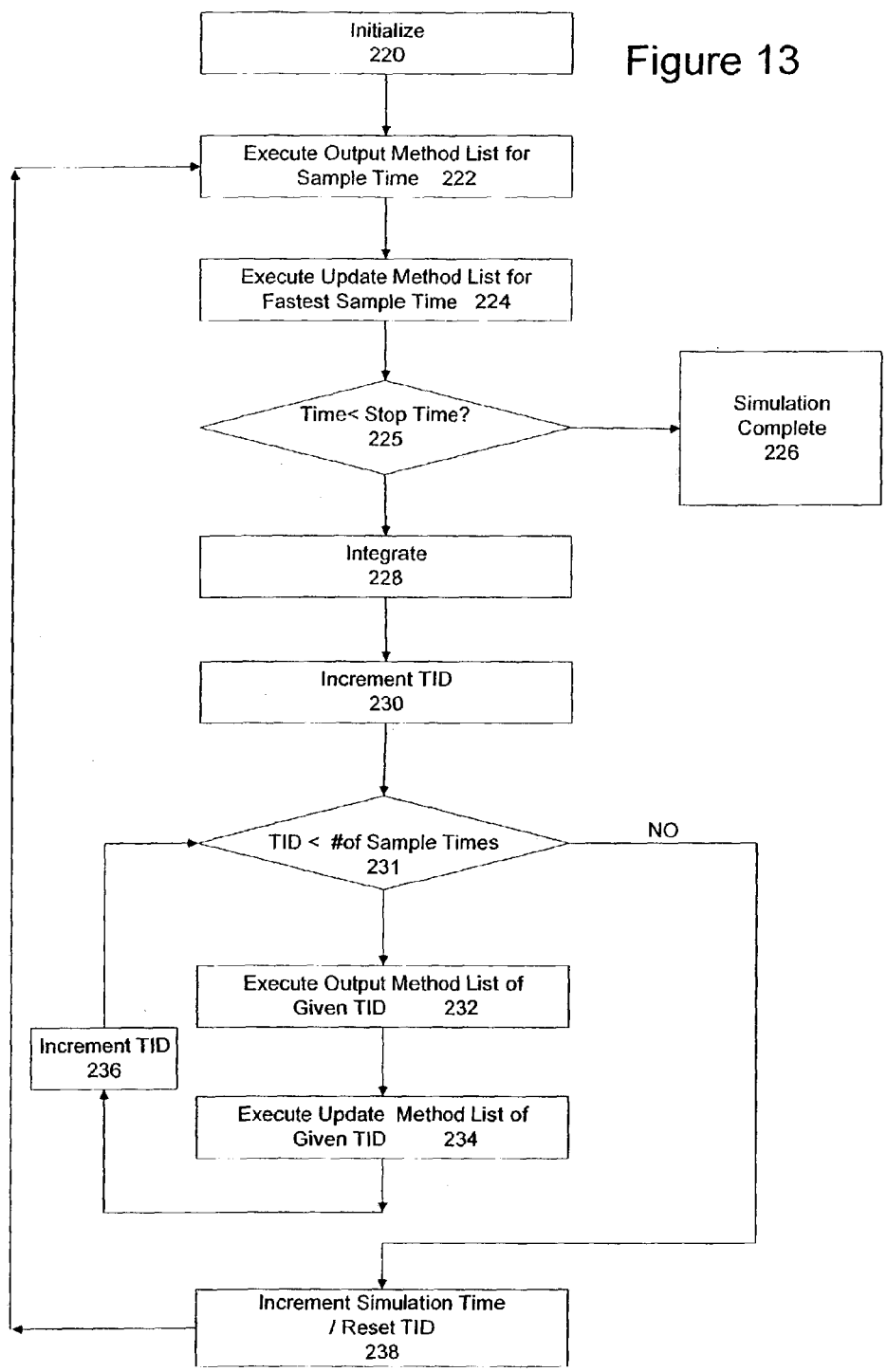

SYSTEM AND METHOD FOR USING EXECUTION CONTEXTS IN BLOCK DIAGRAM MODELING

FIELD OF THE INVENTION

The illustrative embodiment of the present invention relates generally to block diagram modeling and more particularly to block diagram modeling using Execution Contexts, a data structure associated with blocks and subsystems of blocks which provides fine-grained control over the execution of the associated elements based on the satisfaction of a pre-condition.

BACKGROUND

Various classes of block diagrams describe computations that can be performed on application specific computational hardware, such as a computer, microcontroller, FPGA, and custom hardware. Classes of such block diagrams include time-based block diagrams, such as those found within Simulink® from the MathWorks, Inc., of Natick, Mass., state-based and flow diagrams, such as those found within Stateflow® from the MathWorks, Inc., of Natick, Mass., and data-flow diagrams. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages such as Simulink® from The MathWorks, Inc. of Natick, Mass. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

Unfortunately, the execution of conventional block diagram elements is highly dependent upon sample times (sample rates) of other elements in the block diagram. The sample-time is the time interval at which the inputs, state, or outputs (collectively referred to as the results) of the system are traced as time progresses. For elements which should only be conditionally executed this leads to inaccurate and inefficient results. Where conditional execution of elements by group in a subsystem is available, it requires the grouping of other non-subsystem elements with the subsystem in order to control execution times. The forced inclusion of elements within a subsystem results in non-modular designs that discourage the use of multiple programming design groups.

BRIEF SUMMARY

The illustrative embodiment of the present invention provides a method of controlling the conditional execution of elements and subsystems in a block diagram. Data structures known as Execution Contexts are created and associated with individual block diagram elements and/or subsystems. The Execution Contexts allow execution of the associated element or subsystem upon satisfaction of a specified pre-condition. The Execution Contexts may be inherited by other elements and subsystems in the block diagram and propagated programmatically throughout the block diagram. The use of the Execution Contexts allows for efficient code generation and block diagram execution, as well as supporting modular design concepts.

In one embodiment in a time-based block diagram environment, data structures known as Execution Contexts are created and associated with at least one element of a time-based block diagram. The Execution Context controls execution of the associated element based upon the satisfaction of a pre-condition. An element capable of inheriting the execution context is identified, and the Execution Context is propagated programmatically and associated with the inheriting element. The elements associated with the pre-condition are executed upon fulfillment of the pre-condition.

In another embodiment in a time-based block diagram environment, an Execution Context is created and associated with a subsystem of a time-based block diagram. The Execution Context controls execution of the associated subsystem based upon the satisfaction of a pre-condition. The subsystem is executed after satisfaction of the pre-condition indicated by the Execution context.

In an embodiment in a block diagram environment, data structures known as Execution Contexts are created and associated with at least one element of a block diagram. The Execution Context controls execution of the associated element based upon the satisfaction of a pre-condition. An element capable of inheriting the execution context is identified, and the Execution Context is propagated programmatically and associated with the inheriting element. The elements associated with the pre-condition are executed upon fulfillment of the pre-condition.

BRIEF SUMMARY OF THE DRAWINGS

FIG. 11B depicts the execution timing of block diagrams in single task mode in timelines synchronized and non-synchronized with real world time;

FIG. 13 is a flowchart of the overall sequence of steps taken by Simulink in multi-task mode;

DETAILED DESCRIPTION

The illustrative embodiment of the present invention provides fine-grained control of the conditional execution of elements and subsystems in a block diagram. The use of inheritable contexts allowing execution of associated element(s) or subsystems upon satisfaction of a specified precondition promotes modular design and execution efficiency. The ability to inherit the contexts also allows for the modeling of systems by geographically separated design groups exercising modular design concepts.

Dynamic systems are typically modeled as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

Figure 1:
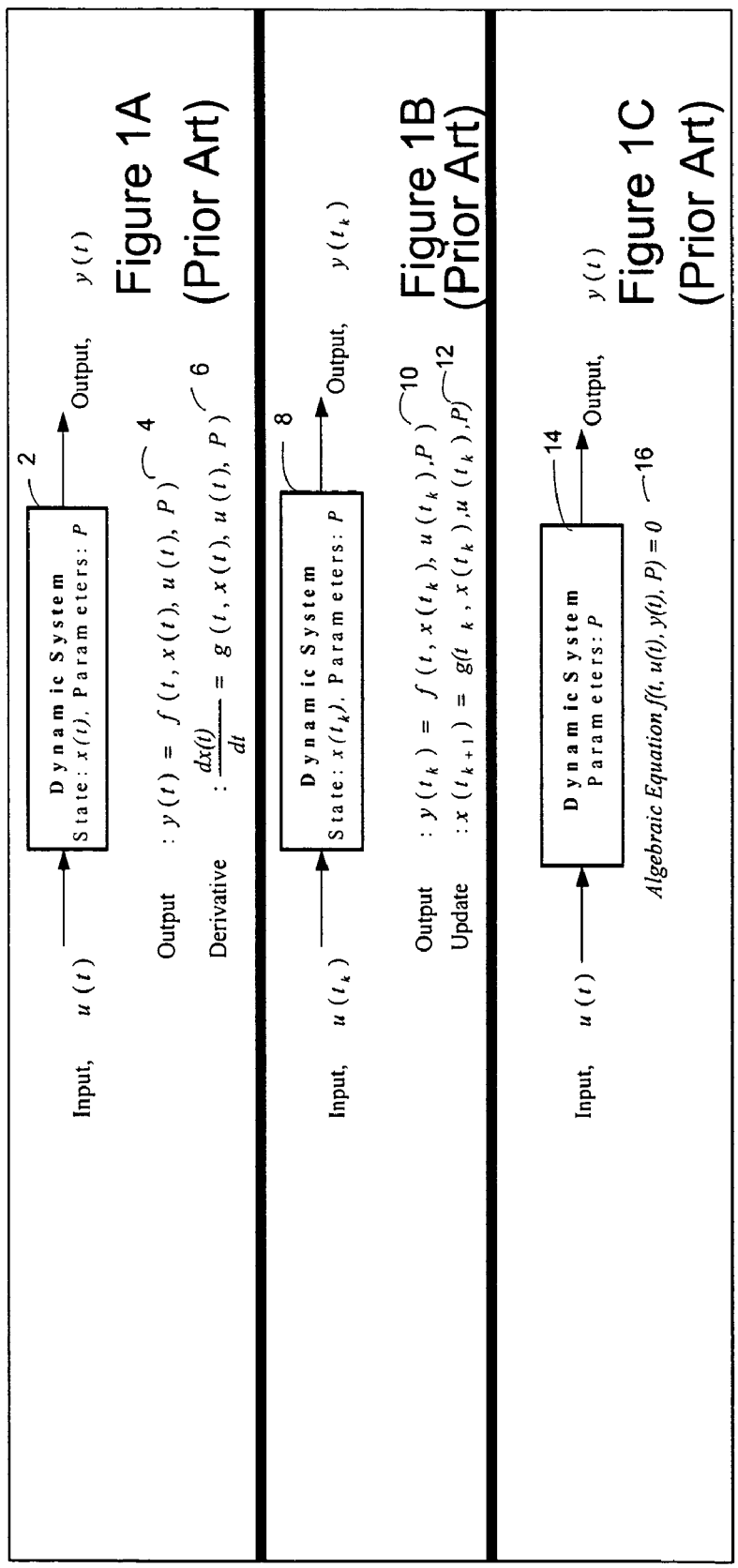
FIG. 1A depicts a dynamic system described with ordinary differential equations (ODE)
FIG. 1B depicts a dynamic system described with difference equations.
FIG. 1C depicts a dynamic system described with algebraic equations.

There are four common types of mathematical models used in the study of dynamic systems. The first type of mathematical model describes systems using ordinary differential equations (ODEs) and is depicted in FIG. 1A. The dynamic system 2 specifies a set of two equations: Output 4 and Derivative 6. The Output equation 4 facilitates the computation of the system's output response at a given time instant as a function of its inputs, states, parameters, and time. The Derivative equation 6 is an ordinary differential equation that allows the computation of the derivative of the states at the current time as a function of the inputs, the states, parameters, and time. This class of models is suitable for systems in which it is important to track the system response as a continuous function of time. Such continuous-time systems are commonly representative of physical systems (mechanical, thermal, electrical). For simple systems, it may be possible to use the Output 4 and Derivative equations 6 to obtain a closed-form solution for the output response y(t). But in most complex real world systems, the response of the system is obtained by integrating the states through numerical means.

The definition of an ODE used herein encompasses both implicit and explicit differential equations. The class of ordinary differential equations may require additional equations to define the system being modeled. For example, equations called projections may be required to impose constraints on the differential variables (e.g., states $X_1$ and $X_2$ must fall on the manifold defined by $X_1^2 + X_2^2 = 25$). These constraints can be either applied as a secondary condition or a coupled condition to the differential equation. Although systems including the projections may conventionally no longer qualify as an ODE; they are included here to simplify the categories of systems. Another example is the use of a Jacobian equation that defines partial derivatives with respect to the independent and/or differential variables. The Jacobian equation is typically used when obtaining a linear approximation of a nonlinear model or an overall linear model of a set of equations. Jacobian equations are required for some forms of numerical integration, for producing the linear model once the model has reached its steady state operating point, etc. The Output 4 and Derivatives equations 6 may be extended to define other relationships for the block. For example, the Output equation 4 may help manage its states by defining a relationship where it resets the state back to a known quantity at a specific point in time or when a specific condition is seen.

Another type of mathematical model describes systems using difference equations as depicted in FIG. 1B. The dynamic system 8 specifies a set of two equations: Output 10 and Update 12. The Output equation 10 facilitates the computation of the system's output response at a given time instant as a function of the inputs, states at some previous time, parameters, and time. The Update equation 12 is a difference equation that allows the computation of the states at the current time as a function of the inputs, states at some previous time, parameters, and time. This class of models is suitable for systems in which it is important to track the system response at discrete points in time. Such discrete-time systems are commonly representative of discrete-time control and digital signal processing systems. For simple systems, it may be possible to use the Output 10 and Update equations 12 to obtain a closed-form solution for the output response y(t). But in most complex real world systems, the response of the system is solved through recursion. The Output 10 and Update equations 12 are applied repeatedly to solve for the system response over a period of time.

An additional type of mathematical model describes systems using algebraic equations as depicted in FIG. 1C. The dynamic system 14 uses an algebraic equation 16 that needs to be solved at each time to obtain the outputs. While simple systems may allow one to obtain a closed-form solution for the system inputs and outputs, practical algebraic equations may best be solved iteratively using a numerical method involving both perturbations and iterations. Algebraic equation solving techniques used in the context of dynamic system modeling are discussed in greater detail below.

A fourth type of mathematical model is a composite system that has components that fall into the three types of models discussed above. Most complex real-world system models fall into this category. This class of systems has Output, Derivative, Update, and potentially other equations. Solving for the output response of such systems requires a combination of the solution approaches discussed for all of the classes above. One example of a composite system is one described by differential-algebraic equations (DAEs) which contain both differential equations and algebraic equations. Grouped within the composite class of systems are many extensions involving relationships (equations) defined in terms of both outputs and state. For example, one can define a limited integration relationship for a differential variable. This relationship requires a set of equations that consists of the Output equation, an Update equation, a Derivative equation, and a Zero Crossing equation. The Zero Crossing equation defines the points in time where the upper and lower limits of the limited integration occur. Another example of an extension is the notion of Enable and Disable equations that define relationships among states or signals when parts of a system are activated and deactivated during execution.

Inherent in the four classes of systems (ODE, difference equations, algebraic equations and composite) is the notion of system sample time. The sample-time is the time interval at which the inputs, state, or outputs (collectively referred to as the results) of the system are traced as time progresses. Based on sample times, a system can be described as a discrete-time system, continuous-time system and hybrid system. A discrete-time system is a system in which the evolution of the system results are tracked at finite intervals of time. In the limit as the interval approaches zero, the discrete-time system becomes a continuous-time system. The intervals of time may be periodic or non-periodic. Sometimes, non-periodic rate systems are referred to as non-uniform rate systems meaning that there is no periodic rate at which the response can be tracked Nonunifiorm-rate systems can fall into the class of composite systems where an additional equation (GetTimeOfNextVarHit) defines when in the future the other equations associated with the system should be evaluated. A continuous-time system is a system in which the evolutions of the system results are continuously changing. Continuous-time signals change during numerical integration (minor time steps). An example of a continuous-time system is one described by an ODE. There can also be algebraic or composite continuous-time systems. A hybrid system is a system with both discrete-time and continuous-time elements.

If a system has only one sample time, it is said to be single-rate. If a system has multiple sample times, it is said to be multi-rate. Multi-rate systems can be evaluated (executed) using either a single-tasking form of execution or a multi-tasking form of execution. When multi-tasking execution is used, it conforms to rate monotonic scheduling principals as defined by Liu, C. L., and LAYLAND, J. W. *Scheduling Algorithms for Multiprogramming in a Hard-Real-Time Environment*. ACM 20, 1 (January 1973), 46-61. Systems may also be categorized by the type of numerical integration solver being used. A fixed-step system is one that uses a fixed-step solver. Fixed-step solvers typically use explicit methods to compute the next continuous state at fixed periodic intervals of time. A variable-step system is one that is using a variable-step solver. A variable-step solver can use either implicit or explicit methods to compute the next continuous state at non-periodic intervals of time. Generally, variable-step solvers use a form of error control to adjust the interval size such that the desired error tolerances are achieved.

In practice, except for the most basic systems, mathematical models for dynamic systems involve a complex set of mathematical transformations applied in some prescribed manner with the outputs of some transformations forming the inputs of others. Each elemental transformation may be viewed in isolation as a simple dynamic system falling into one of the categories listed above. Therefore, a complex dynamic system may be modeled as an interconnection of various simple dynamic systems. A schematic representation of such an interconnection that has evolved over the years is the block diagram. Such block diagram models have now become a standard means in textbooks, design papers, journal articles, and specifications to communicate the details of a dynamic system's behavior.

Figure 2:
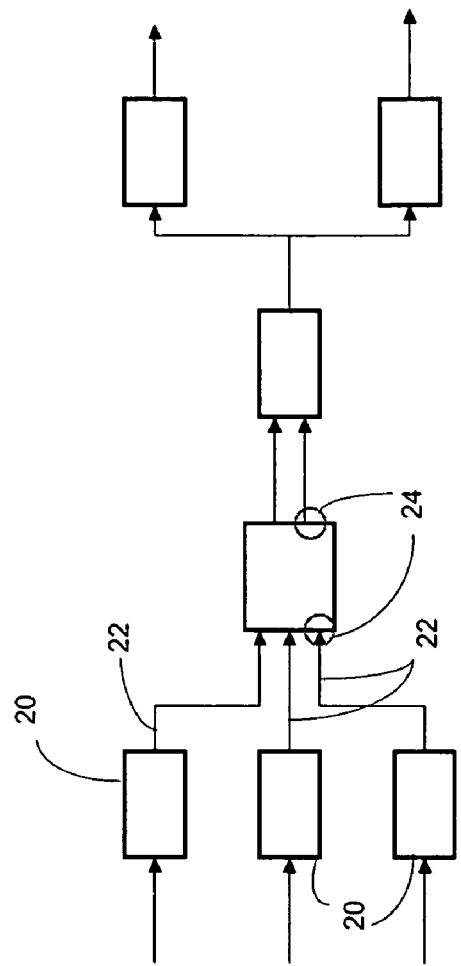
FIG. 2 depicts components of a basic block diagram.

A block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant. The source block of a signal writes to the signal at a given time instant when its system equations are solved. The destination blocks of this signal read from the signal when their system equations are being solved. The basic components of a block diagram are illustrated in FIG. 2. The block diagram includes a plurality of blocks 20, lines 22 and ports 24 that are interconnected. Those skilled in the art will recognize that the term "blocks" does not refer exclusively to elemental dynamic systems but may also include other modeling elements that aid in readability and modularity of block diagrams.

The theory of Digital Signal Processing (DSP) focuses on modeling signals as sequences of samples. This view naturally fits into the time-based block diagram paradigm by mapping the samples u[n] to discrete-time points $u(t_k)$. This adds the benefit of being able to model the interaction between DSP systems and other classes of time-based systems, e.g. continuous and/or discrete-time control systems.

Put another way, block diagram models are time-based relationships between signals and state variables representative of a dynamic system. The solution (computation of system response) of the model is obtained by evaluating these relationships over time, where time starts at a user-specified "start time" and ends at a user-specified "stop time". Each evaluation of these relationships is referred to as a time step. Signals represent quantities that change over time, and these quantities are defined for all points in time between the block diagram's start and stop time. The relationships between signals and state variables are defined by sets of equations represented by blocks. These equations define a relationship between the input signals, output signals, state, and time. Inherent in the definition is the notion of parameters, which are the coefficients of the equations.

It is important to note that block diagrams are not exclusively used for representing time-based dynamic systems but also for other models of computation. For instance, flowcharts are block diagrams used to capture process flow and are not generally suitable for describing dynamic system behavior. Data flow block diagrams are block diagrams that describe a graphical programming paradigm where the availability of data (often thought of as tokens) is used to initiate the execution of blocks, where a block represents an operation and a line represents execution dependency describing the direction of data flowing between blocks. As used herein, the term block diagrams means time-based block diagrams used in the context of dynamic systems except as otherwise noted.

Block diagram modeling has spawned a variety of software products such as Simulink from The Mathworks, Inc. of Natick, Mass., that cater to various aspects of dynamic system analysis and design. Such products allow users to perform various types of tasks including constructing system models through a user-interface that allows drafting block diagram models, allowing augmentation of a pre-defined set of blocks with custom user-specified blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation"). Each of the tasks listed above has many intricate details and subtle variations which are explored further below.

Block modeling software includes a number of generic components. Although the discussion contained herein focuses on Simulink version 5.0 (Release 13) from the MathWorks, Inc. of, Natick Mass., those skilled in the art will recognize that it is applicable to other block modeling software applications. The generic components include a block diagram editor, blocks and a block diagram execution engine. The block diagram editor allows users to perform such actions as draw, edit, annotate, save, and print out block diagram representations of dynamic systems. As noted earlier, blocks are the fundamental mathematical elements of a classic block diagram model. Simulink extends the classic block diagram models by introducing the notion of two classes of blocks, non-virtual blocks and virtual blocks. Non-virtual blocks are elementary dynamic systems. A virtual block is provided for graphical organizational convenience and plays no role in the definition of the system of equations described by the block diagram model. Examples of virtual blocks are the Bus Creator virtual block and Bus Selector virtual block which are used to reduce block diagram clutter by managing groups of signals as a "bundle". Virtual blocks may be used to improve the readability of models. Simulink further extends the meaning of a non-virtual block to include other semantics, such as a "merge" block semantic. The merge block semantic is such that on a given time step its output is equal to the last block to write to an input of the merge block. An additional extension provided by Simulink is the concept of conditional execution. Simulink contains the concept of conditional and iterative subsystems that control when in time block methods execute for a sub-section of the overall block diagram.

A block diagram execution engine contributes to the modeling software task of enabling the computation and tracing of a dynamic system's outputs from its block diagram model. An execution engine carries out the task of compiling and linking the block diagram to produce an "in-memory executable" version of the model that is used for generating code and/or simulating or linearizing a block diagram model. Note that execution of the block-diagram is also referred to as simulation. The compile stage involves checking the integrity and validity of the block interconnections in the block diagram. In this stage, the engine also sorts the blocks in the block diagram into hierarchical lists that are used when creating the block method execution lists. In the link stage, the execution engine uses the result of the compiled stage to allocate memory needed for the execution of the various components of the block diagram. The linking stage also produces block method execution lists which are used by the simulation or linearization of the block diagram. Included within the link stage is the initialization of the model which consists of evaluating "setup" methods (e.g. block start, initialize, enable, and constant output methods). The block method execution lists are generated because the simulation and/or linearization of a model must execute block methods by type (not by block) when they have a sample hit.

After linking has been performed, the execution engine may generate code. In this stage, the execution engine may choose to translate the block diagram model (or portions of it) into either software modules or hardware descriptions (broadly termed code). If this stage is performed, then the stages that follow use the generated code during the execution of the block diagram. If this stage is skipped completely, then the execution engine uses an interpretive mode of execution for the block diagram. In some cases, the user may not proceed further with the execution of the block diagram because they would like to deploy the code outside the confines of the block diagram software. Upon reaching the simulation stage, the execution engine uses a simulation loop to execute block methods in a pre-defined ordering upon a sample hit to produce the system responses they change with time.

For linearization, Simulink uses the block method execution lists in a prescribed fashion to produce a linear state space representation of the dynamic system described by the block diagram.

The block diagram editor is the graphical user interface (GUI) component that allows drafting of block diagram models by a user In Simulink, there is also a textual interface with a set of commands that allow interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of sub-systems (discussed further below).

A suite of GUI tools in Simulink allows users to draft a block diagram model on the corresponding windows. The GUI tools include a block palette, wiring line connection tool, annotation tool, formatting tool, attribute editing tool, save/load tool and publishing tool. The block palette is a library of all the pre-defined blocks available to the user when they are building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

The wiring line connection tool allows users to draw directed lines that connect the ports of blocks in the model's window. Lines are also added through various mechanisms involving human-machine interfaces such as the mouse or keyboard. Simulink also provides various forms of auto-connection tools that connect blocks automatically on user request to produce an aesthetically pleasing layout of the block diagram (especially those with high complexity with large numbers of blocks). The annotation tool allows users to add notes and annotations to various parts of the palette for a block diagram. The formatting tool enables users to perform various formatting operations that are generally available on any document editing tool. These operations help pick and modify the various graphical attributes of the block diagram (and constituent blocks) such as include font-selection, alignment & justification, color selection, etc. The block diagram and all the blocks within the block diagram generally have a set of functional attributes that are relevant for the execution or code-generation. The attribute editing tool provides GUIs that allows these attributes to be specified and edited. The save/load tool allows a created block diagram model to be saved. The saved model can be reopened in the editor at some later juncture through a load mechanism. Simulink also allow users to save blocks including pre-constructed subsystems into a separate class of block-diagrams called libraries. Such libraries facilitate reuse of the same block in a number of other block-diagrams. The load/save mechanism is specially equipped to handle loading and saving of blocks in a block-diagram that actually reside in libraries.

The publishing tool enables the viewing of the block diagram as a document that can be published in any of the standard document formats (examples: PostScript, PDF, HTML, etc.). Those skilled in the art will recognize that the windows for multiple models and all of the tools mentioned above could potentially be embedded in a single Multi-Document Interface (MDI) for providing a unified software environment. Those skilled in the art will also recognize that block-diagram packages offer scripting languages for writing out programs that automatically carry out a series of operations that would normally require interaction with the GUI. For example, Simulink offers a set of commands in MATLAB for carrying out operations such as block addition (add_block), block deletion (delete_block), starting and terminating execution (set_param), modifying block attributes (set_param/get_param), etc.

Simulink also offers a variety of other GUI tools that improve the ability of users to build and manage large block diagrams. Examples of such GUIs include: (a) a Finder that helps find various objects such as blocks and lines within a block-diagram, (b) a Debugger that helps debug the execution of block-diagrams, (c) a Revision Control UI for managing multiple revisions of the block-diagram, and (d) a Profiler for viewing timing results while executing a block-diagram.

A typical base data-structure for a block may be represented as:

```
class Block {
    public:
        // Access methods for setting/getting block data
        ...
        // Methods for block editing
        virtual ErrorStatus BlockDrawIcon( );
        virtual BlockParameterData BlockGetParameterData( );
        // Methods for block compilation
        ...
        // Methods for block execution
        ...........................................
        virtual ErrorStatus BlockOutput( ) = 0;
        virtual ErrorStatus BlockDerivative( ) = 0;
        virtual ErrorStatus BlockUpdate( ) = 0;
        ...
    private:
        BlockGraphicalData blkGraphicalAttributes;
        BlockFunctionalData blkFunctionalAttributes;
        BlockCompiledData blkCompiledAttributes;
        BlockExecutionData blkExecutionData;
        ...
};
```

Although the example of the data structure above is written in C++, those skilled in the art will recognize that equivalent data structures written in in other languages may also be used. The major data fields of the block data structure fall into four categories, a graphical attributes field, a functional attributes field, a compiled attributes field and an execution data field.

The graphical attributes field is responsible for storing information relevant for graphical rendering of the block within its parent block diagram's GUI. Attributes specific to the block icon such as font, color, name, and icon-image are stored in this field. It should be noted that modifying these attributes does not affect the dynamics of the model using this block. The functional attributes field is responsible for specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of given block in a model.

Attributes of block ports specify properties of the data that is either available or produced at that port. Block port attributes include dimensions, datatypes, sample rates, and direct feedthrough. Dimension attributes are individual dimensions of a multi-dimensional matrix that is used as a container for data elements. Datatype attributes are the datatype of each element of data in the data container. A complexity attribute is a flag to specify if each data element is real or complex. A sample rate attribute specifies how when the signal corresponding to an input or output port will be used. The port sample times may sometimes be used to implicitly infer the block's sample time. The direct feedthrough attribute is specified only for input ports and indicates whether or not the Output and/or GetTimeOfNextHit equations of the block are a function of the given input. This attribute helps in determining the sequence in which block methods should be executed while executing the block diagram.

The compiled attributes field of the block data structure holds the attributes of the block and its ports that mirror the functional attributes listed above. This field is filled in during block diagram compilation by utilizing the functional attributes of the block in conjunction with the functional and compiled attributes of the blocks that are connected to it. This process of determining the compiled attributes from the functional attributes is termed attribute propagation. Attribute propagation is described in greater detail below in the section on block diagram compilation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the block diagram editor in order to render the block appropriately in the GUI of its parent block diagram. For instance, this set of methods may include a BlockDrawIcon method that determines the shape the block icon has on the GUI. Methods used in compilation are methods that are called by the block diagram compilation engine. They help validate the connections of the block to other blocks on the block diagram. The methods used in execution include a number of different run-time methods that are required for execution. These include the BlockOutput, BlockUpdate, BlockDerivative methods that realize the Output, Update, and Derivative equations discussed earlier in the context of dynamic systems. In addition, to these methods Simulink includes several other run-time methods, such as the Jacobian, Projection, ZeroCrossings, Enable, Disable, Initialize, EvalParams (check and process parameters), and GetTimeOfNextHit methods. It should be noted that there is no explicit method for algebraic equations because these are represented and processed in a different manner which will be discussed below.

Figure 3:
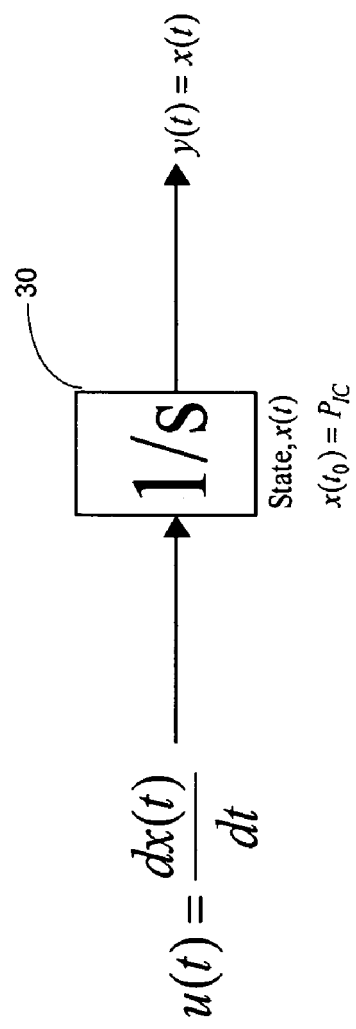
FIG. 3 depicts the desired behavior of an integrator block.

The base data structure for the block specifies the generic fields and interfaces that need to be supported by a block. Some of the methods are purely virtual and have no specific implementation in the base block class. In order to define a specific block (such as an Integrator block), one needs to subclass the base block class and provide explicit definitions for these virtual methods. An example of the subclassing of a block may be seen by examining an Integrator block. FIG. 3 depicts the desired behavior of an Integrator block 30. In order to create the subclass, four major categories of information within the subclass must be specified, the block parameters, the methods used in editing, the methods used in compilation, and the methods used in execution. The elemental dynamic system embodied by the block may be parameterized as illustrated in FIGS. 1A-1C. Each block needs to be able to specify its list of expected parameters. The block diagram editor's Attribute-Editing tool may allow users to specify the parameters for the block when they use it in their models. In the Integrator block example, the block has one parameter that specifies the block's initial condition for the block's state. Regarding the methods used in editing, the subclass needs to specify a method that renders its icon. For example, the Integrator block may implement a method that makes its icon be a box with a '1/s' within the box. Also, the subclass needs to instantiate a method that allows access of the block parameters from the GUI's Attribute-Editing tool. For the Integrator example, this method would allow users to specify the Initial Condition parameter on a GUI for the block. For the methods used in compilation, the subclass needs to instantiate methods that help in the compilation of the block diagram model in which it is placed. These methods help specify the compiled information for the inputs and outputs of the block. For instance, the Integrator block may specify a method that ensures that if the input to the Integrator is a vector, then the output is a vector of the same size. For methods used in execution, the subclass needs to instantiate specific Output, Derivative, and Update methods that represent the block behavior. In the case of the Integrator block, an Output and Derivative method are needed. It should be noted that in Simulink the Integrator block has additional methods that are not illustrated here. The Output method sets the output to be equal to the state. The Derivative method sets the derivative of the state to be equal to the input.

The specification of these four types of information for the Integrator block subclass may be shown by a reduced form of the Simulink Integrator block:

```
IntegratorBlock : public Block {
    public:
        ErrorStatus BlockDrawIcon( ) {
            // Draw '1/s' on the icon
            ..........................
        }
        BlockParameterData BlockGetParameterData( ) {
            // Return initial_condition as block data
            ..........................
        }
        ErrorStatus BlockOutput( ){
            // Implement y(t) = x(t)
            ..........................
        }
        ErrorStatus BlockDerivative( ){
            // Implement dx(t)/dt = u(t)
            ..........................
        }
    private:
        double initial_condition;
};
```

It should be noted that block diagram software generally provides open access to the block's data structure to users of the software. This allows users to create and utilize custom block implementations in their models.

Blocks in a block diagram may be virtual or non-virtual. The designation of a block as non-virtual indicates that it influence the equations in the mathematical model for the dynamic system. In the context of block diagram software, it is beneficial to include other virtual blocks that do not affect the equations in the dynamic system's model. Such blocks help improve the readability and modularity of the block diagram and wield no semantic influence on the mathematical model. Examples of such virtual blocks include virtual subsystems, inport blocks and outport blocks, bus creator blocks and From and Goto blocks.

Modularity may be achieved in a block diagram by layering the block diagram through the use of subsystems. A subsystem facilitates layering by allowing a collection of blocks to be represented by a single block with input and output signals. The input and output signals of the subsystem are accessible to the constituent blocks within the subsystem. A subsystem is a virtual subsystem if its constituent blocks are moved back into the main block diagram model during the model's execution. Within a virtual subsystem graphical entities, called inport and outport blocks, are provided to define signal connections to the parent block diagram. These inport and outport blocks indicate a tunnel-through signal connection to the parent block diagram.

Additional types of virtual blocks include bus creator blocks and selector blocks. In large models, there may be an extensive set of lines that connect one section of a block diagram to another section. To avoid excessive clutter of lines and improve readability, there is typically a special block called a Bus Creator that helps bundle all of the lines together to form a single bus line. This single bus line then connects the two sections of the model. At the destination end of the line, a block called a Bus Selector helps un-bundle the individual lines so that they can be connected to other blocks.

Other virtual blocks include From blocks and Goto blocks that are special blocks that help avoid graphical clutter, e.g. a line that connects two distant sections of a block diagram. The line is terminated close to its originating point by a From block. At the other end, a new line is drawn from a Goto block that is hot-linked to the From block. Each Goto and From block has an associated tag that describes which blocks are connected together. An important point to be noted is that Virtual blocks have neither execution data nor execution methods in their data structure.

Simulink also provides the user with the ability to extend the simulator by providing the ability to enhance the simulator with blocks that define dynamic systems or are virtual properties. The extension is provided through a language independent API (e.g. C, C++, Ada, Fortran, Assembly, M).

As noted previously, to facilitate modeling fairly large and complex dynamic systems, Simulink allows users to layer their block diagrams. A subsystem facilitates such layering by allowing a collection of blocks to be represented by a single block with input and output signals. The input and output signals of the subsystem are accessible to its constituent blocks. By nesting subsystems within each other, one can create block diagrams with arbitrary layers of hierarchy. Ideally a subsystem has no impact on the meaning of the block diagram. Additionally, subsystems provide a way of grouping blocks together and allowing other block diagram constructs to impose unified control on the constituent blocks. To enhance the modularity of subsystems, modeling software also allows aggregated list(s) of parameters of the blocks within the subsystem to be accessed from a single GUI, and defines and displays special icons on the subsystems. The process of defining the parameter list and the special icon is called masking a subsystem.

There are two main types of subsystem blocks, virtual subsystems and non-virtual subsystems. Virtual subsystems serve the purpose of providing the block diagram with a graphical hierarchy. Non-virtual subsystems behave like an elemental dynamic system with its own execution methods (Output, Update, Derivatives, etc.). These execution methods in turn call the execution methods of the constituent blocks.

The classes of non-virtual subsystems are:
Atomic subsystems. These are similar to virtual subsystems, with the advantage of grouping functional aspects of models at a given layer. This is useful in modular design.
Conditionally-executed subsystems. These are non-virtual subsystems that execute only when a precondition is fulfilled:
Enabled subsystems. These are similar to Atomic subsystems, except that the constituent blocks only execute when an enable signal feeding the subsystem is greater than zero.
Triggered subsystems. These are similar to Atomic subsystems, except that the constituent blocks only execute when a rising and/or falling signal is seen on a triggering signal feeding the subsystem.
Enable with Trigger subsystems. These are an intersection of the properties of Enabled and Triggered subsystems.
Action subsystems. These subsystems are connected to action-initiator (e.g., an "If" or "SwitchCase" block), a block that explicitly commands the subsystem contents to execute. These subsystems are similar to Enabled subsystems except that the management of the "enabling" signal has been delegated to an action-initiator. Action subsystems define a new type of signal, called an action signal that signifies which subsystems are commanded to execute by the action-initiator.
Function-call subsystems. These subsystems provide a means of collecting blocks into a subsystem that is only executed when called by an owner block. The owner block may compute input signals for the subsystem before calling the subsystem. Additionally, the owner may also read output signals from the subsystem after calling it. Function-call subsystems define a new type of execution control signal, called a function-call signal that contains no data. It is used to define the execution relationship between the owner block and the function-call subsystem. Function-call owners may also designate themselves as an "interrupt" source. In simulation, they simulate the effects of an interrupt and in code generation they can attach themselves to an (asynchronous) interrupt.
While subsystems and For subsystems. These subsystems execute the constituent blocks multiple times on a given time step.

Simulink allows for several forms of block parameters to be defined. There are two general categories of parameters: those parameters that can be modified during simulation and those that cannot be modified. An example of a parameter that may be modified during simulation is the amplitude of a Sine Wave block if configured by the user to allow modification during execution. A parameter such as the amplitude specifies coefficients of the dynamic equation, in this case the amplitude of the sine wave function defined by the Sine Wave block. An example of a parameter that can never be modified during simulation is the sample time of the Sine Wave block. The parameters that can be modified during simulation are further broken down into other categories which include mapping the dialog parameter (e.g. the amplitude) to run-time parameters or converting the dialog parameter to an inlined (non-modifiable) parameter. Run-time parameters can further be mapped to mathematical expressions of tunable Matlab variables or Matlab parameter objects describing properties of the variables (called Simulink.Parameter's). A global run-time parameter data structure is used within Simulink to manage the block parameters during the execution of the model.

In addition to block parameters, there are model-wide parameters which are generally associated with the solver. These parameters include aspects such as the time span in which to perform a simulation, the type of solver, and the time span. Simulink gives the user the ability to adjust solver parameters during model execution. The adjustment of these solver parameters is performed at the start of a time step.

Figure 4:
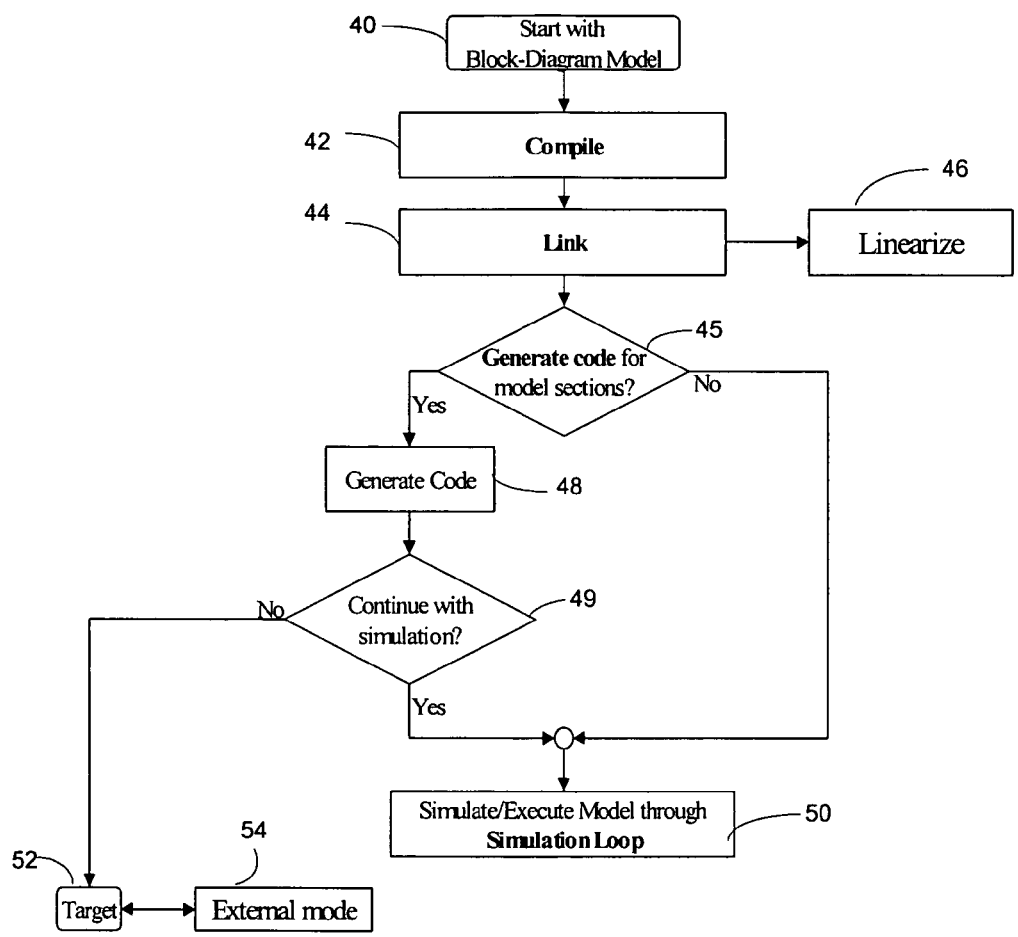
FIG. 4 is a flow chart of the sequence of steps used to perform simulation of the block diagram.

Once a block diagram model has been constructed using the editor, an execution engine allows the model to be solved in order to trace the system outputs as a function of time. The solution of the model, which may be referred to as model execution, is carried out over a user-specified time span for a set of user-specified inputs. Simulation proceeds in four major stages: compilation, link, code generation, and the simulation loop. Alternatively, the execution engine can obtain a linear representation of the model (linearization). The interrelationship between the various stages is illustrated in a flowchart in FIG. 4.

The execution begins when the block diagram 40 is compiled 42. Following the compilation stage, is the model link stage 44 which may also produce linear models 46. Code may or may not be generated 45. If code is generated 48, a decision is made 49 whether to continue the simulation. If the decision is made to continue the simulation the model is simulated/executed through the Simulation Loop 50. If the simulation is not continued, the code may be delivered to a target 52 and executed in an external mode 54. If code is not generated the block diagram may execute in interpretive mode when entering the Simulation Loop 50.

The compile stage marks the start of model execution and involves preparing data structures and evaluating parameters, configuring and propagating block characteristics, determining block connectivity, and performing block reduction and block insertion. The preparation of data structures and the evaluation of parameters creates and initializes basic data-structures needed in the compile stage. For each of the blocks, a method forces the block to evaluate all of its parameters. This method is called for all blocks in the block diagram. If there are any unresolved parameters, execution errors are thrown at this point.

During the configuration and propagation of block and port/signal characteristics, the compiled attributes (such as dimensions, datatypes, complexity, or sample time) of each block (and/or ports) are setup on the basis of the corresponding functional attributes and the attributes of blocks (and/or ports) that are connected to the given block through lines. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. For instance, if an Integrator block is implemented to only accept numbers of double precision datatype, then this block will error out if it is driven by a block that produces single precision data, unless the user has asked for an implicit data conversion. Secondly, in many cases blocks are implemented to be compatible with a wide range of attributes. Such blocks adapt their behavior in accordance with the attributes of the blocks connected to them. This is akin to the concept of polymorphism in object-oriented programming languages. For instance, a discrete-time Filter block could be implemented to accept any of the standard integer datatypes ranging from 8-bit to 128-bit. The exact implementation of the block is chosen on the basis of the specific block diagram in which this block finds itself. Included within this step are other aspects such as validating that all rate-transitions within the model yield deterministic results and that the appropriate rate transition blocks are being used.

Figure 5:
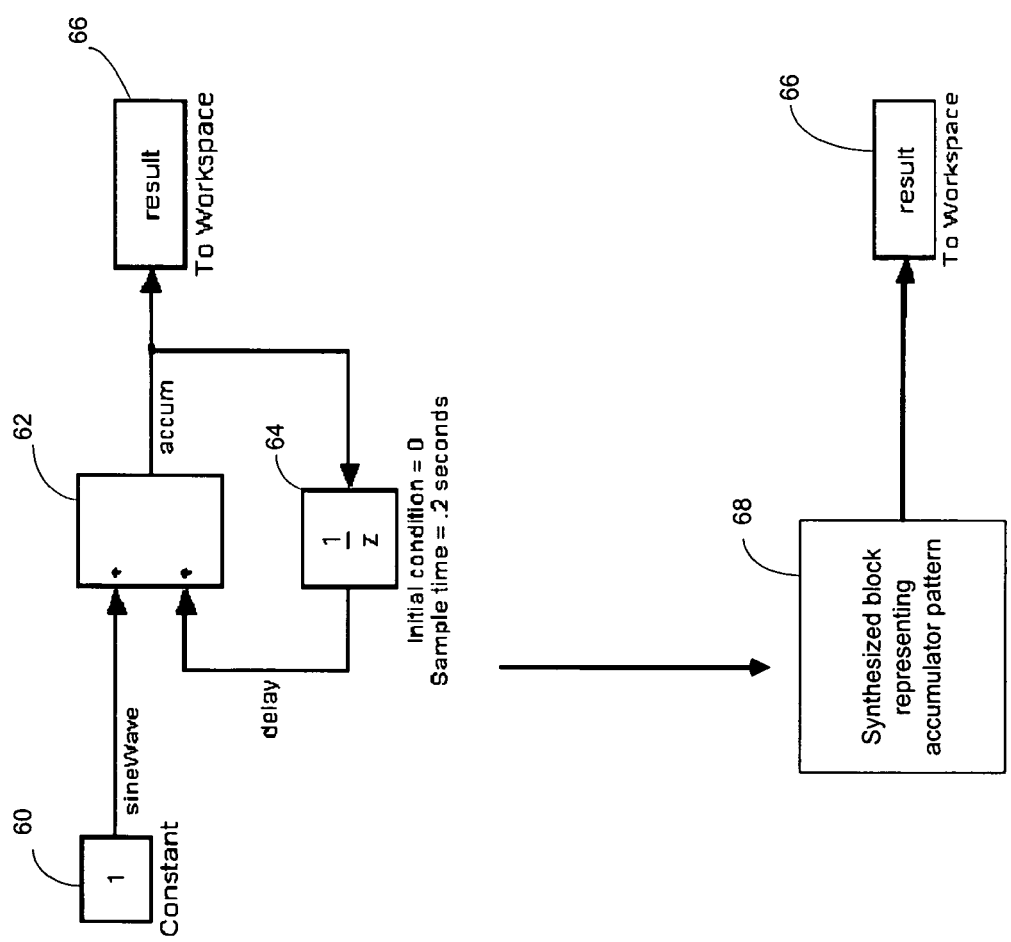
FIG. 5 depicts the replacement of a collection of blocks in a block diagram with an accumulator block.

The compilation step also determines actual block connectivity. Virtual blocks play no semantic role in the execution of a block diagram. In this step, the virtual blocks in the block diagram are optimized away (removed) and the remaining non-virtual blocks are reconnected to each other appropriately. This compiled version of the block diagram with actual block connections is used from this point forward in the execution process Once actual block connectivity has been determined (by removing the virtual blocks) the block diagram may be further optimized by performing block reduction and insertion. During this step, non-virtual blocks may be inserted or a set of non-virtual blocks may be completely removed or reduced to a single equivalent block. Block insertion and reduction is mainly done to improve execution efficiency. Examples of block insertion and reduction include the removal of Gain blocks whose gain value is 1. A Gain block is a block which multiplies its input value by a gain parameter, such as a simple amplifier. FIG. 5 depicts the replacement of a collection of blocks 60, 62, and 64 connected in a accumulator pattern and leading to result 66 with an equivalent synthesized block 68 representing the accumulator pattern leading to the same result 66. A signal copy block may also be automatically inserted in order to make contiguous memory copies of signals that are made up of disjoint memory sections. Block insertion and reduction may also be performed at other suitable stages of compilation.

The way in which blocks are interconnected in the block diagram does not necessarily define the order in which the equations (methods) corresponding to the individual blocks will be solved (executed). The actual order is partially determined during the sorting step in compilation. Once the compilation step has completed, the sorted order cannot be changed for the entire duration of the block diagram's execution.

The first step in sorting involves transforming the graphical block diagram into a compiled (in-memory) directed graph consisting of arcs and vertices. The vertices are derived from some of the non-virtual blocks. For instance, virtual and reduced blocks do not appear in the directed graph. The arcs represent data dependencies between the vertices. The data dependencies do not correspond to the signals in the block diagram. For example, all signals that connect to input ports without direct feed through are "cut" or ignored. In addition, data dependencies are added to capture implicit dependencies. For example, all inputs to a Function-Call subsystem are implicit data dependencies to the owner (caller) block.

Figure 6A:
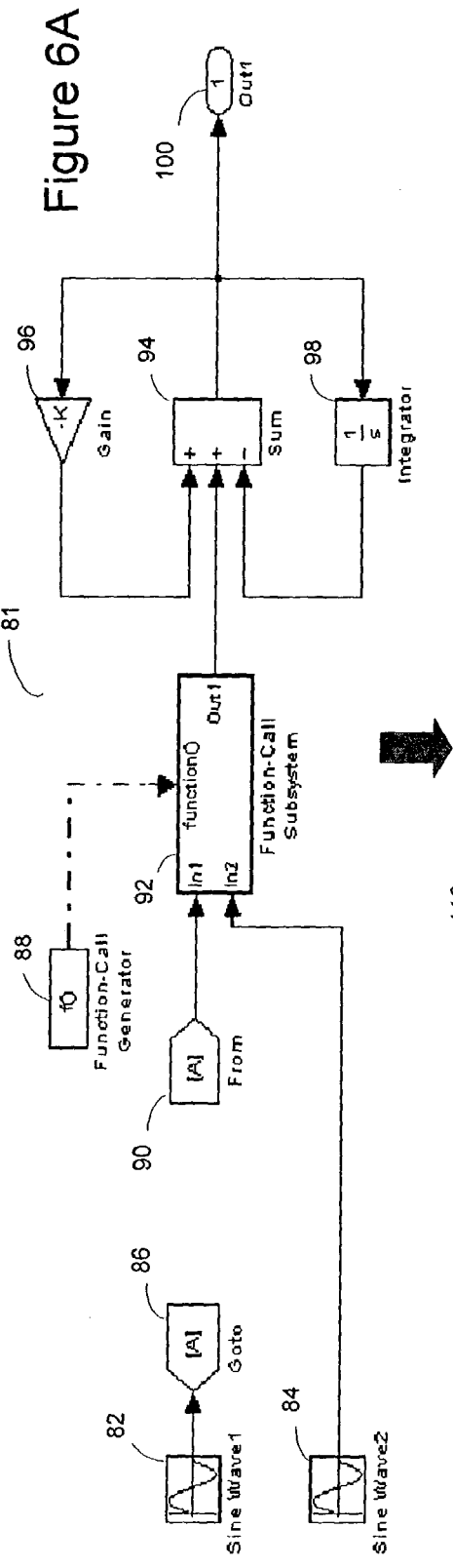
FIG. 6A depicts a block diagram and its associated directed graph.

The process of converting a block diagram into a compiled directed graph is shown in FIG. 6A. A block diagram 81 includes a Sine Wave 1 block 82, a Sine Wave 2 block 84, a Goto block 86, a Function Call Generator block 88, and a From block 90. Also included are a Function Call Subsystem block 92, a Sum block 94, a Gain block 96, an Integrator block 98 and an Outport (Output 1) block 100. Those blocks which are not virtual or reduced appear on the corresponding directed graph 111. The directed graph 111 includes a Sine Wave1 vertice 112, a Sine Wave 2 vertice 114, a function-call generator vertice 116, and a function call subsystem vertice 118. Also included are a Sum vertice 120, a Gain vertice 122, an Integrator vertice 124 and an Outport 1 vertice 126. The vertices are connected by arcs.

Figure 6B:
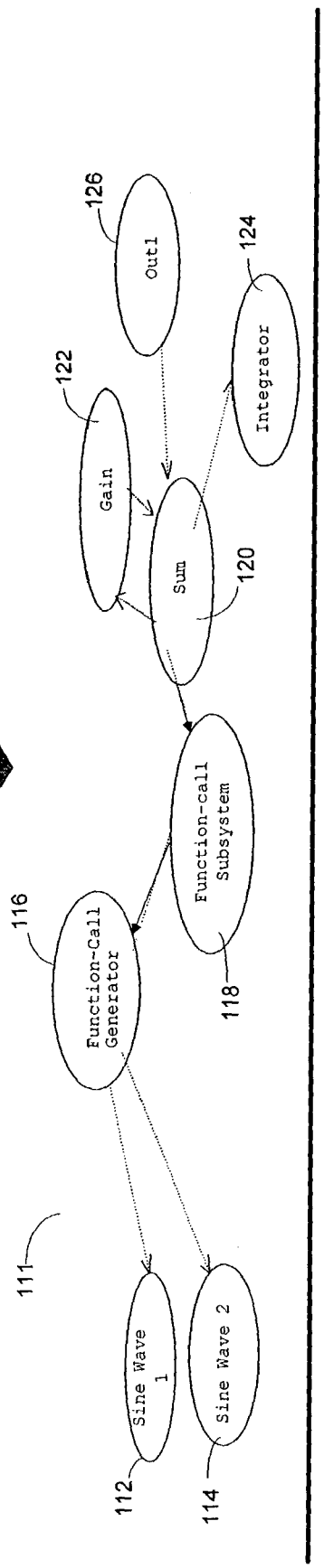
FIG. 6B depicts a linear sorted list generated from the directed graph of FIG. 6A.

The graph is used to sort the blocks into a linear sorted list. FIG. 6B depicts a sorted list 128 generated from the compiled directed graph 111 which includes the elements appearing as vertices in the directed graph 111 sorted into order. The root block diagram has a sorted-list associated with it. Roughly speaking, each non-virtual subsystem layer and some special block diagram elements also each have their own sorted-list. During the sorting of the graph into the list, strongly connected components are identified. The term strongly connected section, which is a term that originates from graph theory, is a subset, S, of the blocks of a block diagram such that any block in S is reachable from any other block in S by following signal connections and S is not a subset of any larger such set. Strongly connected sections are flagged as algebraic loops when all blocks have direct feedthrough (an example is shown in FIG. 6A consisting of the Sum 120 and Gain 122 blocks). Such loops correspond to a set of algebraic equations and are solved using iterations and perturbations during block diagram execution by solving for the algebraic variables. Algebraic variables are either specified by the user via Initial Condition blocks or chosen by the execution engine. Solving of algebraic loops is discussed further below.

Sorting must also take into consideration other user specified dependencies between the blocks. These dependencies include the concepts of priorities and placement groups. A block priority specifies the order in which the equations associated with a block are evaluated with respect to other blocks. Placement groups are a way of causing each class of block methods for a specified set of blocks to be "placed together" in the block method execution lists. The terms "data dependency" or "data precedence" as used herein refers to the arcs of the compiled directed graph and not the signals found within a block diagram. Attempting to correlate data dependencies directly to the signals found within a block diagram is incorrect and leads to the conclusion that Simulink does not satisfy data dependencies, i.e., the execution of the operations or block methods does not satisfy data dependencies if one interprets signal connectivity as specifying data dependencies.

After compilation, the link stage commences. During this stage physical memory allocations are made in order to prepare for execution. Buffers are allocated for block input and output data buffers, states, and work areas. Additionally, block method execution lists that are derived from the sorted list allow for execution of the block diagram. Each block method execution list is a list of block methods that are to be executed in a sequence when each method within the list has a sample hit. There is generally a set of block method execution lists associated with each layer of the block diagram that corresponds to a non-virtual subsystem. Non-virtual subsystems are either defined by the user or automatically synthesized during compilation to either efficiently execute the model or simplify the implementation of the semantics defined by Simulink. In multi-tasking mode, the lists within each layer may be further partitioned when block diagrams have blocks with different sample rates. These lists are explained in greater detail below.

Those skilled in the art will recognize that while the block method execution lists are derived from the sorted list, they do not necessarily correspond one-to-one with the sorted lists. First, each block method execution lists contains only blocks that have such a block method of the given type (class) defined by the list. Second, block methods corresponding to components like the function-call subsystem do not appear on the block method execution lists because they are executed by an "owner" block.

Although included in the discussion of the compilation stage, it is not required that the time-based diagram perform the block sorting step during compilation. The sorting step is performed to achieve efficient execution. Ignoring efficiency, there is no semantic reason to perform the sorting step. Any random ordering of the block methods will work. In fact, any ordering of all block method execution lists except the Output block method execution list will result in the same level of efficiency. Randomly re-ordering the Output block method execution list will yield correct answers. If the Output block method list is randomly ordered, then the Simulation engine, when executing the Output block method execution list, continues sequencing through the Output block method execution list at each point in time until there are no changes.

Similarly included within the linking stage for the sake of simplicity, is the memory initialization of the model. The memory initialization of the model includes invoking block start, initialize, constant initialize, enable, and constant output methods. These are examples of some of the block methods that are used during model setup (prior to execution) to initialize the "state" of the system so that execution or linearization can commence.

The compiled and linked version of the block diagram may be directly utilized to execute the model over the desired time-span. This interpretive mode of execution is suitable for getting fine-grained signal traceability. It should be noted that the traceability associated with interpretive execution comes at the price of increased overhead in the form of additional execution-related data-structures and messaging in the engine. An alternative to the interpretive execution mode is to utilize the generated-code created by Real-Time Workshop tool for Simulink models. In this mode, the engine (upon the behest of the user) translates a selected portion of the block diagram (or the entire block diagram itself) into code. Such code could be in a number of possible forms. The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

The execution of a portion of the block diagram represented in code may be performed in a number of different ways based on the specific code format. The portion of the block diagram may execute a compiled version of the code generated in a high-level language (accelerated or software-in-the-loop simulation), the execution may simulate code that corresponds to a hardware description on a hardware simulator, (co-simulation execution), the execution may involve calling out to third-party software to run code generated for such software (co-simulation execution), or the execution may call out directly to hardware that will run code that was generated and compiled for that hardware (processor-in-the-loop execution).

There are several different advantages to execution through code generation: Execution of generated code can be more efficient than interpretive execution because of fewer data-structures and lesser internal messaging in the engine, although the increased efficiency generally comes at the cost of decreased execution traceability. Simulation of hardware descriptions during execution can help identify and resolve bugs in the software stage of a design project. Such bugs prove much more expensive to track and fix once the system has been implemented in hardware. Additionally, block diagram modeling software can be integrated with other software environments that are suitable for modeling and simulating special classes of systems. Models can be tested directly in hardware thereby making prototyping of new systems fast and cost-effective. For instance, consider the design of a controller for an anti-lock braking system of a car. The dynamics of the braking system can be executed in the interpretive mode in the block diagram. The controller itself can be implemented on a hardware micro-controller to test the efficiency of the control laws implemented within. Note that for such target execution, it is normally necessary for the time span over which a model is executed by the software to match real-world time. In other words, the software must allow real-time execution of the block diagram model. Those skilled in the art will recognize that when users generate code, they may choose to not proceed further with the block diagram's execution. They may choose to take the code and deploy it outside of the confines of the modeling software environment. This is normally the last step in the design of dynamic systems in a block diagram software package.

There are several forms of target code execution known to those skilled in the art such as Rapid Prototyping, Embedded System Deployment, and Hardware-in-the-Loop which execute a model or portions of a model via the generated code on a Real-Time System target. One aspect of deploying (executing) the generated code on a target is the notion of "external mode." External mode refers to a system where Simulink acts as a monitor and debugger of the generated code running in real-time on a target. In External Mode, users can change parameters and view signals via standard Simulink elements. Another important aspect of the code generation technology is that it is very extensible. Provided with the Simulink product family is the Target Language Compiler (TLC). This technology enables the creation of "active scripts" that control how the generated code is produced for a block diagram. Using TLC, one can tailor the generated code to suite their specific needs.

The execution of the block diagram uses a Simulation Loop (SimLoop) for solving for the block diagram's outputs for a specified set of inputs over a specified span of time ("Time" in reference to the Simulation Loop means the time-line corresponding to the tracing of the dynamic system's outputs, not real-world time unless otherwise noted). The term "SimLoop" applies to real-time systems where each iteration is tied to a physical periodic clock or other timer source. During this process, the block methods (equations) corresponding to the individual blocks are executed by type following their sorted order when they have a sample hit. The term "block execution" is loosely used to mean executing all block methods associated with the given block for a given time step, generally starting with the output method. Strictly speaking, blocks do not execute; the engine executes (evaluates) the appropriate block methods at the appropriate time points.

SimLoop has two variants "single-tasking" and "multi-tasking" depending on sample times. In general, the sample time of a block is the interval of time between calls to the Output, Update, and/or Derivative methods for a given block. In computing this interval, repeated calls at the same time instant (not in real-world time but the time corresponding to the execution of the dynamic system) are counted as the same call. A block's sample rate may also be thought of the interval between successive executions of the block methods. If there is no uniform or regular interval between calls, then the block is said have a continuous sample time. If a uniform time interval can be found, then the block is said to have a discrete sample-time equal to that interval. Although blocks may be associated with more than one sample time in a sufficiently complex dynamic system the descriptions contained herein are confined to blocks with a single sample-time. Those skilled in the art will recognize that the descriptions may be extended to encompass blocks with multiple sample times.

Figure 7A:
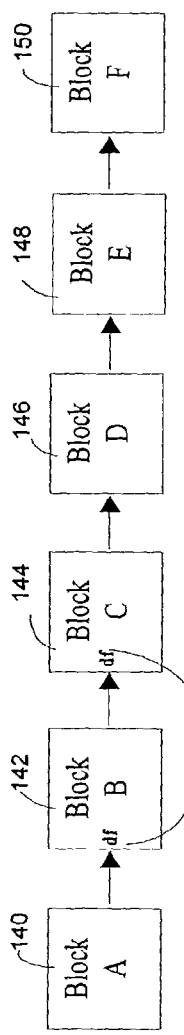
FIG. 7A depicts an abstract example of a block diagram being executed.
Figure 7B:
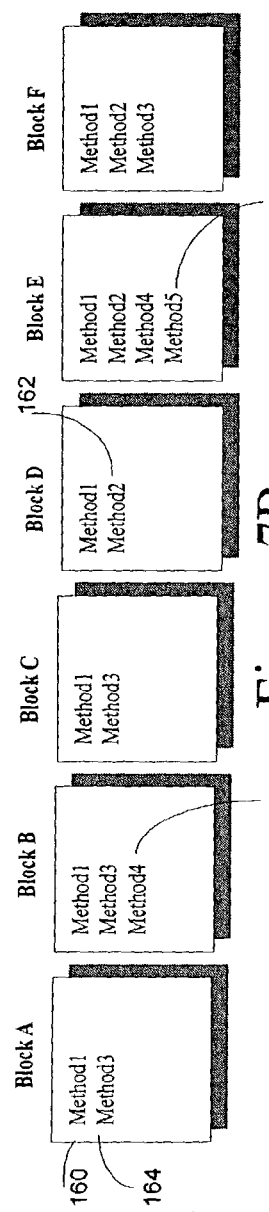
FIG. 7B depicts an abstract view of the execution methods instantiated by the blocks depicted in FIG. 7A.
Figure 7C:
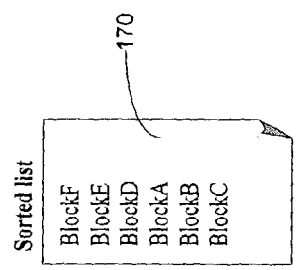
FIG. 7C depicts a sorted list generated from the data dependencies between blocks of FIG. 7A.

FIG. 7A depicts an abstract example of a block diagram being executed. The diagram includes a plurality of blocks 140, 142, 144, 146, 148 and 150. The block ports that have direct feedthrough are explicitly marked (using the symbol 'df') 152. Additionally, an abstract view of the execution methods instantiated by each block is shown in FIG. 7B. The blocks contain a number of different methods 160, 162, 164, 166 and 168. Execution methods includes the three basic execution methods discussed earlier: Output, Update, Derivative, as well as several other methods that aid in advanced block functions such as initialization, linearization and zero-crossing detection. (which are discussed below). The data-dependencies between the compiled vertices created during sorting are used to generate the Sorted List 170 shown in FIG. 7C.

Figure 8:
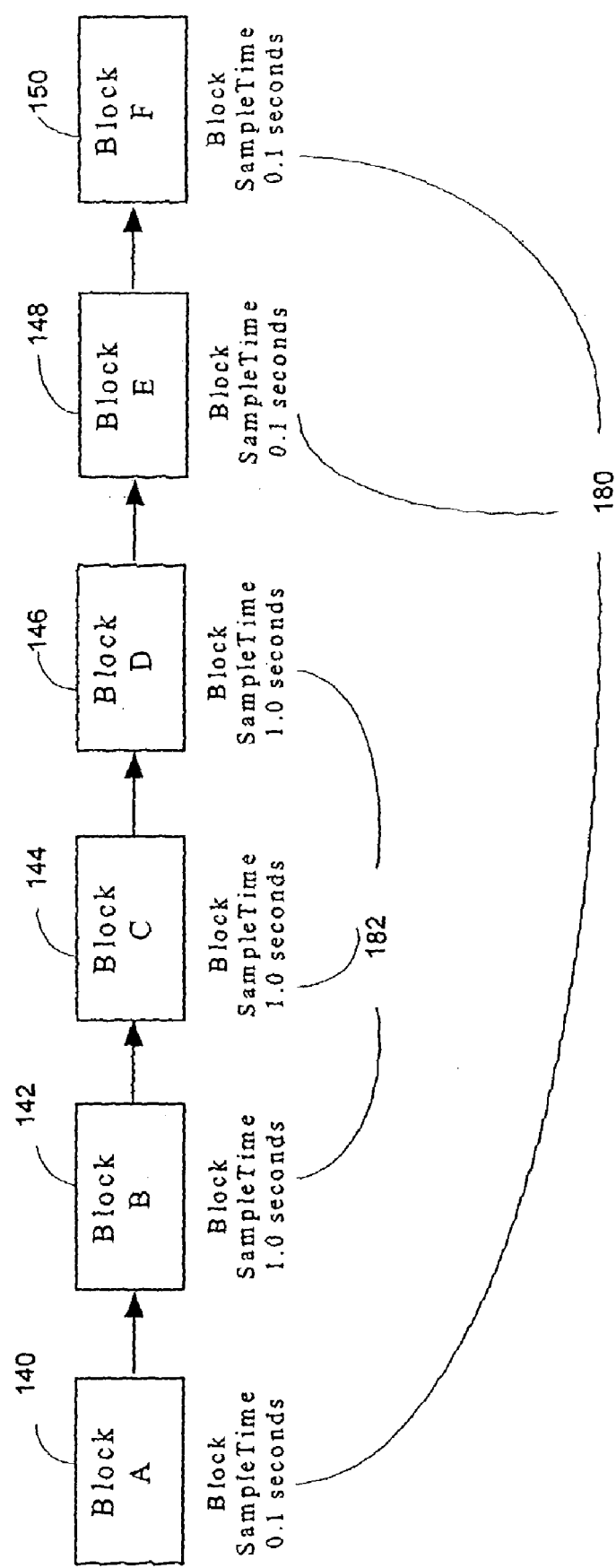
FIG. 8 depicts a multi-rate system.

A block diagram consisting of blocks that all have the same sample time is said to correspond to a single-rate system. A block diagram consisting of blocks that have more than one sample time corresponds to a multi-rate system. FIG. 8 depicts a multi-rate system, adding sample-time information to the block diagram of FIG. 7A. The plurality of blocks 140, 142, 144, 146, 148, and 150 each have an associated sample time. Since the sample times in the block diagram differ between blocks, the system is considered a multi-rate system. Block A 140, block E 148 and block F 150 each have a sample time of 0.1 seconds. Block B 142, block C 144 and block D 146 each have a sample time of 1.0 seconds.

The SimLoop is the heart of the execution engine. Each full pass through the loop is responsible for computing the outputs of the system at a particular time. At the end of each loop, the execution time corresponding to the next pass through the loop is computed. If this time exceeds the stop time specified by the user, the execution terminates. Within the loop, the sequence in which individual block equations are solved is determined by two pieces of information: the sample times of the blocks and the sorted order determined during the Compile stage. The amalgamation of these two pieces of information gives the execution lists for the block diagram. Those skilled in the art will recognize that the execution lists are created in the Link stage and are explained in the context of SimLoops for convenience. There are two distinct approaches for building execution lists and using them in the SimLoop. These approaches correspond to the Single-tasking and Multi-tasking SimLoops summarized in the discussion on FIG. 10 below.

Simulink also has the ability to modify coefficients (parameters) of blocks who declare their parameters as tunable. An example of a block is a Sine Wave block that implements the function output (time)=Amplitude*sin(frequency*time+phase)+bias, where time is the independent variable and the parameters are: amplitude, frequency, phase, bias. When these parameters are declared as tunable, Simulink lets the user change these coefficients during simulation. Changing parameters is a drastic operation in that the definition of the model has changed (e.g. the sine block defines equations that describe the system). Thus, to enable the changing of parameters during the SimLoop, Simulink first queues parameter changes and then applies them on the next time step. Thus, the changing of parameters is not immediate. The delay in the changing of parameters is needed to ensure system stability. The application of the parameters at the start of the next time step is combined with the reset of the solver (Integrator) if needed.

Figure 9:
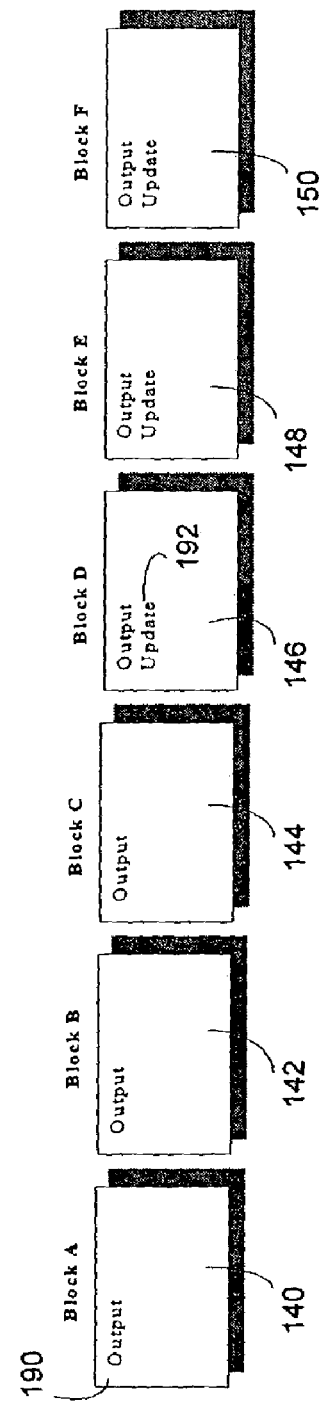
FIG. 9 depicts the block diagram of FIG. 7A and FIG. 8 with associated methods added to the blocks.

For the purpose of exploring single-task loops and multi-task loops, FIG. 9 depicts the block diagrams of FIG. 7A and FIG. 8 where Method1 corresponds to the Output method 190 and Method2 corresponds to the Update method 192. All other methods are ignored in the explanation of the loops. Simpler loops which do not include blocks that have continuous sample times are used in the example since the explanation is simpler in the context of discrete sample times and it is straight-forward to extend to continuous sample times.

Figure 10:
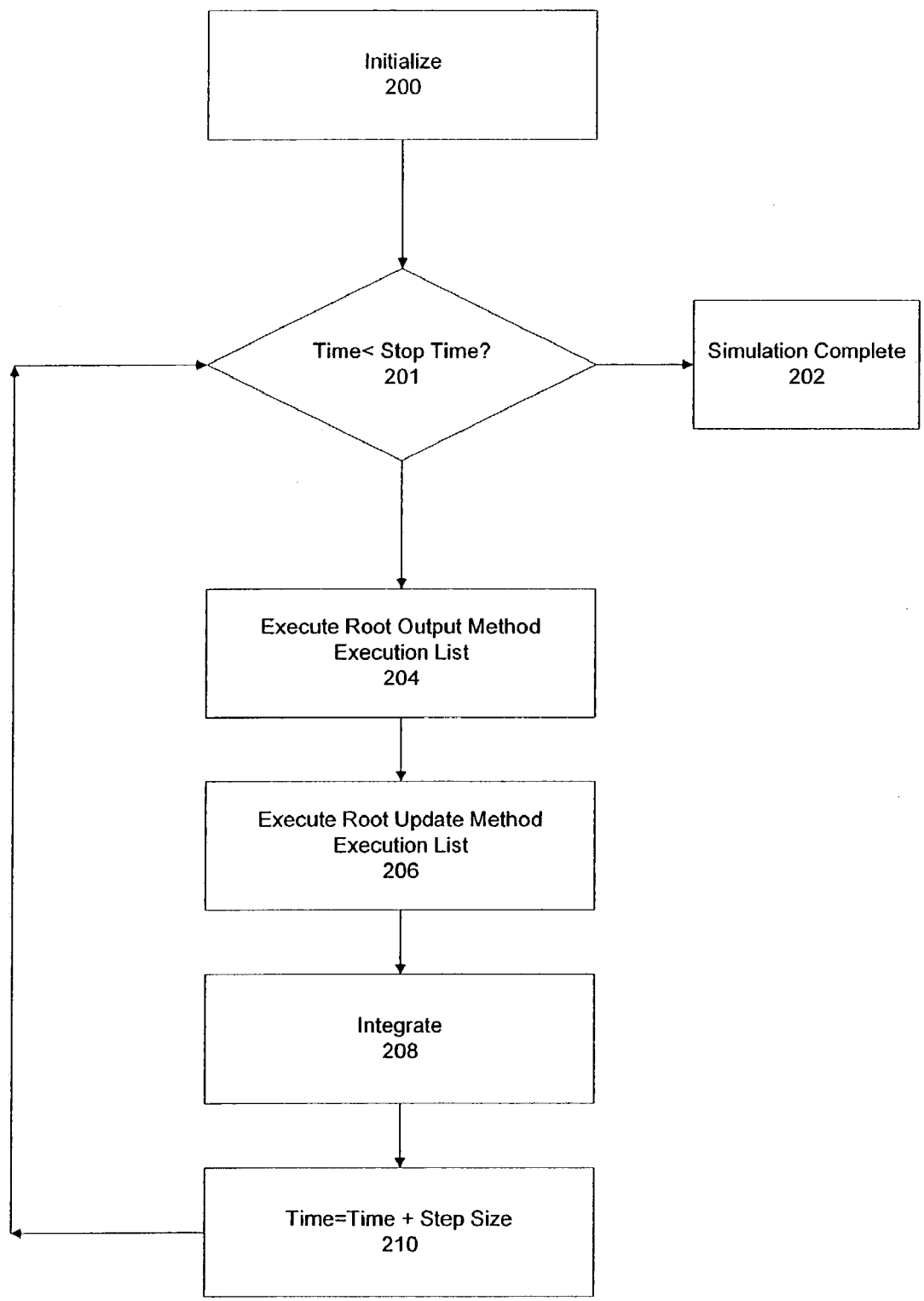
FIG. 10 is a flowchart of the sequence of steps followed by a single-tasking execution loop.

In a single-tasking SimLoop, there is essentially a single execution time-line. On this time-line, each block is executed when it has a sample hit. A sample hit is defined to an execution time instant that is an integer multiple of the block's sample time. To aid in execution, execution lists are constructed for each method type. FIG. 10 depicts the sequence of steps followed by a single-tasking execution loop. Following initialization (step 200), a time parameter is checked to see if the current time is less than the stop time (step 201). If the time is not less than the stop time, the simulation ends (step 202). If the time is less than the stop time, the simulation continues and the root output method execution list is executed (step 204). Following execution of the output method list (step 204) the update method execution list is executed (step 206). Following the performance of an integrate step (208) (the Integrate step is described more below in FIG. 14), the time parameter is incremented by the applicable step size (step 210).

Figure 11A:
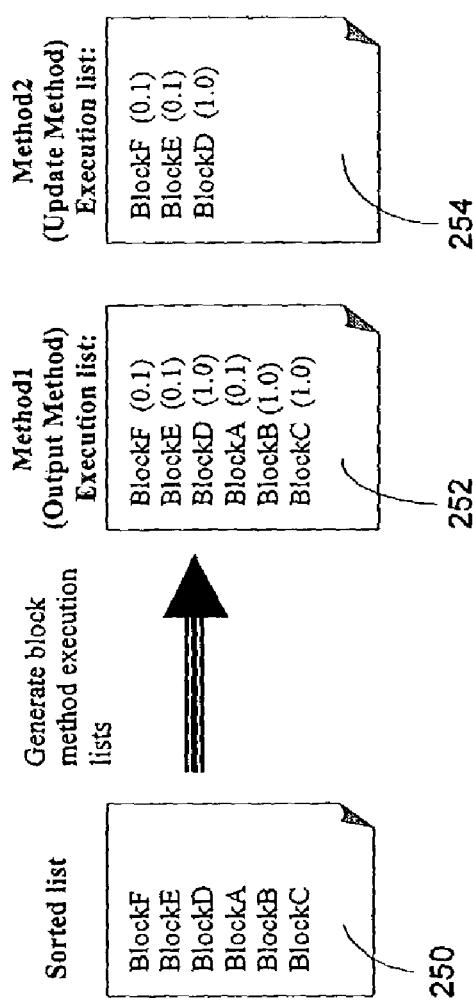
FIG. 11A depicts the creation of execution lists from sorted lists in single task mode.

Blocks are arranged in the single-tasking execution lists in the sorted order as shown in FIG. 11A. A sorted list 250 is used to generate an Output method execution list 252 and an Update method execution list 254. Referring back to the example in FIGS. 7 and 8, the engine sequentially steps through and execute each block in the block method execution list when the execution time divided by the sample time equals an integer number (1, 2, 3, 4, etc.). At time zero ($T_0$), all the blocks are executed. This involves executing the Output methods for blocks F, E, D, A, B, and C (in this order as dictated by the sorted list) and then executing the Update methods of blocks F, E, and D (again, in this order based on the sorted list). The execution time then is then incremented by step size, which in this case is assumed to be 0.1 seconds. Execution then commences once again at the top of the loop for T=0.1 ($T_{0.1}$). Blocks F and E have a sample time of 0.1 seconds and have a sample hit (0.1÷0.1=1, sample time is an integer multiple of the execution time), so the output block methods for Blocks F and E are executed. Block D, however, has a 1.0 second sample time and has no sample hit (0.1÷1.0=0.1, sample time is not an integer multiple of the execution time), so its output block method is not executed (essentially it is skipped). Block A, like Blocks F and E, has a 0.1 second sample time and so its output block method is executed. Blocks B and C, like Block D, have 1.0 second sample times and are skipped during this iteration of the simulation loop, which completes execution of the output block method execution list for $T_{0.1}$.

The execution timing of the example block diagram in single task mode is shown in the first time-line of FIG. 11B. In this diagram, note that the execution-time is not synchronized with real-world time. Instead, execution time progresses as fast as it can in real-world time. The sorted list 259 is executed on the time-line 260. The methods in the list 262 are executed at the appropriate time step 264. Block diagram modeling software can also allow users to simulate real-world conditions by synchronizing execution time with real-world time. Such execution is illustrated in the second timing diagram of FIG. 11B. The methods 262 are implemented at a time-step 264 synchronized with real world time on the time line 270.

Figure 12A:
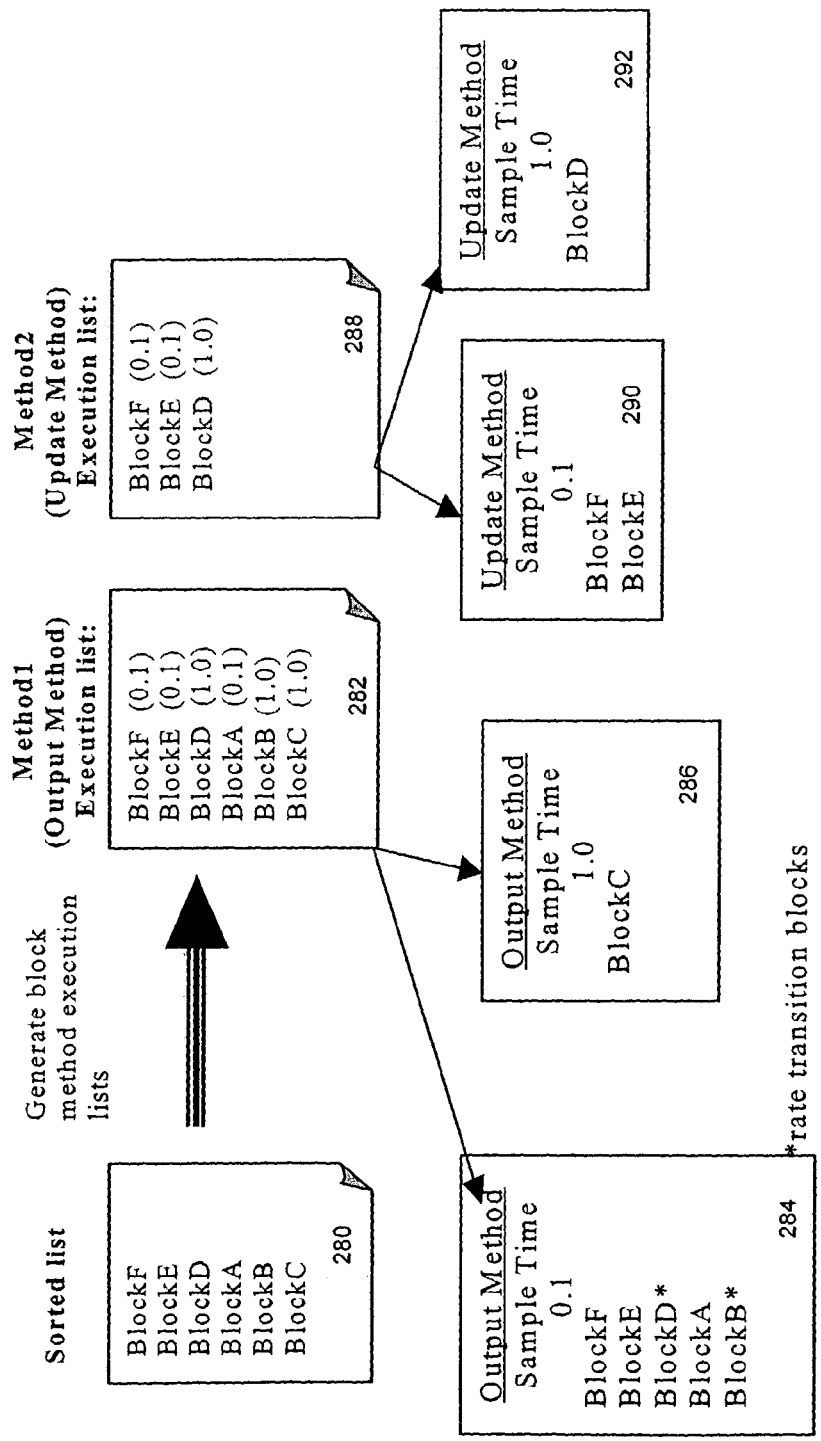
FIG. 12A depicts the creation of execution lists from sorted lists in multi-task mode.

In multitask mode, the engine performs execution along multiple time-lines based upon the number of block sample times used in the mode as shown in the flowchart of FIG. 13. In the example of FIGS. 7 and 8, the model's blocks have a sample time of either 0.1 seconds or 1.0 second. This implies that the engine runs one set of blocks along a 0.1 second time line and another set of blocks along a 1.0 second time line. In order to run in multitask mode, the execution lists are first divided on the basis of methods (as in single-tasking mode) and then subdivided again based upon block sample times. This is illustrated in FIG. 12A. The sorted list 280 is used to generate an output method execution list 282 and update method execution list 288. The output method execution list 282 is split into two separate list execution lists 284 and 286 based on sample times. Similarly, the update method execution list 288 is divided into two update method execution lists 290 and 292 based on sample times.

The execution engine uses the divided execution lists to create multiple execution time lines. In the multitask mode the engine places a higher execution priority on the faster sample time blocks than the slower sample time blocks. This prioritization is carried out by assigning Task Identification Numbers (TIDs) to each execution list; the higher the priority, the lower the TID. For example, a TID of 0 executes at a higher priority than a TID of 1, and so forth. Furthermore, because, during execution in multitask mode, execution transitions between the faster and slower blocks, and vice-versa, the multitask mode requires rate transition blocks that allow the model to transition from blocks running at fast sample times, in our example 0.1 seconds, to slower samples times, e.g., 1.0 seconds. The rate transition blocks are required to correctly simulate how a multi-rate system would behave in a real-time environment. To provide this transition, the engine promotes rate transition blocks to the TID of the fast block for which transition is being provided, although the engine executes these rate transition blocks at their slower rate. This is why Blocks D and B appear in the 0.1 sample time output method execution list in FIG. 12A.

Figure 12B:
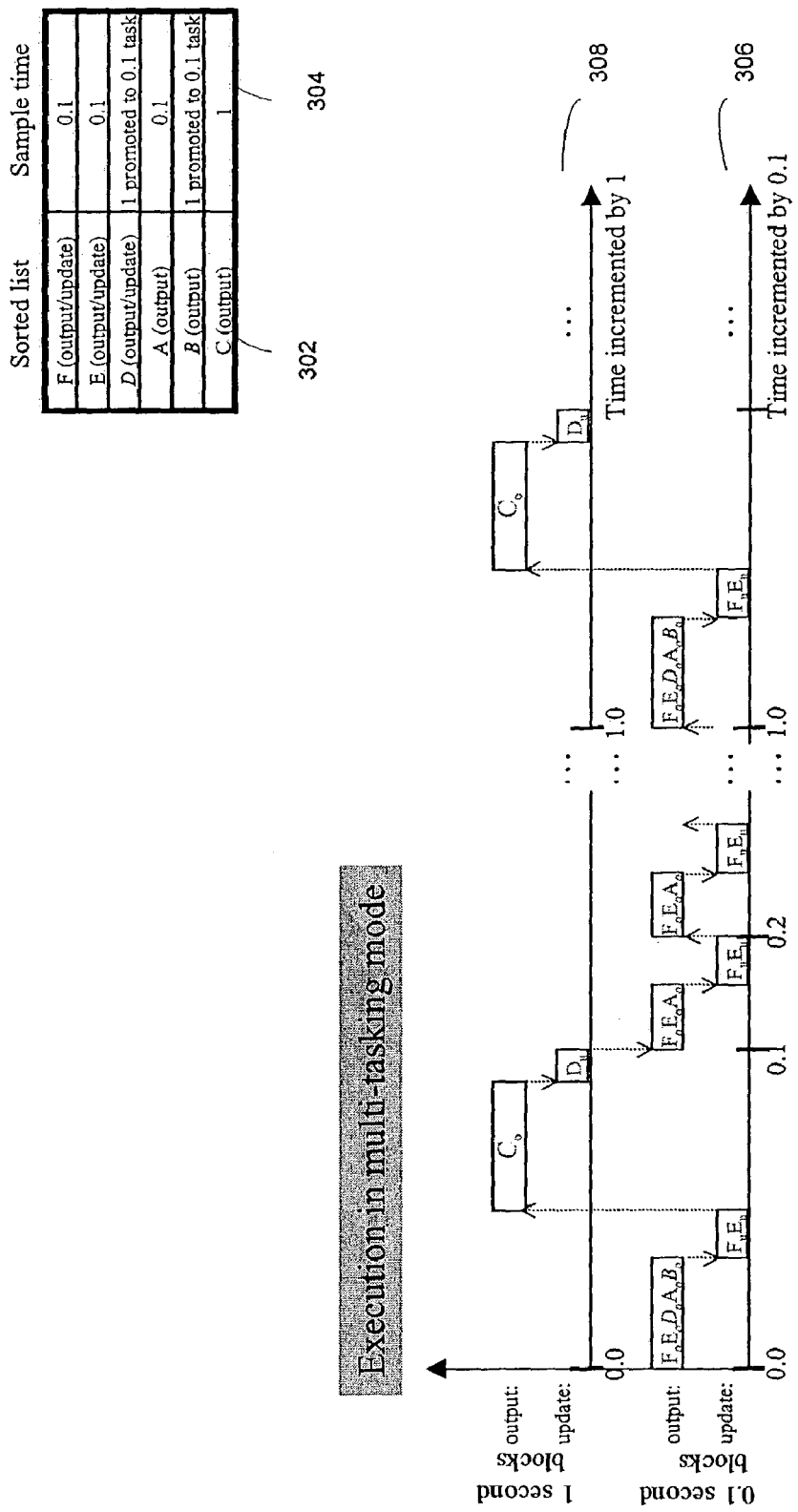
FIG. 12B depicts the execution timing of block diagrams in multi-task mode.

The execution of our example in the multi-task mode may be seen in FIG. 12B. At time T=0, the engine first executes the high priority output methods (those with TID 0) for Blocks F, E, D, A and B, then it executes the high priority update methods (those with TID 0) for Blocks F and E. After finishing the high priority blocks, the engine executes the lower priority output block methods (those with TID 1) for Block C, and then executes the lower priority update methods (those with TID 1), which, in this example, is Block D. In contrast to the single task mode, in multitask mode the engine runs through a TID inner loop to execute the output and update block methods before going on to the Integration step, as the flow chart in FIG. 13 which is discussed below illustrates.

As a result of the inner TID loop, as well as the segregated block method execution lists, the order of execution in multitask mode differs from the order of execution in single task mode. Recall for the example that in single task mode that the order of execution at T=0 is: $F_o, E_o, D_o, A_o, B_o, C_o, F_u, E_u$, and $D_u$, where the subscript "o" stands for output method and the subscript "u" stands for update method. In the multitask mode, however, the order of execution at T=0 is: $F_o, E_o, D_o, A_o, B_o, F_u, E_u, C_o$, and $D_u$. Notice that $C_o$ is executed in a different order in multitasking mode. This occurs because separate method execution lists (based upon sample time) are created and run in order from fasted sample time to slowest sample time. Additionally, the use of rate transition blocks restricts the connection of blocks with different rates. By requiring the insertion of these blocks into the model, the engine ensures that execution in multitask mode will follow the sorted list.

After it is finished executing the block methods for T=0, like in the single task mode, the execution time is incremented (again assume by 0.1 seconds) and execution goes to the beginning of the loop. The engine executes $F_o, E_o, A_o, F_u$, and $E_u$, and the engine does not execute the block methods of Blocks D, B, and C because the current execution time is not an integer multiple of those block's sample time. The engine repeats this execution until the execution time is incremented to 1.0 seconds, whereupon execution occurs in the same manner as described for T=0. The engine repeats this overall process until the execution stop time is reached.

FIG. 12B shows two time-lines; the lower time-line 306 represents the execution order of the faster sample time blocks (Blocks A, E, and F), along with the rate transition blocks (Blocks B and D), while the top time-line 308 shows the execution order of the slower sample time block (Block C), and the rate transition (Block D) update method. The time-lines are generated from the sorted list 302 and the associated sample times 304. The lower line, representing the faster sample times has a TID of 0, and the top line has a TID of 1. For execution time T=0, the chart shows that the engine executes the output methods for Blocks F, E, D, A, and B (designated on the chart as $F_o$, $E_o$, $D_o$, $A_o$, $B_o$). Then, consistent with the flow chart for the multi-tasking mode (see FIG. 13 discussed below), the engine executes the update block methods for Blocks F and E (designated $F_u$, and $E_u$). Once the engine is finished with the high priority block methods, the output method for Block C ($C_o$) and the update method for rate transition block D ($D_u$) are executed. The execution time is then incremented by the step size (continue to assume 0.1 seconds) and the blocks that have a sample hit are executed. The figure shows execution of $F_o$, $E_o$, $A_o$, $F_u$, and $E_u$, which is repeated, as noted above, until execution time equals 1.0 second. Notice, like in the non-real-time case for Single-task mode, the engine does not wait for time to elapse; rather it executes block methods immediately upon completion of the previous pass through the loop.

FIG. 13 shows the overall sequence of steps taken by Simulink in multitask mode. Following initialization (step 220), the output method execution list is executed for the fastest sample time (step 222). The update method execution list is then executed for the fastest sample time (step 224). A time time parameter is checked (step 225) to determine to determine if the time is less than a designated stop time. If the stop time has been reached, the simulation completes (step 226). Otherwise, the integrate stage (step 228) is performed. The task ID variable is incremented (step 230) and compared to a parameter of the number of sample times (step 231). If the task ID is less than the number of sample times, the output method execution list for the methods assigned the new task Id are executed (232) followed by the execution of the update method execution list assigned the new task ID (step 234). The task ID variable is incremented and the process iterates with the task ID being compared to the number of sample rate times (step 231). When the task ID number is determined to equal the number of sample rate times, the simulation time is incremented (step 238) and the entire process iterates with the output method list execution list (step 222) being executed for the fastest sample times. The process continues until the end of simulation when the time equals the stop time (step 226).

In order to understand how the step size is picked within SimLoop, it is first necessary to understand the notion of a solver. The solver is a module of the execution engine that is responsible for performing two tasks: (a) determining how far execution time should be advanced between consecutive passes through the SimLoop in order to accurately trace the system's outputs, and (b) integrating the derivative of the states of the system to obtain the actual states. Based on how solvers performs the first task, they are generally classified into two basic classes: Fixed-step solvers or Variable-step solvers.

Fixed-step solvers are solvers in which the time step-size between consecutive passes through the SimLoop is a fixed quantity. The user generally explicitly specifies this quantity. These solvers are used to model types of systems that must operate within a defined time (discrete systems). For instance, an anti-lock braking system may be designed to control a car's braking system, and to execute such control in one-one hundredth (0.01) of a second so as to assure the car stops safely; if the braking system does not meet its timing constraints, the car may crash. Fixed-step solvers, therefore, are designed to help model discrete systems that have to generate a result in a fixed time period, and the fixed-step execution assures that the modeled system can generate such results.

Variable-step solvers are designed to model continuous systems where non-evenly spaced time steps are needed to simulate all significant behavior. For example, one may want to simulate the path of a bouncing ball, where it bounces, how high it bounces, and where it stops. It is known, based on experience, that the ball's bounces will not be evenly spaced, and that the height of the bounces will diminish as a result of gravity, friction, and other forces. Variable-step solvers are used for these types of continuous systems and to determine what step size to use so that the behavior of the ball will be accurately modeled.

The two broad classes of solvers are further subdivided based on the integration task they perform. There are several algorithms for carrying out numerical integration. The particular choice of the integration algorithm gives rise to the subclasses of solvers.

Figure 14:
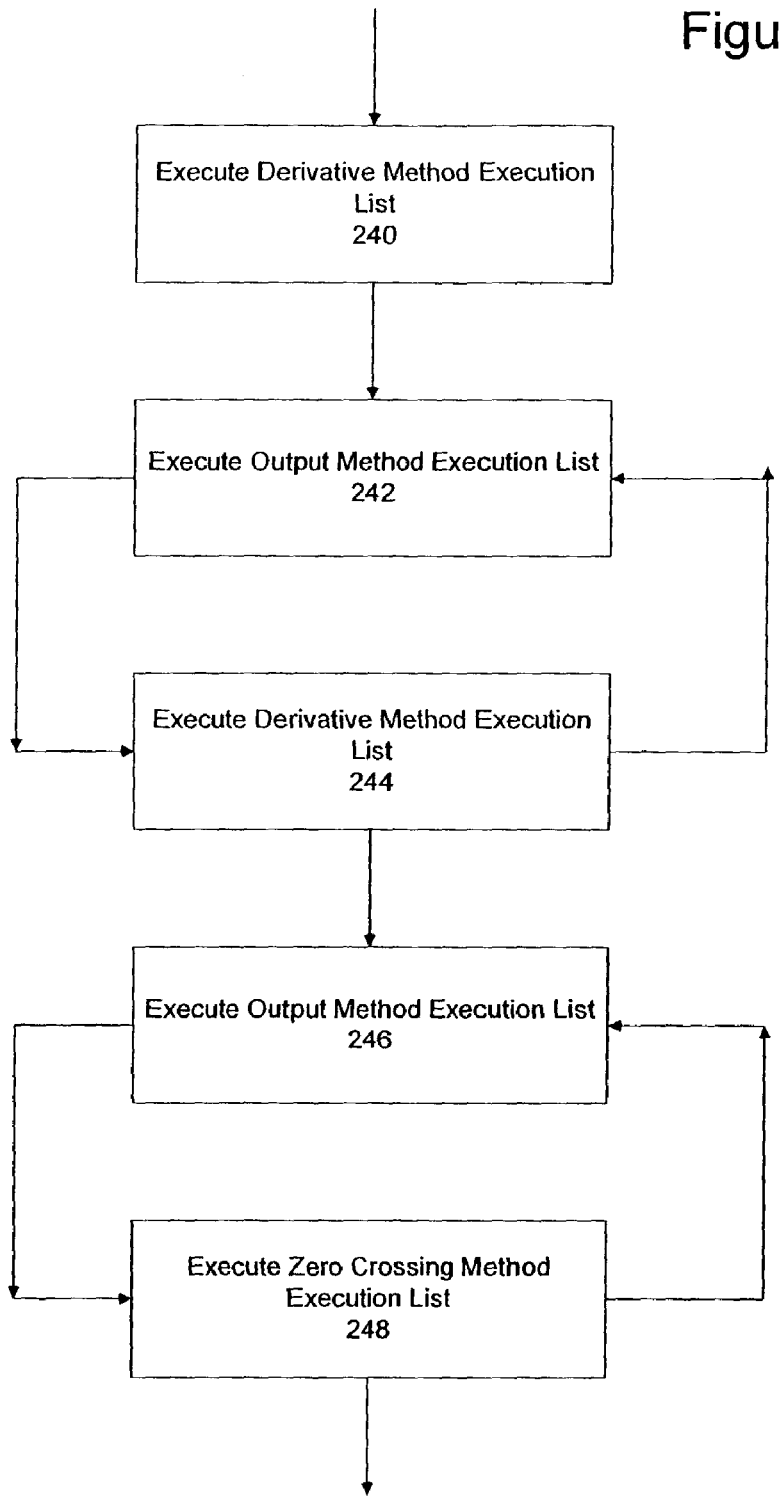
FIG. 14 is a flowchart of the sequence of steps followed by a variable-step solver.

The difference in the conceptual definition of Fixed- and Variable-step solvers leads to the functional difference in the context of the SimLoop. The major difference between the solvers arises in the Integrate step of the SimLoop which is depicted in FIG. 14. During the Integrate step, the Variable-step solver executes the Output and Derivative block method lists for a number of iterations that varies based on the solver subclass (i.e., the numerical integration algorithm it uses) and integration error tolerances. In a fixed-step solver, the number of iterations is fixed for a given solver subclass. Another difference between solvers arises in the Integrate phase in the context of an operation known as zero-crossing detection. Zero-crossings in the derivatives of the state generally indicate a discontinuity in the states themselves. Because discontinuities often indicate a significant change in a dynamic system, it is important to trace the system outputs precisely at such points. Otherwise, the outputs of the model could lead to false conclusions about the behavior of the system under investigation. Consider, again the example of the bouncing ball. If the point at which the ball hits the floor occurs between simulation steps, the simulated ball appears to reverse position in midair. This might lead an investigator to false conclusions about the physics of the bouncing ball. To avoid such misleading conclusions, it is important that the execution has time steps on and around the vicinity of discontinuities.

In the case of Fixed-step solvers, there is no notion of zero-crossing detection and one is not guaranteed to find all points of discontinuity. One can only keep reducing the step-size to increase the probability of hitting the discontinuity. Contrastingly, in the case of Variable-step solvers, the Integrate step explicitly includes zero-crossing detection. The execution step size is then adjusted accordingly to ensure that discontinuities are tracked accurately. To enable zero-crossing detection, blocks that can produce discontinuities instantiate a special execution method. This method registers a set of zero-crossing variables with the execution engine, each of which is a function of a state variable that can have a discontinuity. The zero-crossing function passes through zero from a positive or negative value when the corresponding discontinuity occurs. During the zero-crossing detection phase of the Integration step, the engine asks each block that has registered zero-crossing variables to update the variables for the projected time of the next time step. These variables are then checked for a change of sign since the current step. Such a change indicates the presence of a discontinuity. An iterative process then tries to narrow down the location of the discontinuity and ensure that the next few time steps (at least 2) accurately bracket the location of the discontinuity. The final difference, which is in the step-size during execution, is a direct consequence of the two previous differences in the step-size determination. In Fixed-step solvers, the step size is a known and fixed quantity. For Variable-step solvers, the step size is determined during the integration iterations and the zero-crossing detection that happens during the Integration step.

An example of the variable-step solver is shown in FIG. 14, the derivative method execution list is executed (step 240) followed by the output method execution list (step 242). The derivative method execution list is then executed again (step 244) and the solver iterates between the execution of the output method execution list (step 242) and the execution of the derivative method execution list (step 244). A similar iteration loop then occurs between the execution of the output method execution list (step 246) and the execution of the zero-crossing method execution list (step 248). Note that Simulink also includes other methods such as Projections and Jacobians in this step as needed.

While it is theoretically possible to have Variable-step solvers in the context of multitasking, such a combination is not employed in practice. This is because the step-size for such solvers can become very small making it impossible to keep up with the real-time constraint that generally goes along with multitasking execution. An added complication is that the integration step in such solvers is iterative and takes varying amounts of time at each step of the execution. Therefore, Variable-step solvers are generally used only in conjunction with the Single-Tasking SimLoop. Additionally, they are not usually employed in systems that need to operate in real-time.

When a model contains an algebraic loop, the engine calls a loop solving routine at each time step. The loop solver performs iterations and perturbations to determine the solution to the algebraic condition (if it can). One possible approach to solving the algebraic equation F(z)=0, is to use Newton's method with weak line search and rank-one updates to a Jacobian matrix of partial derivatives. Although the method is robust, it is possible to create loops for which the loop solver will not converge without a good initial guess for the algebraic states z. Special blocks are generally provided to specify an initial guess of the states in the algebraic loop.

In addition to the various forms of the SimLoop, modeling packages such as Simulink use the output of the Link stage to compute linear models through a process generally referred to as model linearization. These linear models may be used in the SimLoop at various points in the execution of the overall model. Alternatively, the linear model may be returned to the user. The linearization process involves the use of a Jacobian method defined on blocks and numerical Jacobian algorithm.

Information related to the compiled block diagram may be presented to users in an automatically generated report. This report allows users to quickly obtain documentation of the functional description of their model. Information related to the execution of a particular model (such at the time taken to execute various portions of the model and the coverage of various portions of the model) may be obtained automatically and presented to the user as a report.

In the absence of Conditionally-Executed Subsystems ("CE-Subsystems"), the time interval between successive executions of blocks would be strictly based upon their sample times. Even for a block with continuous sample time, it is the sample time information which dictates that the block executes at every time step of model execution. In the case of modeling software such as Simulink, CE-Subsystems offer a powerful modeling capability whereby one can impose finer execution-time control on block execution in addition to the specification of sample times. In the case of a block inside an Enabled or Action Subsystem, the sample time indicates the interval between block executions once the Subsystem has actually been activated. To capture this concept, such a Subsystem is generally implemented to contain a separate sorted list for its constituent blocks. Additionally, there are also separate execution lists created for the methods of blocks inside such subsystems both for Single- and Multi-Tasking execution. In the case of Triggered, Enabled-and-Triggered, or Function-Call Subsystem, the block executes once when the Subsystem is explicitly called after a triggering or calling event. Therefore, a block inside such a Subsystem is not permitted to have an explicit sample time associated with it. Instead, the sample time for the block is designated to be a special triggered sample time (an "aperiodic" sample time). Execution of the block is completely controlled not by a sample time but rather is controlled by a calling event.

Figure 15:
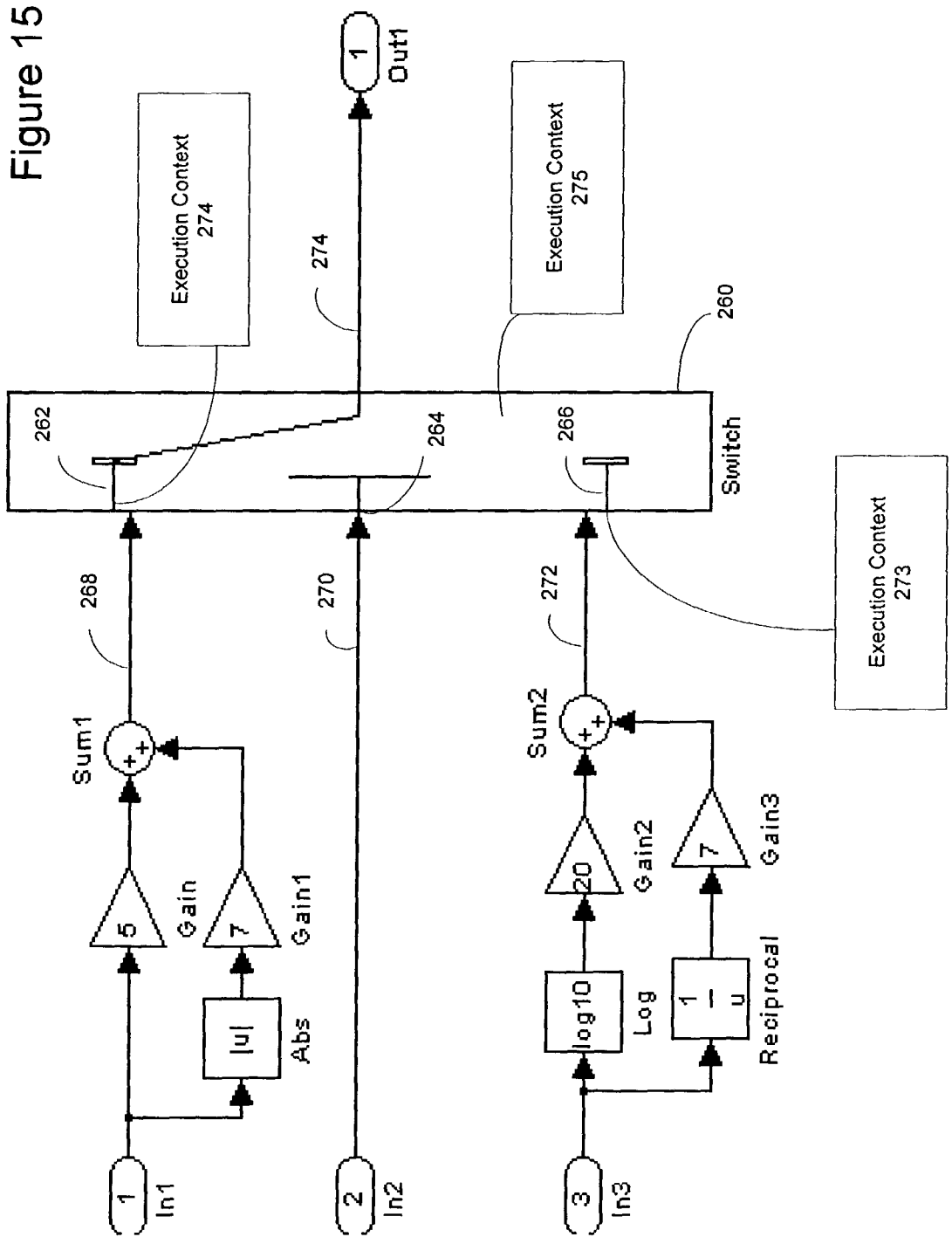
FIG. 15 depicts a block with conditional inputs.

Certain blocks do not require all of their input signals every time they execute. An example of a block with conditional inputs is shown in FIG. 15. In FIG. 15, the Output method of the Switch block 260 copies the input signal 268 at the first port 262 to the output 274 when the input signal 270 at the second port 264 is greater than or equal to zero. When the input signal 270 at the second port 264 is less than zero, the Output method copies the input signal 272 at the third port 266 to the output 274. Therefore, every time the block 260 executes, the Output method only reads from either the signal 268 at the first input port 262 or the signal 272 at the third input port 266, never both. Blocks of this type are said to have conditional inputs based on the fact the block's input signals are conditionally required in its execution methods.

Figure 16:
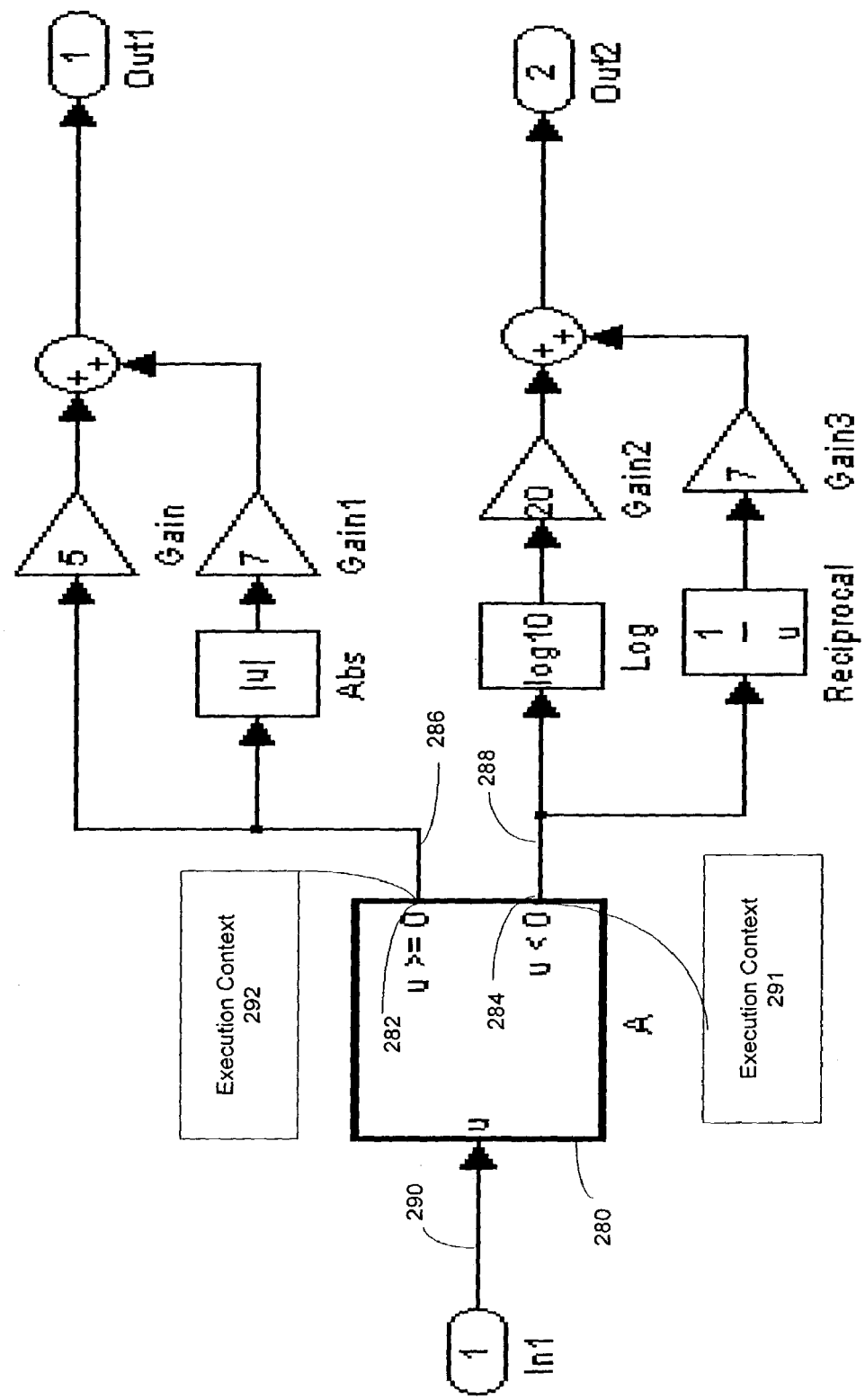
FIG. 16 depicts a block with conditional outputs.

A block may also not recompute all of its output signals every time it executes. An example of a block with conditional outputs is illustrated in FIG. 16. In FIG. 16, the Output method of block A 280 recomputes either the output signal 286 at the first output port 282 or the output signal 288 at the second output port 284, never both. The first output signal 286 is recomputed when the input signal 290 is greater than or equal to zero, and the second output signal 288 is recomputed otherwise. Block A 280 is said to have conditional outputs based on the fact that its outputs 286 and 288 are conditionally computed.

Historically, time-based block diagram modeling software such as Simulink has used sample times and (more recently CE-Subsystems) to control the relative frequency with which individual block methods execute in a block diagram model. This approach has a number of drawbacks. The use of block sample times and CE subsystems to control the relative frequency of block execution promotes non-modular design of Subsystems by forcing users that want to tie the execution of one Subsystem (or non-virtual block) to the execution of another CE-Subsystem to place the first Subsystem (or non-virtual block) within the CE-Subsystem. Users may be left with little choice other than to adopt a non-modular design in order to get the desired overall system behavior. This is especially problematic in modeling that is carried out across a large work-group with individual sub-groups of users responsible for building, testing, and debugging sub-modules of a large system. Attempts to preserve modularity (without modifying the behavior of their overall system) may come at the expense of inefficiency in both Interpreted and Generated code executions. The inefficiency occurs because the first Subsystem (or non-virtual block) executes at its sample time and not just when the CE-Subsystem executes.

The use of sample times and CE subsystems to control the relative frequency of block method execution also promotes non-modular design of custom blocks and prevents re-use of simpler non-virtual blocks in system design. When users need to tie the execution of a set of block methods to the execution of a non-virtual block's methods, they are forced to rebuild a custom block that encompasses the functionality of all of the blocks. Users may once again be left with little choice other than to adopt such a design to get the desired system behavior. Inefficiency similar to that found in CE-Subsystems is also observable when users choose to preserve modularity when dealing with blocks whose execution needs to be tied to a non-virtual block.

The illustrative embodiment of the present invention addresses the drawbacks inherent in the use of block sample times and CE subsystems through the concept of Execution Contexts (EC). An EC is a data structure for a group of blocks that all execute when an associated pre-condition is satisfied. Blocks may inherit and define ECs, just as prior modeling software allowed inheriting and defining sample times in blocks. EC information may also be propagated throughout the block diagram allowing blocks to opt into or out of an EC's grouping. ECs are not confined to time-based block diagrams and may be extended to provide execution efficiency in the context of data flow and other block diagram models.

An Execution Context may be defined to be a hierarchical partitioning of a block diagram into groups of blocks that execute only when a pre-condition is fulfilled. An Execution Context (EC) may be viewed as the generalization of the notion of a CE-Subsystem; the generalization being removal of the restriction that the execution pre-condition is associated strictly with a subsystem. Similar to CE-Subsystems, ECs can be nested within each other to obtain arbitrary levels of hierarchy. Unlike a CE-Subsystem, which imposes the implicit restriction that blocks have to live within the Subsystem to execute in accordance with a pre-condition, an EC may be associated with any block as an explicit attribute (similar to sample times).

Each block in the block diagram is parented by one of the ECs created in the block diagram. A block's EC information may be thought of as a block attribute similar to its sample time. A particular block executes only when the pre-condition of its parent EC is satisfied, activating the EC. Furthermore, the block executes in accordance to its sample time once its parent EC has been activated.

As discussed previously, there are deficiencies in the degree to which one can control block execution just by using sample times and CE-Subsystems. An examination of those deficiencies through a series of example systems is useful to demonstrate how the deficiencies are overcome by the use of Execution Contexts.

CE-SUBSYSTEM EXAMPLE 1

Figure 17A:
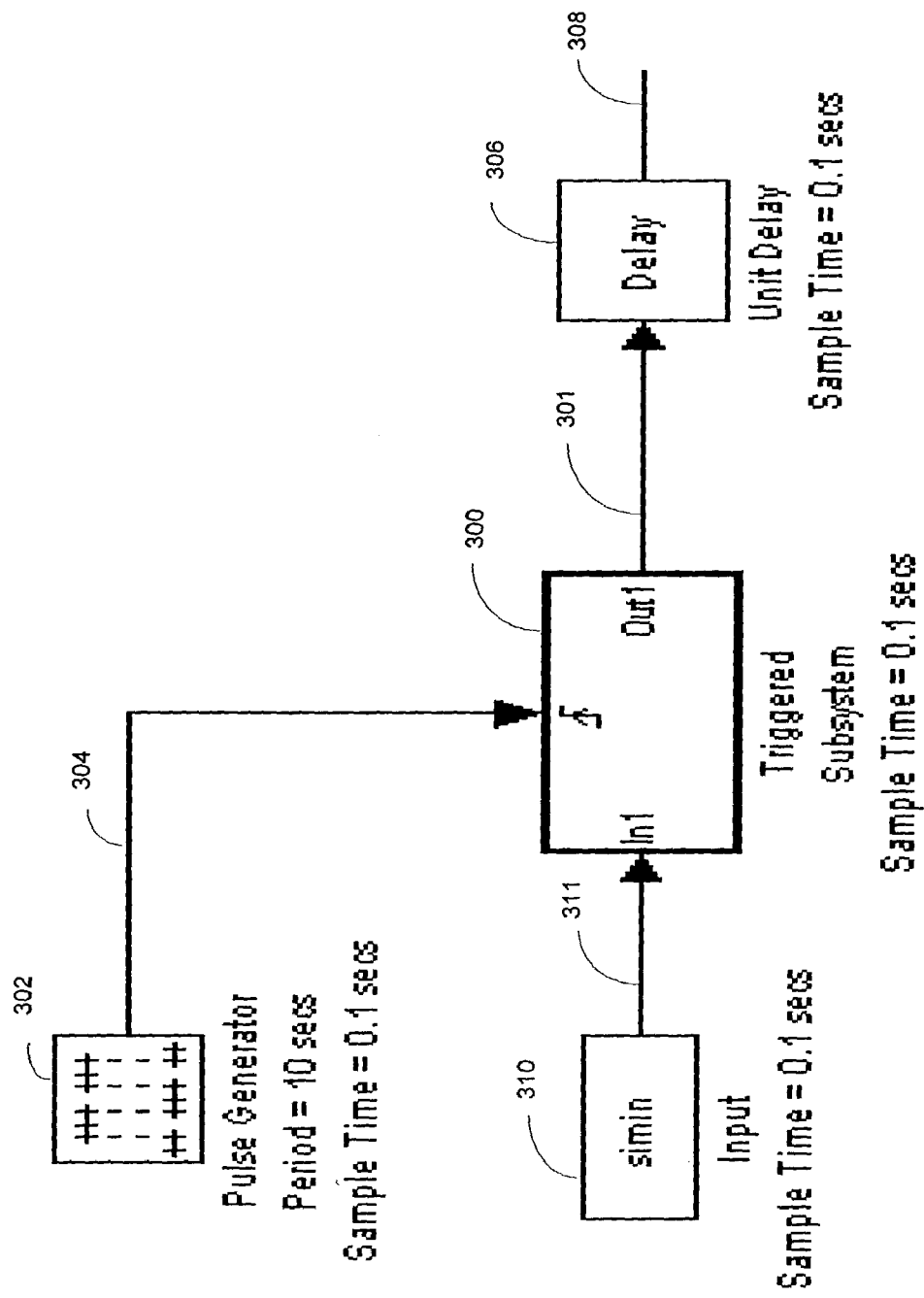
FIG. 17A depicts a conditionally executed subsystem.

FIG. 17A depicts a CE subsystem. A pulse generator block 302 with a period of 10 seconds and a sample time of 0.1 seconds generates a pulse signal 304 which acts as the trigger for a triggered subsystem 300. An input block 310 provides an input signal 311 for the triggered subsystem 300. The triggered subsystem 300 provides an output signal 301 which is fed into a delay block 306 with a sample time of 0.1 seconds. The delay block 306 then outputs the delayed signal 308. The Unit Delay block 306 always executes at 0.1 seconds producing the result shown in the third plot of FIG. 18B when the pulse and input signals are as shown in the first and second plots of FIG. 18B.

Figure 17B:
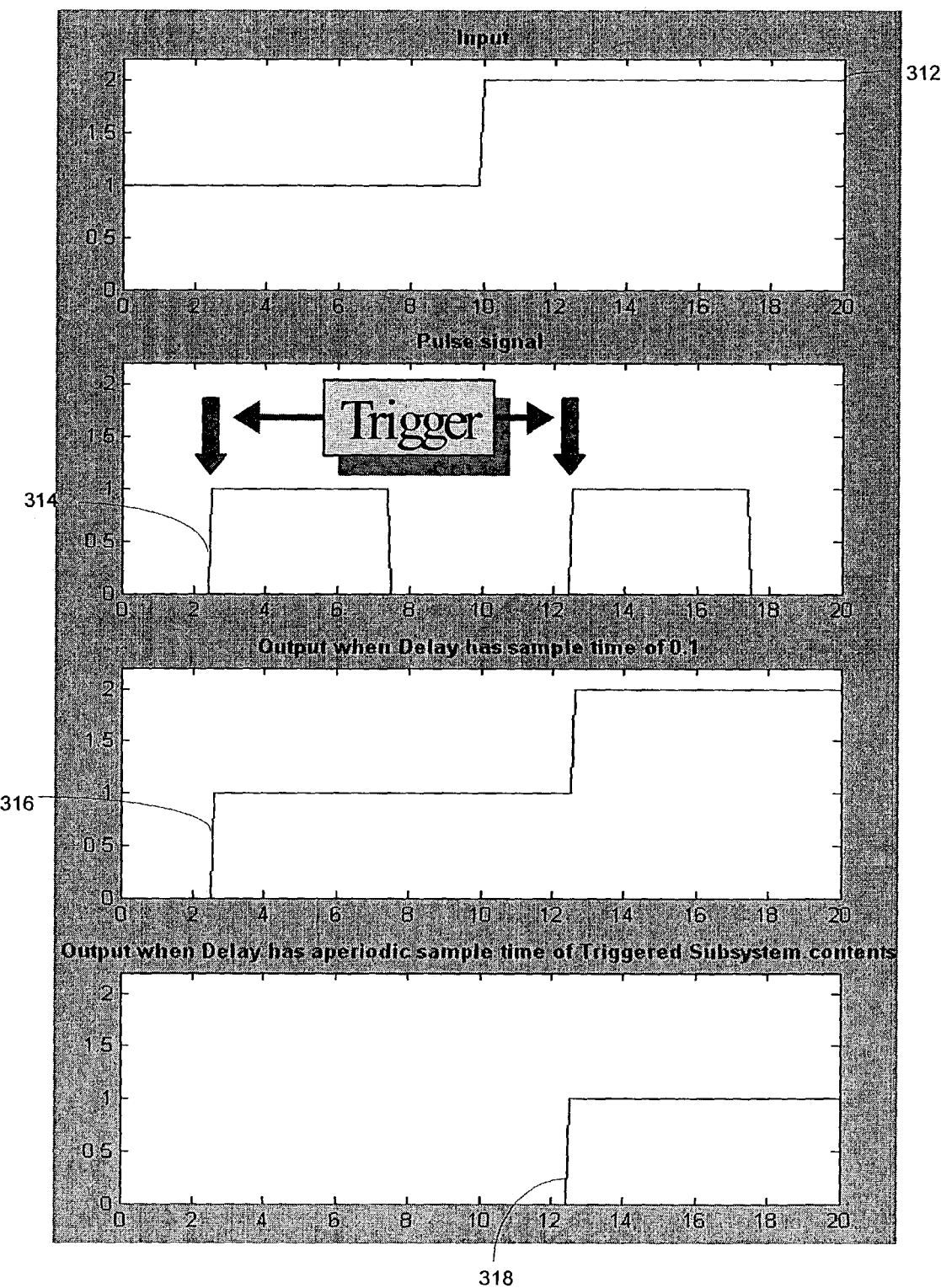
FIG. 17B depicts the signals generated by the subsystem of FIG. 17A.

FIG. 17B depicts the signals produced by the CE subsystem of FIG. 17A. The Triggered Subsystem 300 is triggered on the rising edge 314 of the pulse signal 304 produced by the Pulse-Generator block 302 with a sample time of 0.1 seconds. Since the pulse signal has a period of 10 seconds as shown in the second plot of FIG. 17B the Triggered Subsystem's constituent blocks execute once every 10 seconds. The Unit-Delay block 306 inherits a sample time of 0.1 seconds from the trigger signal of the Triggered Subsystem 300, and therefore, executes every 0.1 seconds. Therefore, its output 316 is as shown in the third plot of FIG. 17B when the input signal 312 is as shown in the first plot of FIG. 17B, and the Triggered Subsystem simply acts as a pass-through block. Note that the Unit Delay is delaying the signal at the output of the Triggered Subsystem by 0.1 seconds. Problems arise however if the modeler desired not to simply delay the signal at the output of the Triggered Subsystem by 0.1 seconds, but instead wanted to delay the output signal by the time spacing between consecutive calls to the Triggered Subsystem. In other words, problems arise if the modeler wanted to associate the Unit Delay with an aperiodic sample rate corresponding to the time instants at which the Triggered Subsystem 300 executes. An aperiodic Unit Delay would produce the result shown in the fourth plot of FIG. 17B. Currently, barring an explicit move of the Delay block 306 into the Triggered Subsystem 300 by the user, there is no modeling capability in time-based block diagram software to achieve the result 318 of the fourth plot in FIG. 17B. Moving the delay block into the subsystem violates modular design principles. Those skilled in the art will recognize that while the current example is made with reference to a Triggered Subsystem, all classes of CE-Subsystems have the same drawback associated with them.

A similar problem arises when the Unit Delay is replaced by a Subsystem that has state information which is maintained from one time instant of execution to the next. Therefore, to get an effective aperiodic sample rate associated with such a Subsystem, one would have to move the Subsystem into the Triggered Subsystem. If different work groups are responsible for building the two Subsystems, this would be problematic and would require frequent integrations between the two groups.

The illustrative embodiment of the present invention uses an Execution Contexts to overcome the problems illustrated in FIG. 17B. An EC may be setup to represent the contents of the Triggered Subsystem 300. The user specifies (in a manner discussed below) that the Unit Delay block 306 should inherit its EC via its input lines. The Unit Delay block 306 would then inherit its EC attribute from the Triggered Subsystem 300. During execution, the Unit Delay block 306 will execute when its parent EC, which corresponds to the Triggered Subsystem 300, is activated. The Unit Delay would then produce the result 318 shown in the fourth plot of FIG. 17B. Alternatively, the user could also choose to specify that the Unit Delay block 306 cannot inherit its EC. In this case, the Unit Delay block 306 would not execute in the EC corresponding to the Triggered Subsystem 300 and would produce the result 316 shown in the third plot of FIG. 17B. It should be noted that the user can choose the desired behavior (either third or fourth plot of FIG. 17B based on the specific modeling requirement.

CE-SUBSYSTEM EXAMPLE 2

Figure 18:
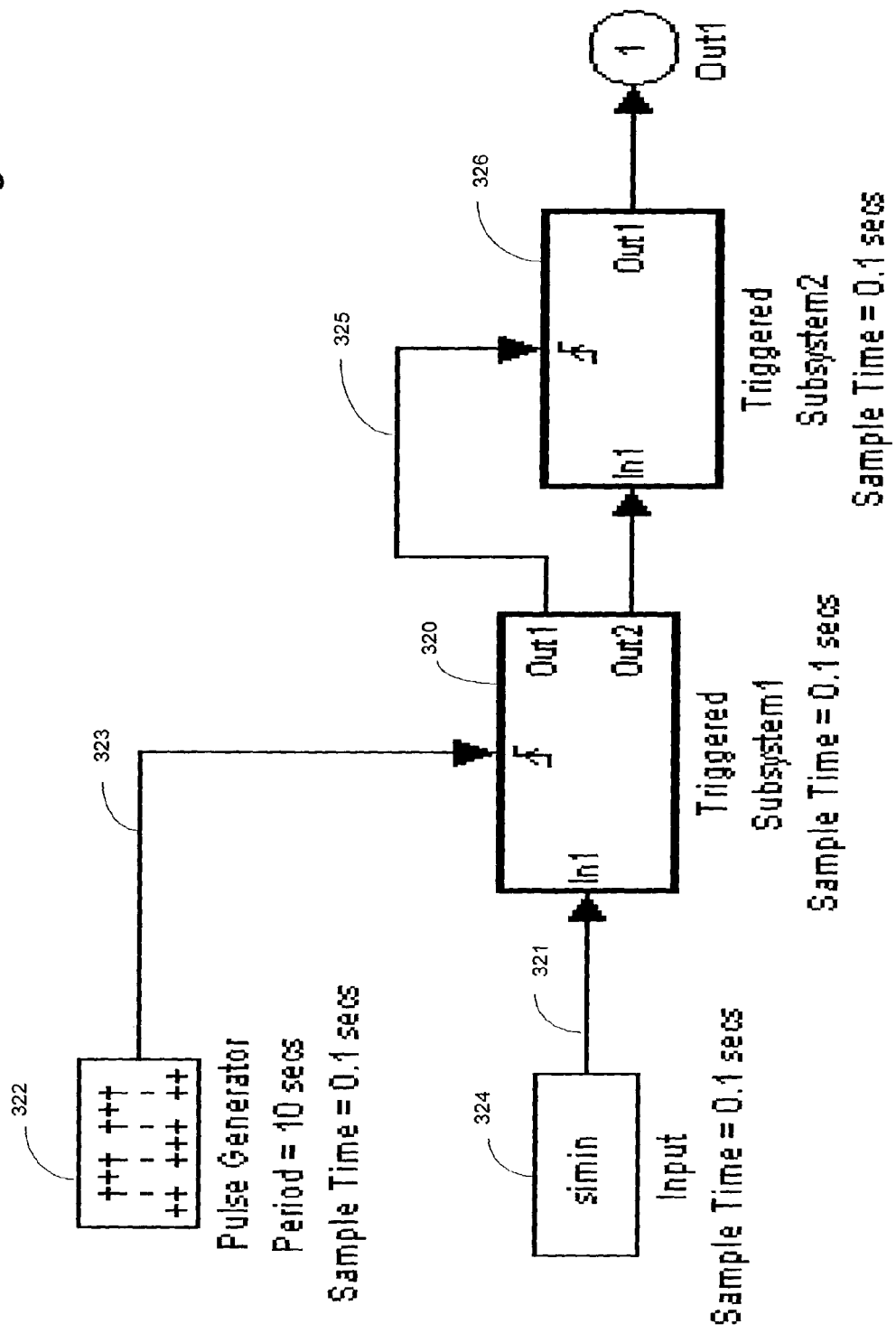
FIG. 18 depicts two connected subsystems.

FIG. 18 depicts two connected subsystems. A Triggered Subsystem1 320 receiving a signal 321 from an input block 324 is triggered on the rising edge of the pulse signal 323 produced by the Pulse-Generator block 322. The pulse generator block 322 has a sample-time of 0.1 seconds. Since the pulse signal 323 has a period of 10 seconds, the Triggered Subsystem1's constituent blocks execute once every 10 seconds. A Triggered Subsystem2 326 inherits a sample time of 0.1 seconds from the trigger signal of the Triggered Subsystem1 320, and therefore, executes every 0.1 seconds. This implies that the triggering pre-condition 325 for Triggered Subsystem2 is checked every 0.1 seconds. This is inefficient because the Triggered Susbsytem2 326 can see a triggering condition only when Triggered Subsystem1 320 executes (which is once every 10 seconds). The triggering pre-condition for Triggered Subsystem2 is checked unnecessarily even at time instants where the Triggered Subsystem1 did not execute. The solution in the prior art for getting execution efficiency is to build Triggered Subsystem2 inside Triggered Subsystem1 raising the same modularity issues encountered in the previous example. Execution Contexts may be used to efficiently execute the triggered subsystem2 326. The EC for Triggered Subsystem2 may be made a child of the EC corresponding to Triggered Subsytem1 320. This ensures that the pre-condition 325 for Triggered Subsystem2 326 is checked whenever Triggered Subsystem1 320 executes.

CE-SUBSYSTEM EXAMPLE 3

Figure 19:
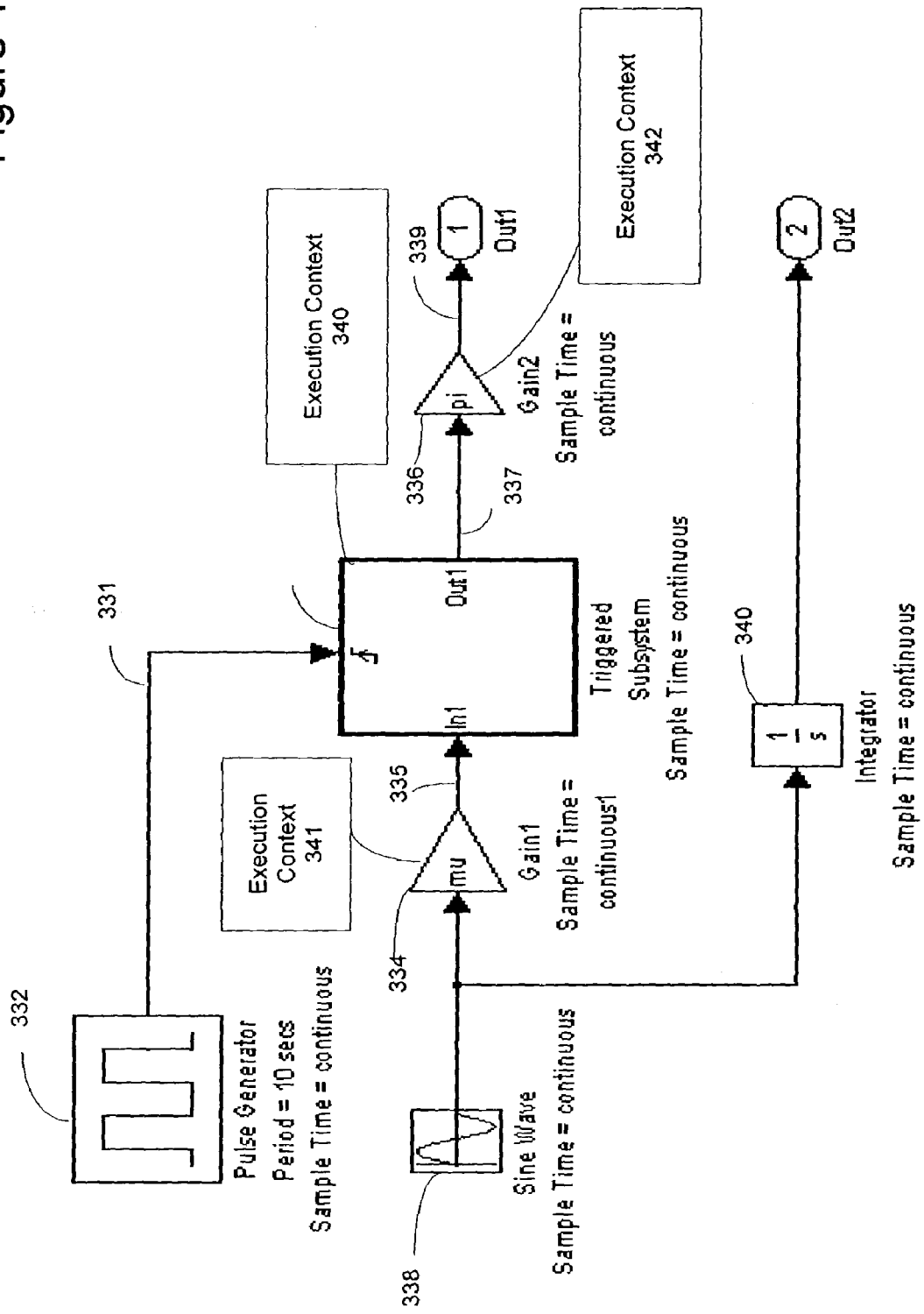
FIG. 19 depicts a triggered subsystem with an associated execution context.

FIG. 19 depicts a Triggered Subsystem 330 which is triggered on the rising edge of the continuous-time pulse signal 331 generated by pulse generator block 332 which feeding its trigger port. Since the pulse signal 331 has a period of 10 seconds, the Triggered Subsystem's constituent blocks execute once every 10 seconds. The diagram also includes two gain blocks, Gain1 334 which feeds an input signal 335 into the subsystem 330, and Gain2 336 which receives an output signal 337 from the subsystem 330. Both Gain1 and Gain2 inherit a continuous sample time ultimately from the Sine Wave block 338. Therefore, even though the Triggered Subsystem executes once every 10 seconds, the blocks Gain1 and Gain2 are executed at every time instant the overall block diagram's outputs are computed. In this case, those time instants are determined during the Integration step of the Sim Loop, where the states of the Integrator block 340 in the block diagram are being integrated. This is inefficient because (i) the data values in output signal 339 of block Gain2 336 can potentially change only once every 10 seconds, and (ii) the data values of the output signal 335 of block Gain1 334 are required only every 10 seconds when the Triggered Subsystem 330 executes. This example has the exact same issue as the previous example illustrated in FIG. 18 conventionally. For obtaining efficiency, one would have to move the blocks Gain1 334 and Gain2 336 into the Triggered Subsystem 330, thereby breaking the modularity of the subsystem.

The illustrative embodiment of the present invention overcomes the efficiency difficulties by setting up an EC 340 to represent the contents of the Triggered Subsystem 330. Blocks Gain1 334 and Gain2 336 may specify that their EC 341 and 342 may be inherited via the lines to them with the result that Gain1 and Gain2 inherit the EC 340 of the Triggered Subsystem 330. During execution, Gain1 334 and Gain2 336 only execute when their parent EC 340, which corresponds to the Triggered Subsystem 330, is activated. This leads to efficient execution of the blocks Gain1 334 and Gain2 336.

Execution Contexts may also be used in environments containing conditional inputs. Referring back to FIG. 15, every time the Switch block 260 executes, the Output method only reads from either the signal 268 at the first input port 262 or the signal 272 at the third input port 266, never both. This would imply that one set of blocks, connected either to the first input port 262 or the third input port 266 would execute unnecessarily at a given time instant. For instance, if the Switch 260 is going to read only from the first port 262, then the following blocks execute unnecessarily causing the execution to be inefficient: Log, Reciprocal, Gain2, Gain3, and Sum2. There are two ways to get modeling efficiency in this example with prior art: First, one could rebuild the system using CE-Subsystems with poor modularity, or Second, one could build a custom block that is an aggregate of the Switch block and all of the blocks connected to its inputs. While the first solution would require users to adopt possibly non-intuitive modeling paradigms for certain systems, the second solution forces users out of using simple modular blocks that express a very specific signal relationship. The Switch block 260 can set up one Execution Context each for the first and third input ports 262 and 266. Such ECs allow the Switch block 260 to group and associate an execution pre-condition with the blocks connected to each of its conditional input ports. This results in better execution efficiency. FIG. 15 depicts Execution Contexts 273, 274 and 275 associated with the first and third input ports 262 and 266 and the switch block 275. Every block in the diagram may have an associated Execution Context. The representation of the Execution Contexts is discussed below.

Similarly, Execution Contexts may also be used in environments containing conditional outputs. The block diagram shown in FIG. 16 illustrates the combination of problems highlighted in CE-Subsystem Examples 1 and 3. If the blocks connected to the outputs 282 and 284 of block A 280 maintain no state from one execution time to the next, then the example is similar to example 3 in that a set of blocks execute even though their input signal values may not have changed. If the blocks connected to block A 280 do maintain state, then there is no way to ensure that the blocks connected to a particular output port 282 and 284 of block A execute only when the signal for that port is recomputed in the Output method of block A. Conventionally, the same two solutions and their drawbacks that were discussed previously are also available for conditional outputs. However, Execution Contexts may also be used to overcome any modeling deficiency. The block A 280 can set up one Execution Context 290 and 291 for each output port 282 and 284. The ECs allow the block A 280 to group and associate an execution pre-condition with the blocks connected to each of its conditional output ports. This results in better modeling capabilities and execution efficiency.

Execution Contexts may originate in block diagrams in a number of different ways. The top-level block diagram may originate a root EC. The execution pre-condition for such an EC is always true. Each non-virtual subsystem may be an originator of a separate EC. This includes Atomic subsystems, for which the execution precondition is always true. Also, non-virtual blocks with conditional inputs and outputs may spawn an EC for each conditional port. For instance the Switch block 260 in FIG. 15 can set up one Execution Context each for the first and third input ports 262 and 266. ECs set up for conditional input ports allow the Switch block to group and associate an execution pre-condition with the blocks connected to each of its conditional input ports.

To accurately capture the definition of ECs as a hierarchical partitioning of the block diagram, it is suitable to represent all ECs in block diagram using a tree data-structure. Each node on the tree represents a single EC and the tree itself represents the hierarchical relationship between nodes. For example, when we have a Triggered Subsystem inside an Enabled Subsystem, the EC node corresponding to the Triggered Subsystem will be a child node of the EC node corresponding to the Enabled Subsystem.

A typical data-structure for representing an EC node is shown below. Each EC node is associated with a unique integer identifier (ID). Also, each node also has fields that track both the block diagram owner of the EC node and the block that originated the node. EC nodes corresponding to the root block diagram have an empty block originator. Additional fields help track all the blocks that are within the EC and the location of the EC node in the overall EC tree.

```
typedef struct ExecContextTreeNode_tag {
    int        identifier; /* Unique node identifier */
    BlockDiagram *contextOwnerBlockDiagram;
    Block      *originatorBlock;
    /* Blocks belonging to this EC node */
    int nMemberBlocks;
    Block **memberBlocks;
    /* Fields for maintaining tree connectivity */
    ExecContextTreeNode_tag *parent;
    int        nChildren;
    ExecContextTreeNode_tag **children;
} ExecContextTreeNode;
```

Those skilled in the art will recognize that while the EC node data structure above is written in C, other programming languages may be used without departing from the scope of the present invention.

During the Compile phase of block diagram execution, EC information is propagated through the block diagram from blocks that setup ECs (such as Subsystems and Switch blocks) to all other blocks (from herein the term "block" is used to refer to non-virtual blocks unless otherwise noted). The effect of propagation is to resolve the parent EC for each block in the block diagram. Resolving the parent EC of each block in turn has the effect of partitioning the block diagram into various ECs. Talking in implementation terms, the objective of propagation is to associate with each block a compiled integer attribute (which we will refer to as compECID in our discussion) that holds the context ID for the block's parent EC node.

In order to enable propagation, functional EC-related attributes are set up on each block. The functional attributes capture two pieces of information for each block. The functional attributes specify whether or not the block can inherit its EC from other blocks connected to it via lines. Blocks can also specify that they can inherit EC information only in one direction; that is, the block can say that it will inherit EC information only through its input connections, or vice versa. The blocks setup a functional attribute called ecInheritance that has one of four possible settings:
CANNOT_INHERIT, INHERIT_VIA_INPUTS, INHERIT_VIA_OUTPUTS, INHERIT_VIA_INPUTS_AND_OUTPUTS.

The ecInheritance flag of a non-virtual Subsystem is setup on the basis of its constituent blocks. If any one block has an ecInheritance flag specified to be CANNOT_INHERIT, then the entire Subsystem is also marked CANNOT_INHERIT.

The functional attributes also specify whether or not a block sets up its own ECs. Non-virtual subsystems all indicate that they each set up an EC. Non-Subsystem blocks with conditional inputs and outputs also indicate which ports set up ECs.

To enable propagation, each block port is assumed to be associated with a compiled integer field called compPortECID, which helps track either (a) the EC information of the block connected to this block, or (b) track the ID of the EC node set up by conditional input and output ports. The use of this integer field is explored further below during the discussion on propagation.

Propagation of Execution Context information involves resolving the compECID attribute of each block that indicates that it can inherit EC information via its input and output connections. As an indirect effect, propagation also results in EC nodes being moved to lower locations on the tree to gain better execution efficiency. For example, a change to the compECID of a Subsystem effectively moves the EC node for the contents of the Subsystem below the node whose ID is compECID.

The illustrative embodiment of the present invention includes an algorithm for carrying out the propagation of Execution Context information. Those skilled in the art will recognize that other algorithms leading to the same results may be substituted for the algorithm described herein without departing from the scope of the present invention. The propagation algorithm proceeds in three phases: Initialization of the EC Tree, Propagation Core, and EC Partitioning. The propagation algorithm is applied to the block diagram during the Compile phase once sample time information has been propagated and actual block connectivity has been determined. It should be noted that throughout the discussion of the propagation algorithm, the term block interconnections, refers to actual block connectivity (as opposed to virtual block connectivity).

The first phase of the propagation algorithm is the initialization of the EC tree. During this phase, the EC tree for the block diagram is created and initialized. The first node to be created on the tree is the EC node for the root block diagram. This node is assigned a unique identifier (in the identifier field of the data-structure), referred to herein as ID_Root. Following the creation of the root node, initialization is begun for the conditional context information for each block in the block diagram. This initialization phase traverses the entire block diagram using the functional EC information setup by each block to initialize the compECID of the block and the compPortECID of each input and output port. Furthermore EC nodes are created for each block that sets up its own ECs as the block diagram is traversed. The steps in the initialization of the compiled block and port attributes are illustrated in detail in FIGS. 20A-20D. Features of the initialization process include:

Blocks are setup to have a compECID that is the ID of the EC node setup by the non-virtual Subsystem that immediately parents this block. In the case of blocks parented by the root block diagram directly, compECID becomes ID_Root.

For non-virtual Subsystem blocks the compPortECID is setup to be equal to the ID of the new EC node created for the contents of the Subsystem.

For non-subsystem blocks that do not setup any conditional inputs or outputs, the compPortECID is set to be equal to the compECID of the block.

For non-subsystem blocks that do setup conditional inputs or outputs, the compPortECID is setup to be the ID of the new EC node that is created for that port.

Figure 20A:
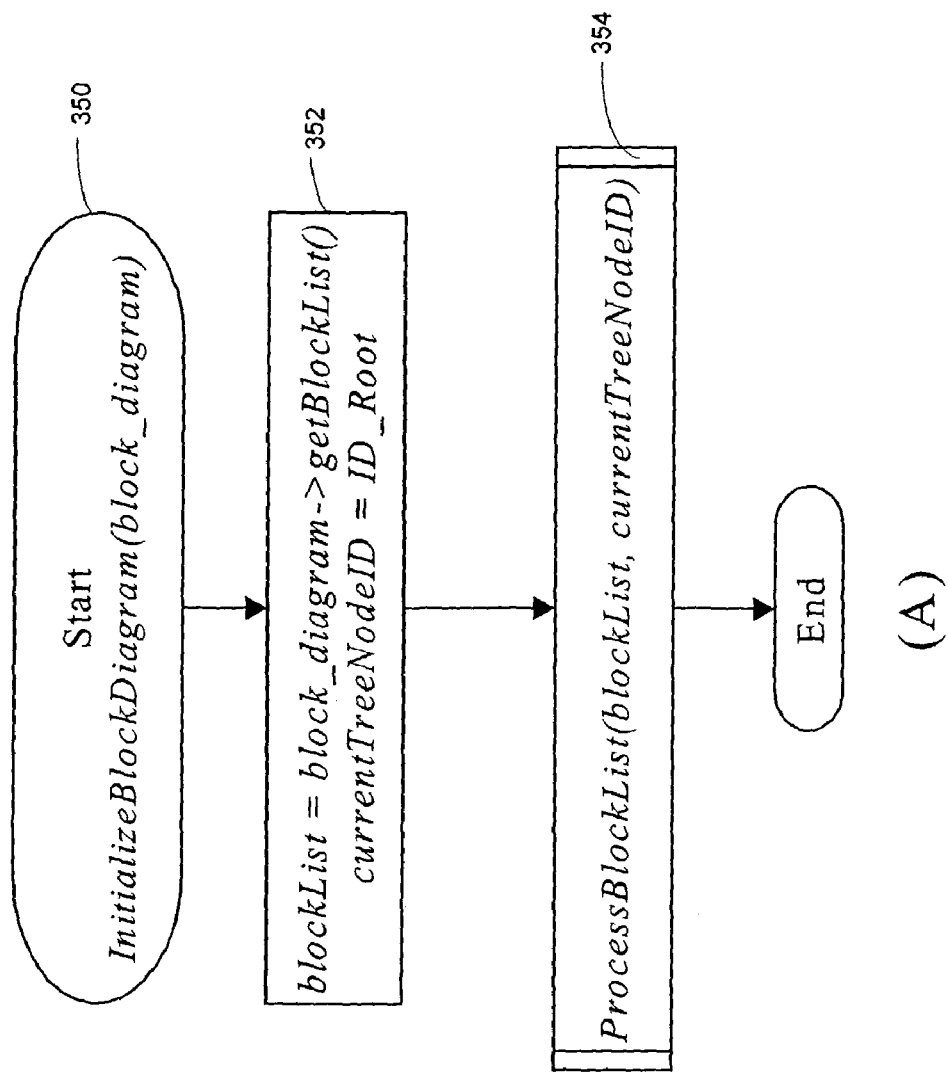
FIG. 20A is a flowchart depicting the sequence of steps followed by the propagation algorithm to perform initialization.

FIG. 20A is a flowchart depicting the sequence of steps followed by the propagation algorithm to perform initialization. The initialization sequence (step 350) begins by creating a node (ID_Root) for the root block diagram. The block diagram is then traversed to set up EC nodes for the other blocks in the diagram through a call to the ProcessBlockList function (step 354).

Figure 20B:
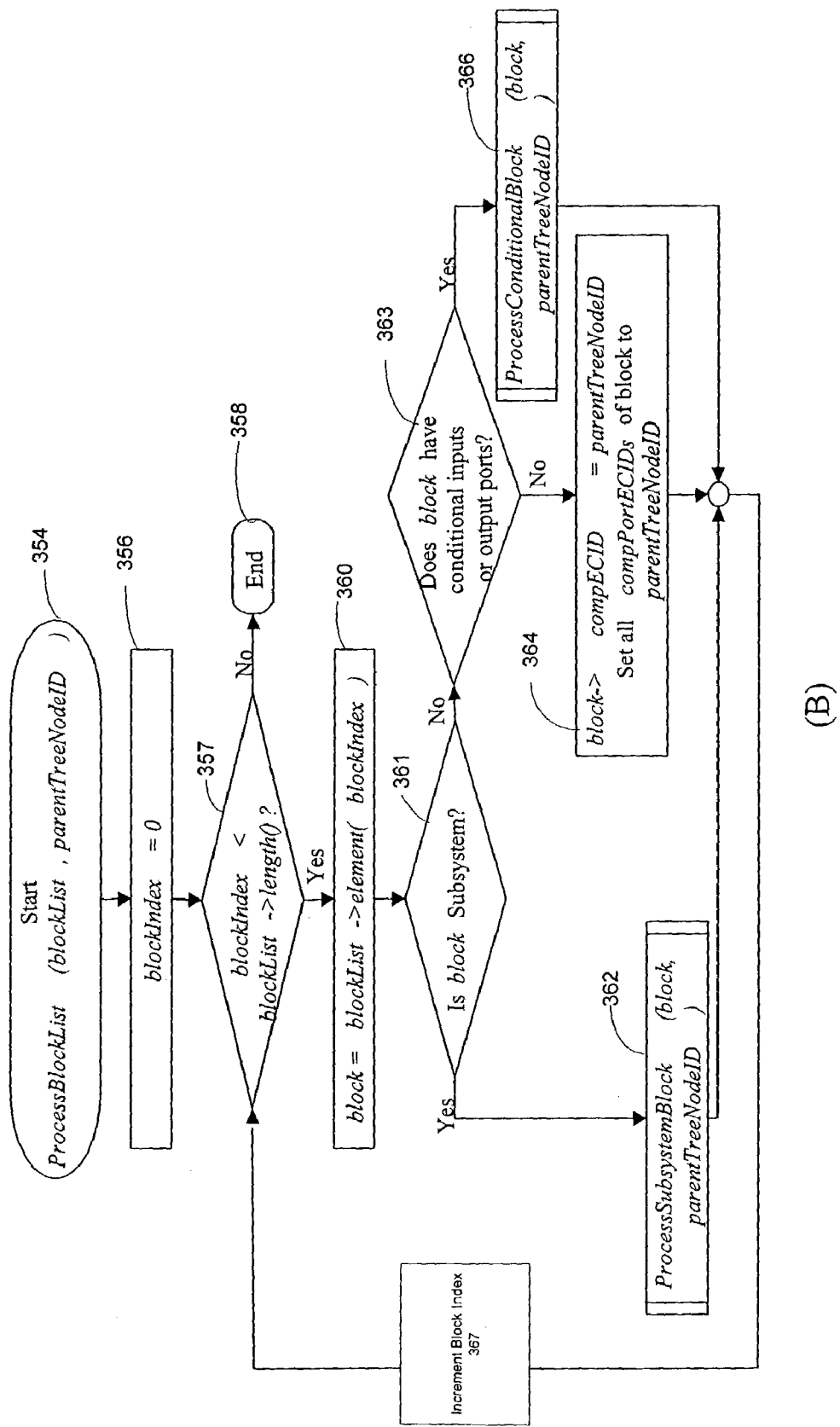
FIG. 20B is a flowchart depicting the sequence of steps during execution of the ProcessBlockList function.

FIG. 20B depicts the execution of the ProcessBlockList function. The ProcessBlockList function begins (step 354) by setting a blockIndex variable to zero (step 356). The blockIndex variable is then compared to the length of the block list (step 357). If the blockIndex variable is not shorter than the length of the list the function ends (step 358). If the blockIndex variable is shorter than the length of the list a block variable receives the next block in the list (step 360). The block is evaluated to determine if it is a subsystem (step 361) and if it is, a Process SubsystemBlock function is called (step 362). If the block is not a subsystem, the block is examined to determine whether it has any conditional inputs or output ports (step 363). If the block does not have conditional inputs or output ports, all of the compPortECIDs of the block are set to the parentTreeNodeID (step 364). If the block does have conditional inputs or output ports, a ProcessConditionalBlock function is called (step 366). All of the blocks in the diagram are evaluated in this manner with the blockIndex being incremented between evaluations (step 367).

Figure 20C:
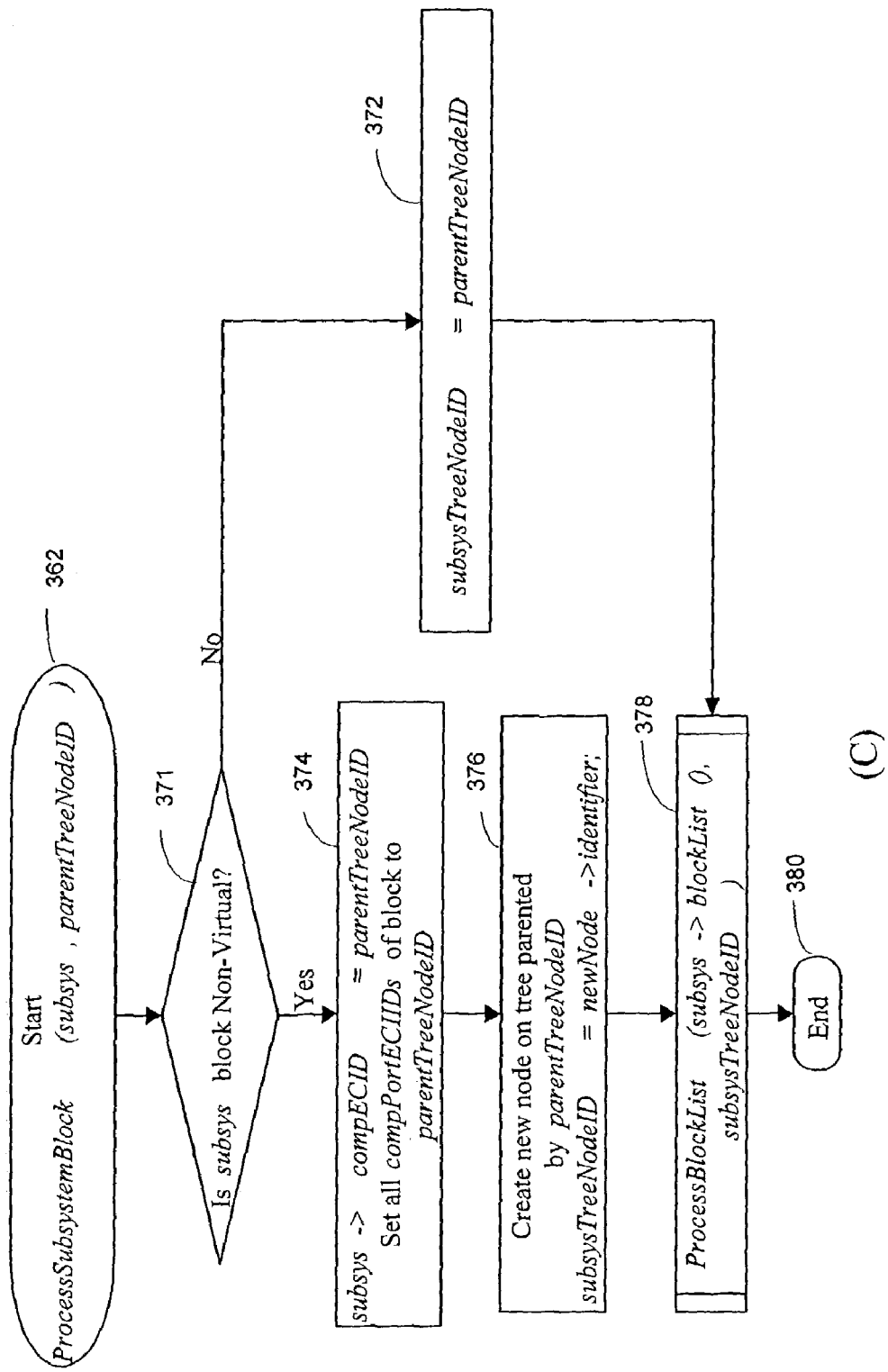
FIG. 20C is a flowchart depicting the sequence of steps during execution of the ProcessSubsystemBlock function.

FIG. 20C depicts the sequence of steps performed in the ProcessSubystemBlock function (step 362). The subsystem is first evaluated to determine whether the subsystem block is non-virtual (step 371). If the subsystem is not non-virtual, the subsystemTreeNodeID is assigned the parentTreeNodeID (step 372). If the subsystem is non-virtual, all of the compPortECIDs are set to the parentTreeNodeID (step 374). A new node on the tree parented by the parentTreeID is created (step 376). The blocks in the subsystem are then processed through a call to ProcessBlockList (step 378). The sequence ends (step 380) when the subsystems blocks have been all processed.

Figure 20D:
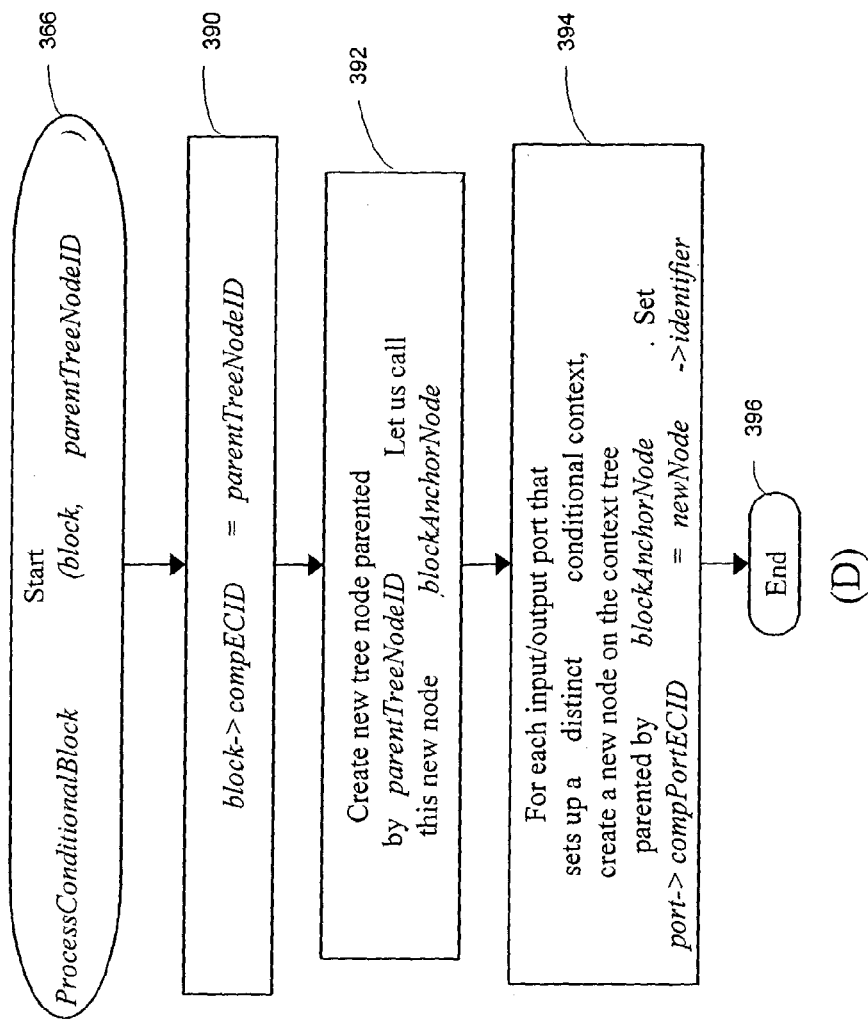
FIG. 20D is a flowchart depicting the sequence of steps during execution of the ProcessConditionalBlock function.

FIG. 20D depicts the ProcessConditionalBlock function (step 366) that is called when the ProcessBlockList function (step 354) detects conditional inputs or output ports in a block. The block's compECID is assigned the parentTreeNodeID (step 390). A new node parented by parentTreeNodeID is then created that is referred to as blockAnchorNode (step 392). For each input/output port that sets up a distinct conditional context, a new node is created on the context tree that is parented by blockAnchor Node(step 394). When all of the ports with a distinct conditional context have created new nodes, their compPortECIDs are initialized and then the function ends (step 396).

Figure 21A:
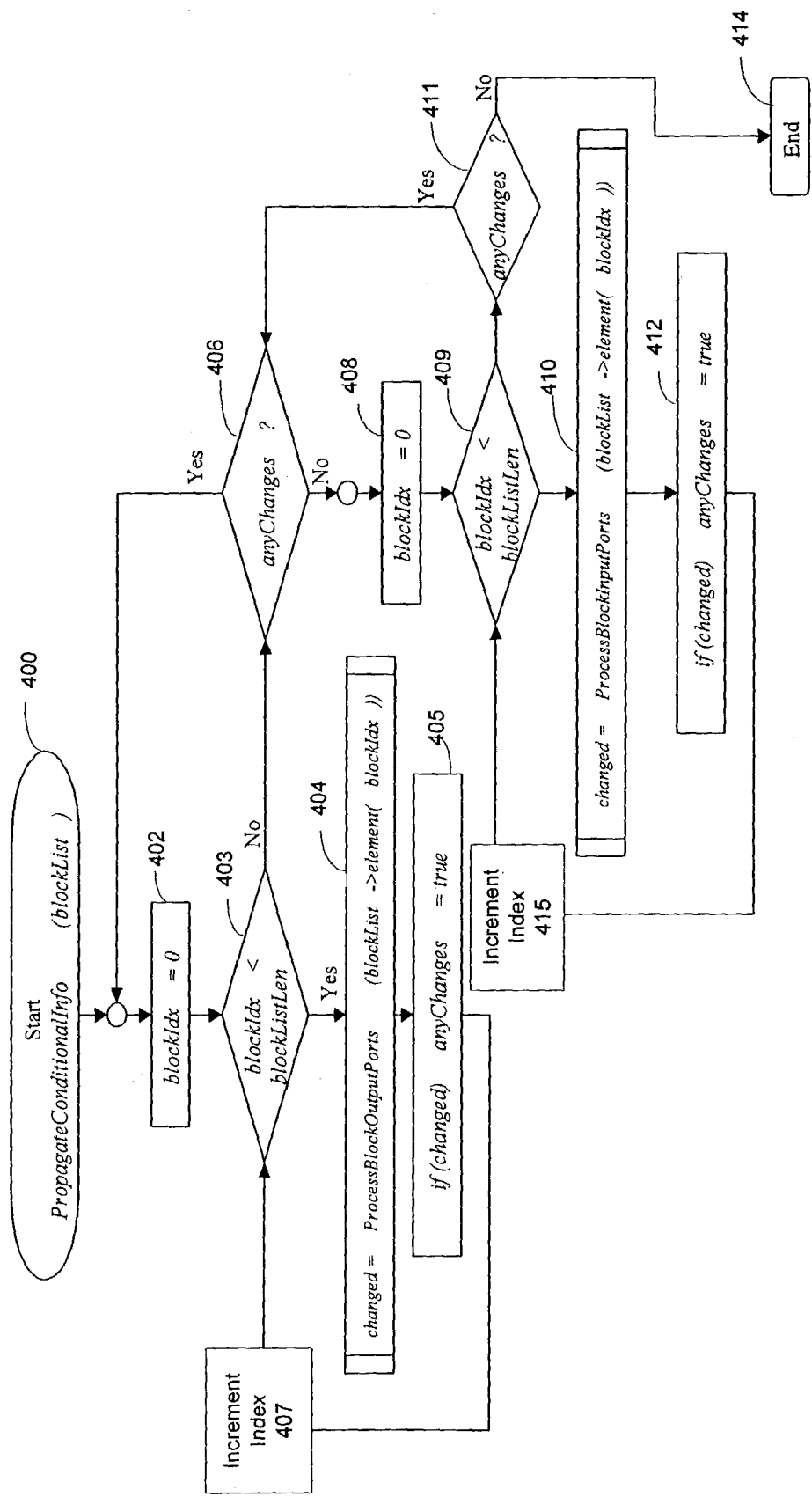
FIG. 21A is a flowchart depicting the sequence of steps during execution of the PropagateConditionalInfo function.

The core of the propagation algorithm is embodied in a function PropagateConditionalInfo (step 400) that is called in the phase that follows initialization. During this phase each block is processed within the two processing loops ProcessBlockOutputPorts and ProcessBlockInputPorts as shown in FIG. 21A. These loops are responsible for modifying the compECID of blocks which specify that they can inherit EC information. Each of the loops processes the list of all blocks in the block diagram repeatedly until there is at least one pass through the loop when no block's compECID is modified. The sequence begins with an index variable being set to zero (step 402). The index variable is compared against the length of the block list (step 403). If the index is less than the length, the function ProcessBlockOutputPorts is called and the return value assigned to the variable change (step 404). The changed value is then evaluated and used to adjust an anyChanges variable (step 406) and the process iterates following the incrementing of the index (step 407). The loop continues until the index is no longer less then the block list length.

Once the index is no longer less than the block list length (step 403), the anyChanges variable is examined (step 405). If changes have occurred, the process returns to the beginning to examine output ports and the block index is reset to zero (step 402). If changes have not occurred, the block index is reset to zero(step 408) and compared against the block list length (step 409). If the block list is less than the block list length, the ProcessBlockInputPorts function is called and the return value is assigned to the changed variable (step 410). The changed value is then evaluated and used to adjust the anyChanges variable (step 412). The process iterates following the incrementing of the index (step 415). Once the index is no longer less than the block list length (step 409), the anyChanges variable is examined (step 411). If the value is true, the entire process resets to the beginning and begins the examination of the output ports. If not, the process ends (step 414).

The first loop of the PropagateConditionalInfo function calls the function ProcessBlockOutputPorts that is responsible for determining if a block's compECID can be modified to inherit the ECID from one of its output port connections. The function cycles over all of the output ports of a block and determines whether or not the block is connected to blocks that are setting up a different EC. If it is determined that the block is connected to other block input ports whose compPortECIDs are all the same, the compECID of the block is modified to match that of the compPortECIDs.

Figure 21C:
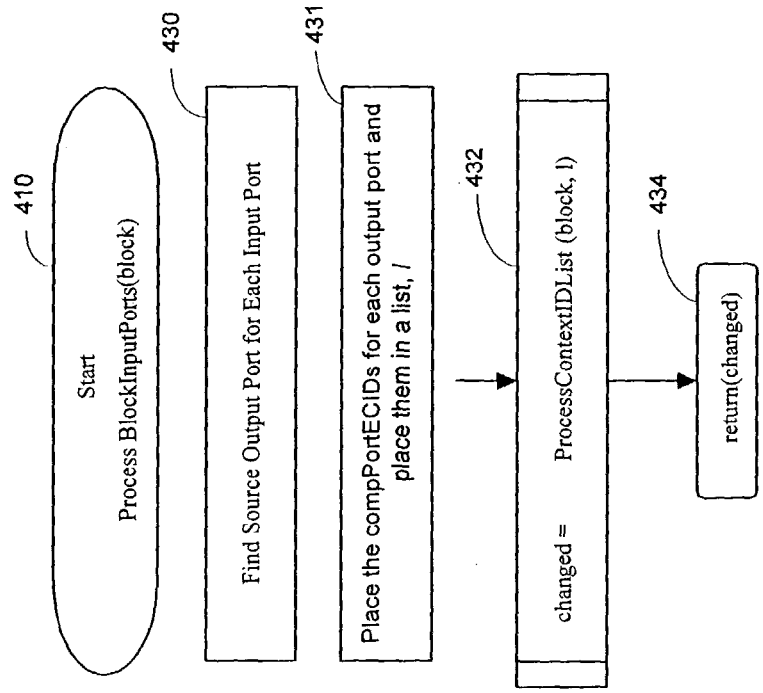
FIG. 21C is a flowchart depicting the sequence of steps during execution of the ProcessBlockInputPorts function.
Figure 21B:
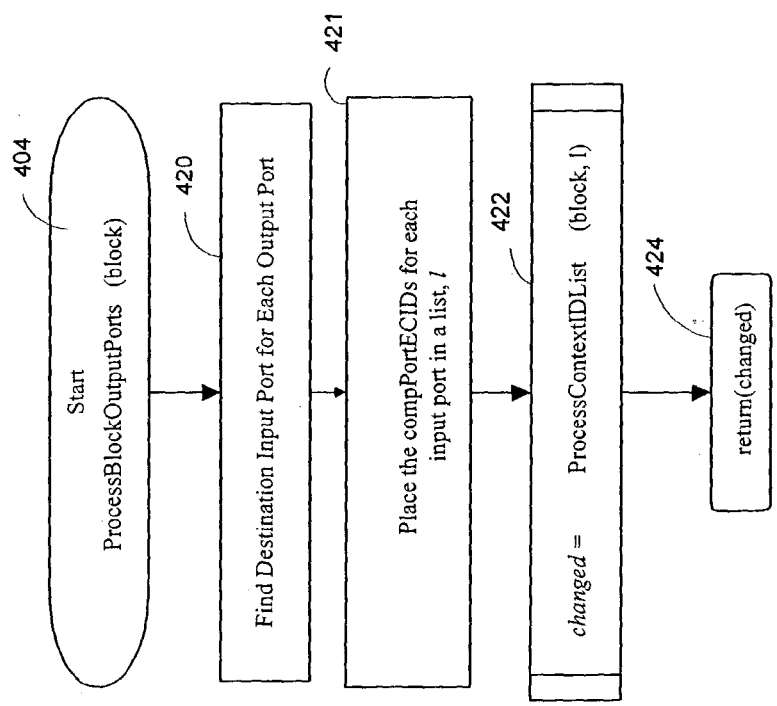
FIG. 21B is a flowchart depicting the sequence of steps during execution of the ProcessBlockOutputPorts function.

FIG. 21B depicts the ProcessBlockOutputPorts function (step 404) which goes over all of the block output ports and finds the corresponding destination input ports (step 420). The compPortECID of each of the input ports is then placed in a list (step 421). A ProcessContextIDList function is then called and the return value assigned to the variable changed (step 422). The changed variable is then returned to the calling function (step 424).

The second loop of the PropagateConditionalInfo function calls the function ProcessBlockInputPorts that is responsible for determining if a block's compECID can be modified to inherit the EC ID from one of its input port connections. In this function, all of the input ports of a block are examined to determine whether or not the block is connected to blocks that are setting up a different EC. If it is determined that the block is connected to other block output ports whose compPortECIDs are all the same, the compECID of the block is modified to match that of the compPortECIDs.

FIG. 21C depicts the ProcessBlockInputPorts function (step 410) which goes over all of the block input ports and finds the corresponding source output ports (step 430). The compPortECID for each of the output ports is placed in a list (step 431). A ProcessContextIDList function is then called and the return value assigned to the variable changed (step 432). The changed variable is then returned to the calling function (step 434).

Figure 21D:
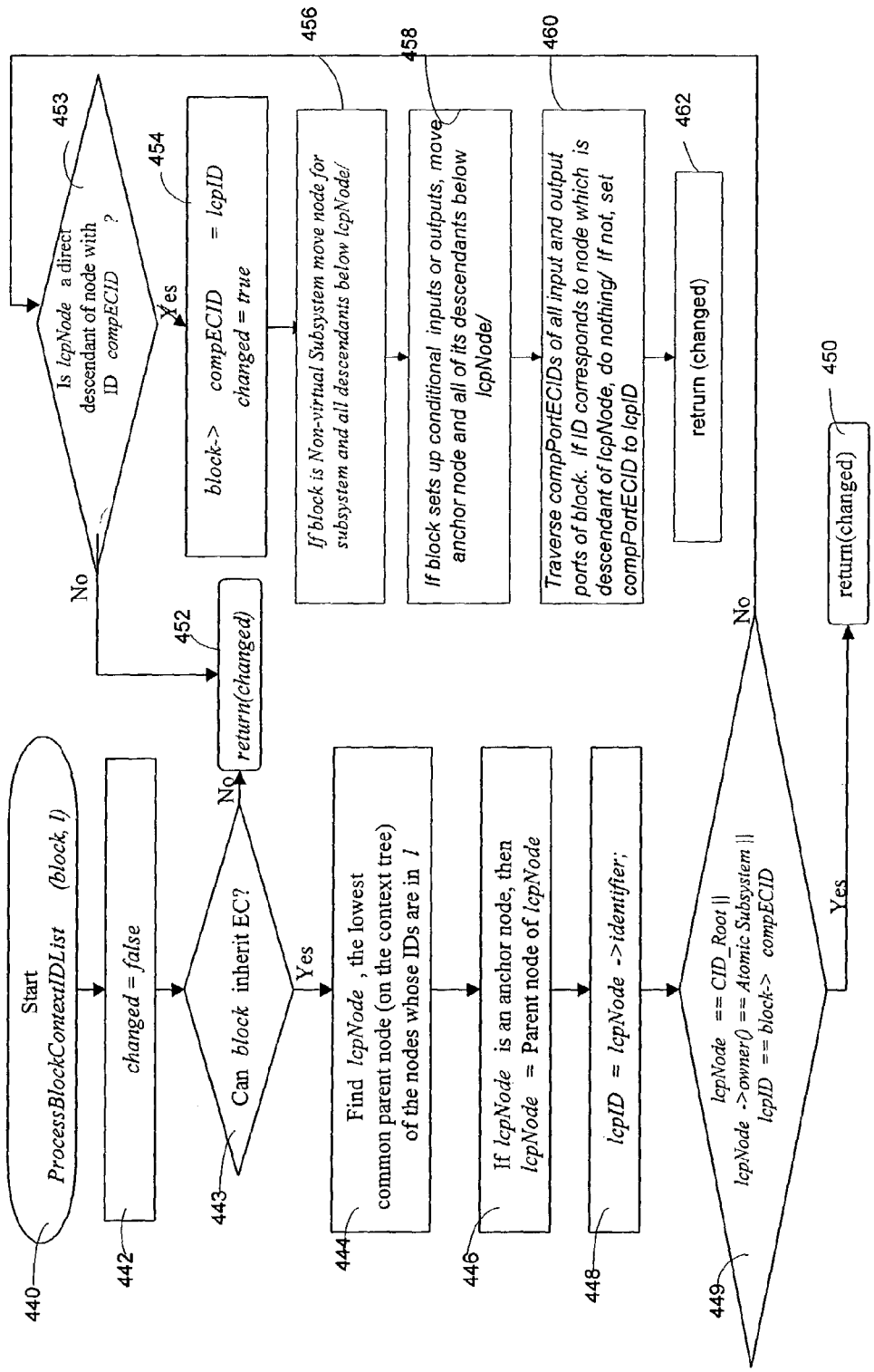
FIG. 21D is a flowchart depicting the sequence of steps during execution of the ProcessContextIDList function.

Both the ProcessBlockInputPorts function and the ProcessBlockOutputPorts function call the ProcessContextIDList function and assign its return value to the variable changed. The ProcessContextIDList function (step 440) is depicted in FIG. 21D. The function begins by setting the changed variable equal to false (step 442). The block is examined to determine if it can inherit an EC (step 443). If the block cannot inherit an EC, the changed variable value is returned (step 452). If the block can inherit an EC, the lowest common parent node on the context tree of the nodes located in the list passed to the function (step 444). If the node is an anchor node the lowest common parent node is set to the parent node of the lowest common parent node (step 446). The ID of the lowest common parent is assigned to the lcpID variable (step 448) and lcpNode is examined to determine whether it is the root node or whether the owner is an atomic subsystem or whether the lcpID is equal to the block's compECID. If one or more of these three things is true, the changed variable value is returned to the calling function. If none of the three are true, the lcpNode is examined to determine if it is a direct descendant of a node with an ID of the compECID (step 453). If the lcpNode is not a direct descendant, the changed variable value is returned. If the node is a direct descendant, the compECID value is adjusted to the value of the lcpID and the changed value is adjusted to true (step 454). If the block is a non-virtual subsystem, then its nodes and the nodes of all of its descendants are moved below the lcpNode (step 456). If the block sets up conditional inputs or outputs, the anchor node and all of its descendants are moved below the lcpNode (step 458). The compPortECIDs of all of the input and output ports are examined. If the ID corresponds to an ID below the lcpNode nothing is done. If the ID is not below the lcpNode, the compPortECID is set to compPortECID (step 460). The changed value variable is returned to the calling function (step 462). Those skilled in the art will recognize that the propagation algorithm is guaranteed to converge to a result. This is because a block's compECID can only be modified to match the ID of a node that is lower down in the EC tree than the node for which the ID is compECID.

The partitioning phase is the final phase of EC propagation where the memberBlocks field of each EC node is populated on the execution context tree. During this phase, a single pass is made over the block diagram and the compECID is inspected for each block. The block is then placed on the memberBlocks field of the tree node with the same identifier.

Figure 22:
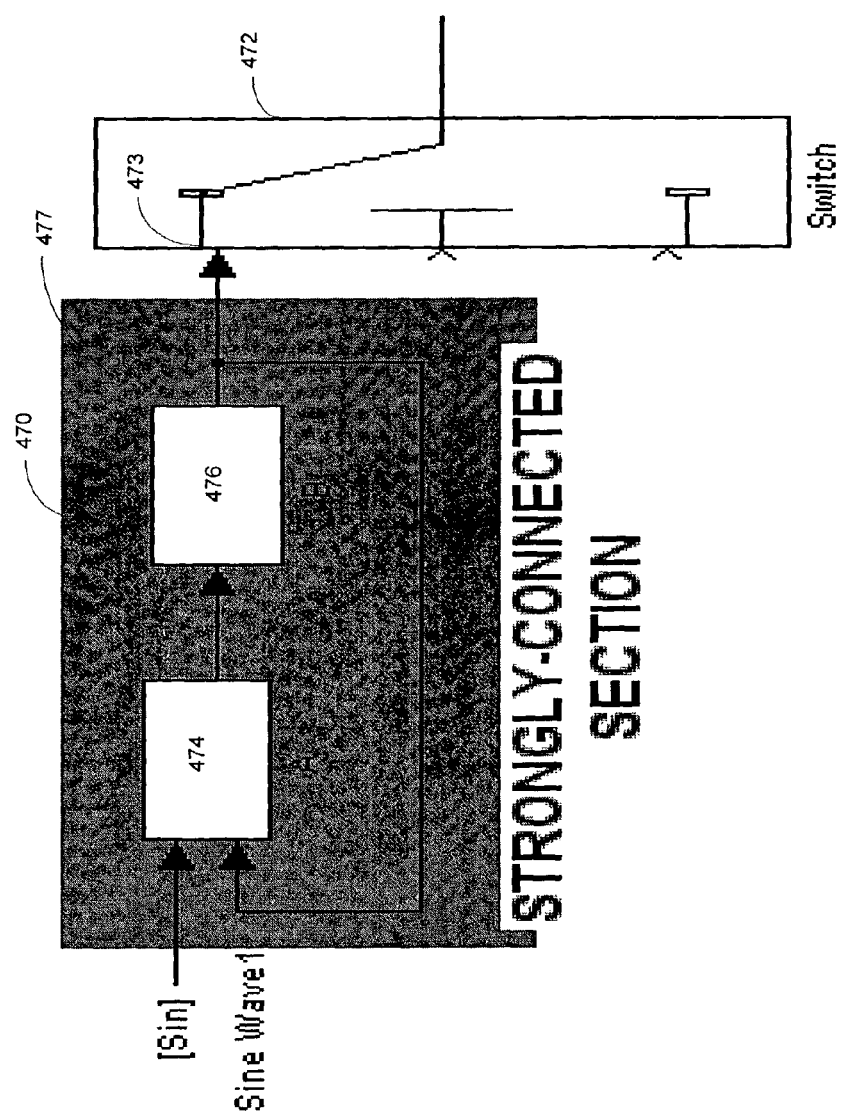
FIG. 22 depicts a block diagram with a strongly connected section.

The illustrative embodiment of the present invention also includes extensions to the basic propagation algorithm described above. One of the extensions is designed to handle strongly connected block diagram sections. The propagation algorithm described previously does not handle blocks within strongly-connected sections of the block diagrams. Consider the example shown in FIG. 22. By applying the algorithm described previously, one can determine that block 'B' 476 in the strongly connected section 470 will never inherit the EC for the first port 473 of the Switch block 472. This is because the output port 477 of block 'B' 476 has 2 destinations: the Switch block 472 and block 'A' 474. Since the two destinations do not have the same EC ID, the compECID of block 'B' cannot be modified. Yet, by simple visual inspection, it is noted that blocks 'A' and 'B' can both inherit the EC ID for the first port 473 of the Switch block 472 as long as both blocks 474 and 476 support such inheritance. A modification to the previously described algorithm allows blocks 474 and 476 to inherit the EC of the first port 473 of the switch block 472. The modification involves first identifying strongly-connected sections 470 by using Tarjan's algorithm. Each strongly-connected section is treated as a single block on the parent graph with as many external inputs and outputs as the section. For instance, the strongly-connected section 470 shown in FIG. 22 can be translated into a block with one input and one output. The resulting "pseudo-block" can then be processed just like any other block in the propagation algorithm in order to set its compECID (which effectively sets the compECIDs of all blocks in the strongly-connected section).

Figure 23:
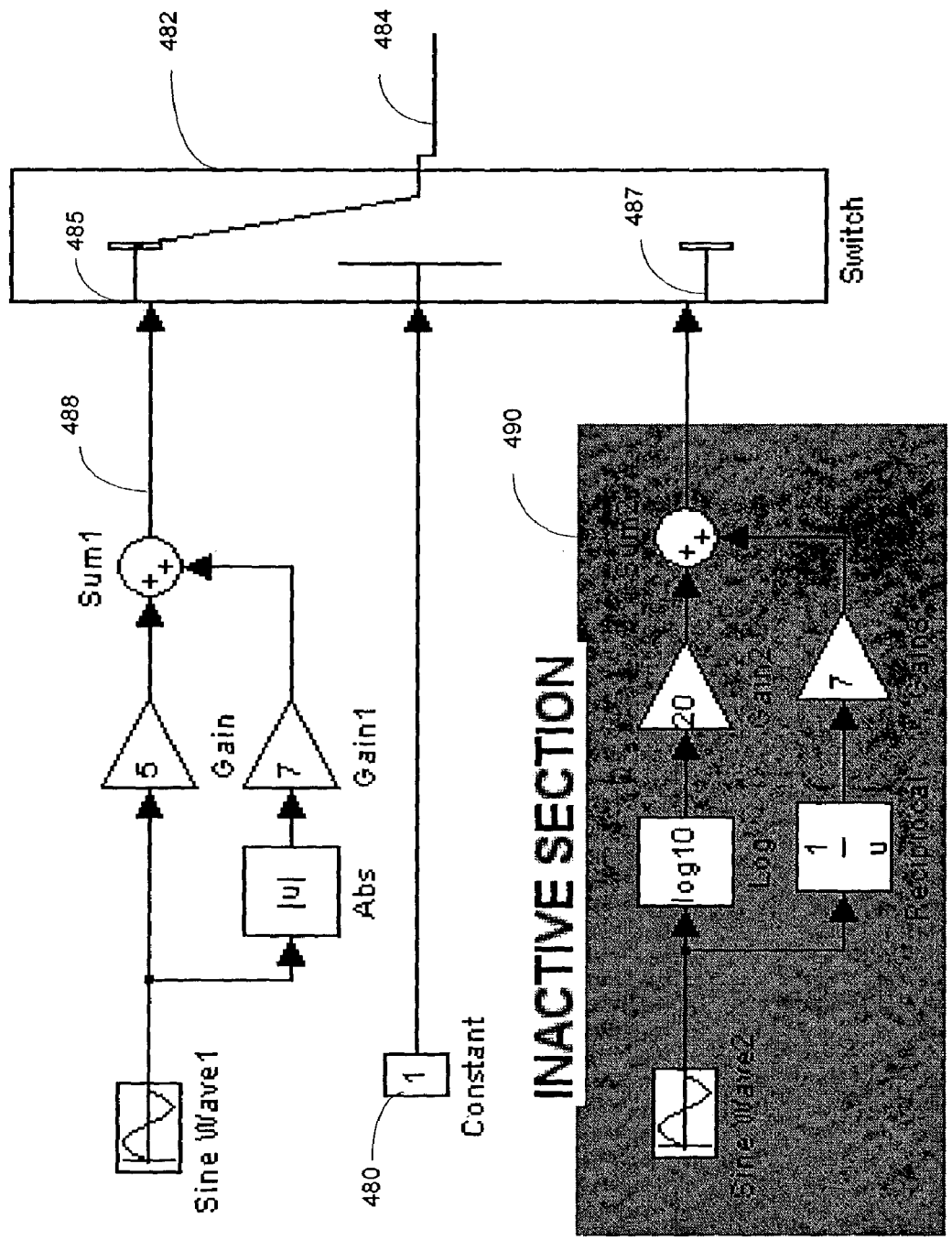
FIG. 23 depicts a block diagram with an inactive section.

Another extension to the propagation algorithm allows the pruning of inactive sections of block diagrams. FIG. 23 shows a block diagram with an inactive section 490. If the value of the Constant block 480 cannot be changed during simulation, then the output 484 of the Switch block 482 is always the result produced by the block section connected to the first input port 485 of the switch. Since the output of the section 490 will not be needed, the section connected to the third input port 487 of the switch 482 may be considered to be inactive. Through an extension in the algorithm such inactive sections may be pruned from the block diagram.

The process of eliminating inactive sections is as follows:
  At the time of creating the EC tree, an additional node is created that is parented by the root node. This node is assigned a special identifier ID_inactive.
  At the time of initializing the block diagram in propagation phase I, an assignment of ID_inactive to the third input port 487 of the Switch block 482 and ID_Root to the first input port 485 is made. Note that the Switch block no longer registers any conditional input ports.

The propagation algorithm then ensures that blocks connected to the third port 487 get assigned a compECID of ID_inactive. Finally, in the third propagation phase, all blocks with ID_inactive are assigned to the context node corresponding to this inactive identifier. The block diagram execution engine then proceeds to simply ignore all blocks that have been assigned to this EC during the execution of the block diagram.

Once propagation of EC information has been completed, the EC tree represents a partitioning of the block diagram into ECs. The EC tree is then used in the Sorting step of the Compile phase in block diagram execution. The conceptual goal of sorting is to take the memberBlocks field of each EC node and independently determine the sorted order for this list. In order to facilitate implementation within existing sorting infrastructure in block diagram modeling software, an implementation strategy has been devised to achieve this goal. The implementation strategy is based on the fact that modeling software such as Simulink have existing sorting modules that know how to produce a sorted list for a non-virtual subsystem. The strategy involves the following steps:
  1. For an EC that has been setup either for a conditional input or output, a "hidden" Atomic Subsystem is created that is at the same level of the block diagram hierarchy as the owner block of the EC (say a Switch block). The owner of the EC node is reset to this new Subsystem. Note that the Subsystem is referred to as "hidden" because it is not visible graphically to the user. Furthermore, the Subsystem is removed automatically at the termination of block diagram execution.
  2. A block in the block diagram whose compECID changed over the course of propagation is moved into the non-virtual Subsystem corresponding to the EC node whose ID is compECID.
  3. Sorting is carried out on the list of blocks for each non-virtual Subsystem of the block diagram as before.

Once sorting has been completed, the remaining steps until the start of execution remain the same. The Sorted lists are used as before to create the Execution Lists for the block diagram in the Link phase. During the execution of the block diagram, the major difference from before arises in the context of blocks with conditional inputs and outputs. For CE-Subsystems, the execution lists include blocks that inherited the EC corresponding to the Subsystem. Such blocks execute in the normal course of block diagram execution.

Blocks with conditional inputs and/or outputs, have hidden Atomic Subsystems for each conditional input and output. The block diagram's execution engine asserts no execution control on the contents of such hidden Subsystems. Instead the execution of the blocks within such Subsystems is completely at the discretion of the block that registered the conditional input and output, which is referred to as the owner block in this discussion. The execution of a hidden Subsystem created for the conditional input of the owner block is carried out explicitly in the execution methods of the owner block. Modeling software such as Simulink provides simple utility methods for the owner block to carry out such execution. For example, consider the Switch block example of FIG. 15. If the Switch block 260 registered the first and third input ports 262 and 266 as conditional inputs, then its Output method (in pseudo-code) would be written as shown immediately below in pseudo code. Note that the method Execute_Output_Methods is provided as a utility to the Switch block.

```
SwitchOutput( )
{
    if (Switch_Input_2 >= 0.0) {
        Execute_Output_Methods(Hidden_Subsystem_for_Inp_1);
        Switch_Output = Switch_Input_1;
    } else {
        Execute_Output_Methods(Hidden_Subsystem_for_Inp_3);
        Switch_Output = Switch_Input_3
    }
}
```

It should be noted that the modeling capabilities and execution efficiencies obtained through the introduction of ECs applies both to Interpreted Execution and to the code generated from the block diagram.

Modeling software generally supports the ability to generate a single function in the generated code for non-virtual Subsystems (Although functions are referred to herein for the purpose of illustration, other programming approaches may also be used. For example, the CE-Subsystem may be generated as a class with an appropriate interface definition in object-oriented programming languages such as C++.). If there is more than one instance of a given non-virtual Subsystem, then the generated code contains one function for that Subsystem and multiple calls to the function. Each function-call passes instance-specific parameters to the function. This concept is referred to as code reuse for non-virtual Subsystems.

Figure 24:
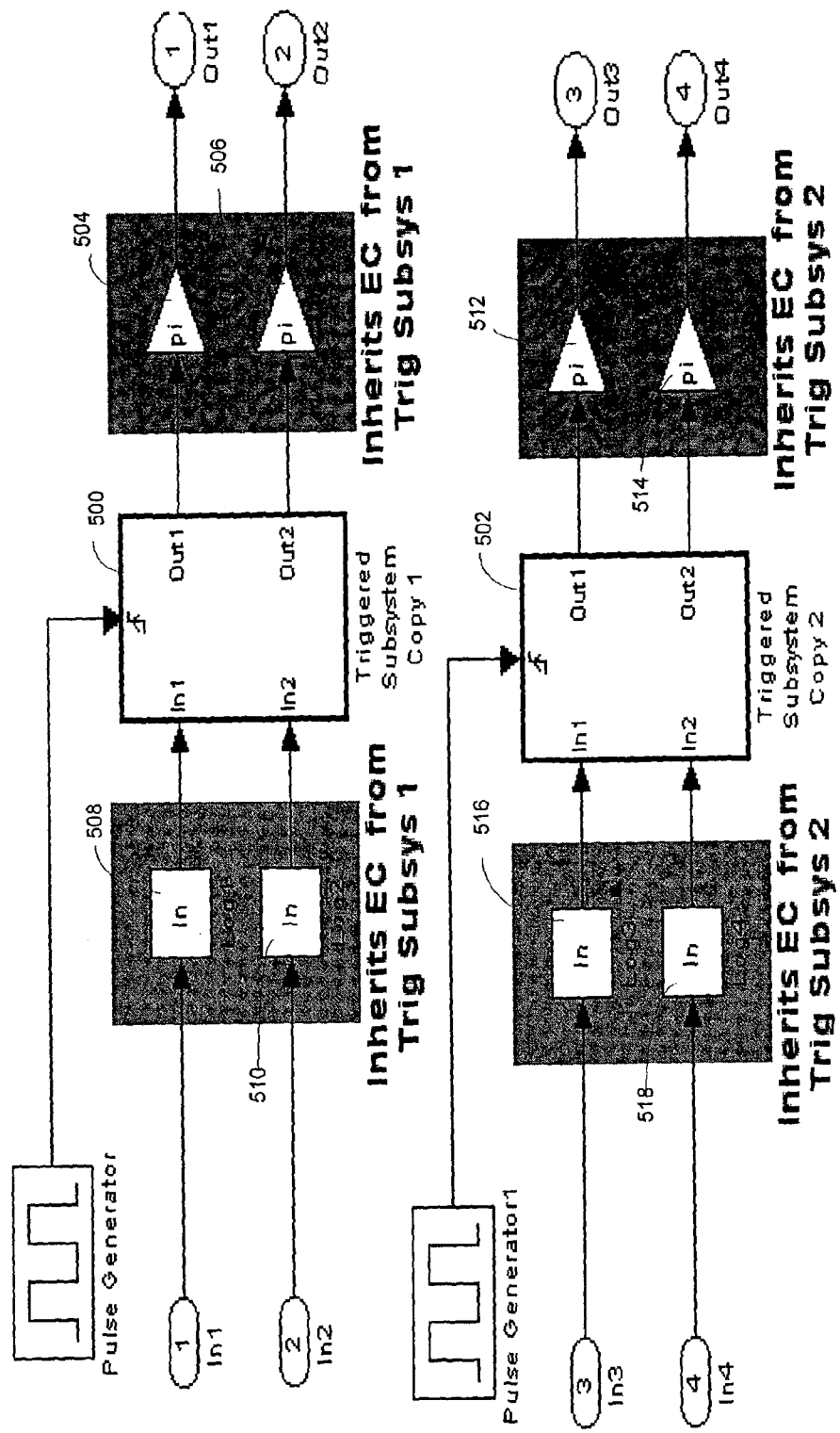
FIG. 24 depicts multiple copies of a triggered subsystem connected to different sets of blocks.

The illustrative embodiment of the present invention allows multiple copies of a CE-Subsystem to be connected to different sets of blocks in the block diagram. Each CE-Subsystem sets up an EC and the blocks connected to that Subsystem inherit its corresponding EC as illustrated in FIG. 24. As described in the previous section, this involves adding the blocks that inherit the CE-Subsystem's EC into the Sorted List for that CE-Subsystem. The Sorted List is used to create the execution lists for the Subsystem and the execution lists are in turn used to generate code for the Subsystem. Consequently, even though the two CE-Subsystems are identical to each other, they will not have the same generated code when they are connected to different blocks in the model. This prevents code reuse for the two CE-Subsystems. To achieve code reuse and still maintain the benefits of ECs, the illustrative embodiment of the present invention provides an alternative strategy for handling blocks that inherit their EC from a CE-Subsystem. The strategy involves the following steps:

Take all blocks that are inheriting their ECs from a CE-Subsystem 500 and 502 via their input ports and bundle them together into a single hidden Atomic Subsystem. In the example of FIG. 24, the blocks Gain1 504 and Gain2 506 are bundled into one Atomic Subsystem and the blocks Gain3 512 and Gain4 514 into a second hidden Atomic Subsystem.

Take all blocks that are inheriting their ECs from a CE-Subsystem 500 and 502 via their output ports and bundle them together into a single hidden Atomic Subsystem. In the example of FIG. 24, the blocks Log1 508 and Log2 510 are bundled into one Atomic Subsystem and the blocks Log3 516 and Log4 518 into a second hidden Atomic Subsystem.

A single reusable function is generated for the multiple copies (in the case of FIG. 24, two copies 500 and 502) of a CE-Subsystem. Within the reusable function, an explicit call to the hidden Atomic Subsystem that has been added to include all of the blocks that inherited ECs from the CE-Subsystems input ports. Also included is an explicit call to the hidden Atomic Subsystem that has been added to include all of the blocks that inherited ECs from the CE-Subsystems output ports. The calls are made through function-pointers that are passed in as arguments in order to allow code reuse to still occur. Those skilled in the art will recognize that if the CE-Subsystems were generated as classes in an object-oriented language, multiple subclasses for the reused Subsystem could be created. Each subclass would encompass information regarding the blocks that inherited their ECs from the CE-Subsystem. The base class would encompass the contents of the Subsystem itself.

The illustrative embodiment of the present invention also encompasses the idea of graphically annotating the block diagram to display EC information. Some examples of such annotation include:

Displaying the EC ID for each block on its icon during execution. This allows users to obtain annotated pictures of the block diagram.

Figure 25:
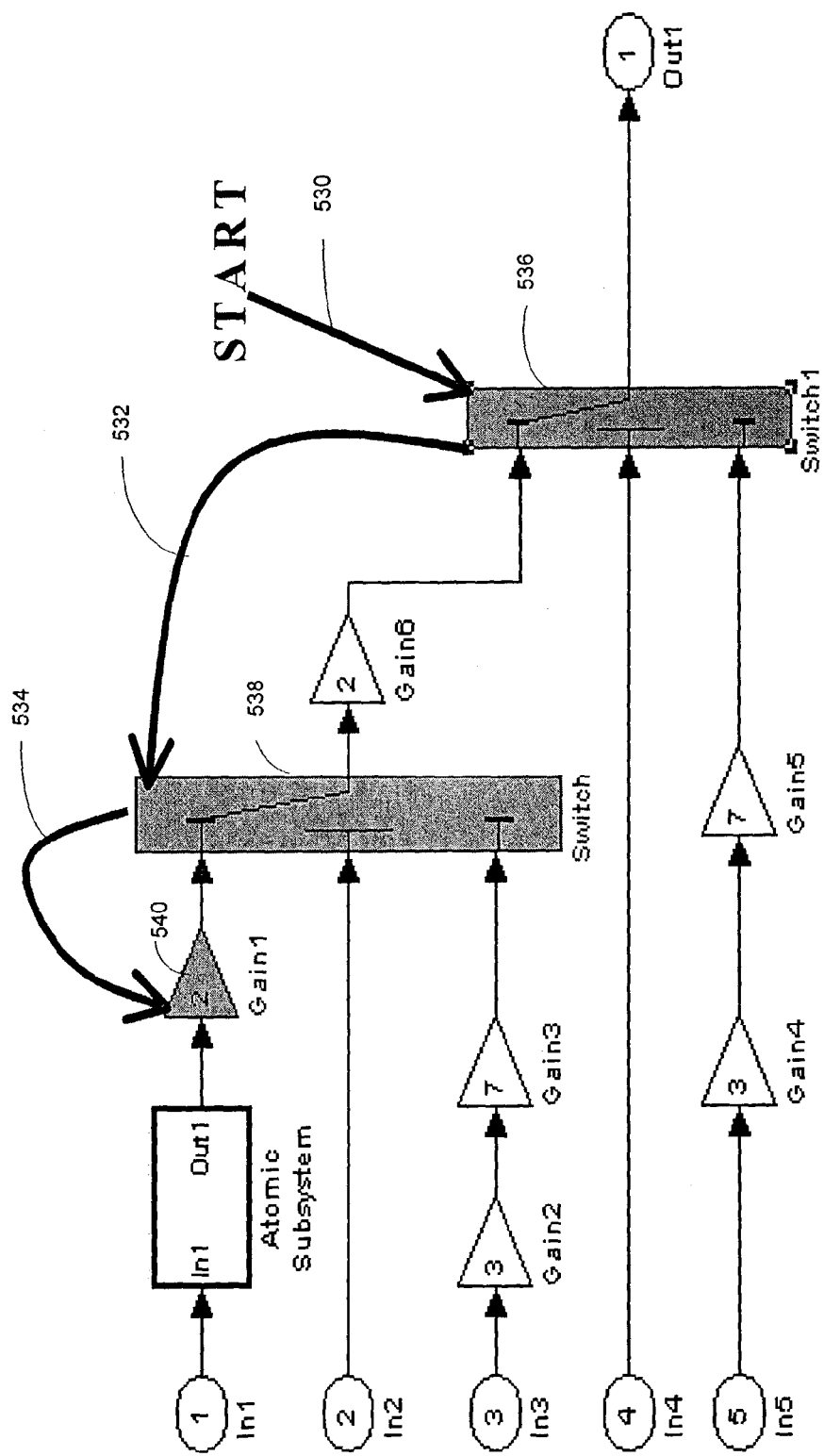
FIG. 25 depicts the illustrative embodiment of the present invention showing graphical annotations depicting the execution order of blocks in a diagram.

Allowing users to trace the EC hierarchy of a block using graphical highlighting (say through use of special colored highlighting) of blocks (as a whole or in parts) and/or lines. This idea, which is illustrated in FIG. 25, is especially useful in the context of block diagram debugging. The figure shows the calling hierarchy 530, 532 and 534 (which may be depicted with blue lines on screen displays) with the individual blocks 530, 538 and 540 (which may be depicted by highlighting in yellow on screen displays).

The use of EC's to enable modularity and the efficient execution of block diagrams may be seen by examining two earlier examples and analyzing them in greater detail to show how the Generated Code looks for the block diagram before and after the use of Execution Contexts. The code illustrates how execution efficiency is realized in the generated code as well.

CE-SUBSYSTEM EXAMPLE 3 REVISITED

FIG. 19 depicted a CE-subsystem. Immediately below are the Sorted Lists for the block diagram before and after the use of Execution Contexts for the block diagram. Note that when ECs are used, the Sorted List corresponding to the Triggered Subsystem 330 contains both blocks Gain1 334 and Gain2 336.

| Sorted List without use of ECs | Sorted List with use of ECs |
|---|---|
| Integrator | Integrator |
| Pulse Generator | Pulse Generator |
| Sine Wave | Sine Wave |
| Gain1 | Triggered Subsystem |
| Triggered Subsystem | Gain1 |
| Gain2 | <Contents of Trig Subsys> |
| Out1 | Gain2 |
| Out2 | Out1 |
|  | Out2 |

The generated code for the same model before and after the use of ECs is also shown.

Generated Code when ECs not Used:

```
/* Gain Block: '<Root>/Gain1'
 * Gain value: rtP.Gain1_Gain
 */
 rtb_Gain1 = rtB.Sine_Wave * rtP.Gain1_Gain;
/* Triggered Subsystem */
 if (trigEvent && rtmIsSampleHit(rtM_cec_example_1_cg, 1, tid)) {
   /* Gain Block: '<S1>/GainInTrigSS'
    * Gain value: rtP.GainInTrigSS_Gain
    */
   rtB.GainInTrigSS = rtb_Gain1 * rtP.GainInTrigSS_Gain;
 }
/* Gain Block: '<Root>/Gain2'
 * Gain value: rtP.Gain2_Gain
 */
 rtb_Gain2 = rtB.GainInTrigSS * rtP.Gain2_Gain;
```

Generated Code when ECs Used:

```
/* Triggered Subsystem */
if (trigEvent && rtmIsSampleHit(rtM_cec_example_1_cg, 1, tid)) {
   /* Gain: '<Root>/Gain2' incorporates:
    * Gain: '<S1>/GainInTrigSS'
    * Gain: '<Root>/Gain1'
    * Regarding '<Root>/Gain2':
    * Gain value: rtP.Gain2_Gain
    * Regarding '<S1>/GainInTrigSS':
    * Gain value: rtP.GainInTrigSS_Gain
    * Regarding '<Root>/Gain1':
    * Gain value: rtP.Gain1_Gain
    */
   rtB.Gain2 = ((rtB.Sine_Wave_Sample_Time_con *
     rtP.Gain1_Gain) * rtP.GainInTrigSS_Gain) * rtP.Gain2_Gain;
}
```

Note that when ECs are used, the code for the Gain blocks is inside the code that is generated for the Triggered Subsystem. This makes the code more efficient in that the code for the Gain blocks is exercised only when the Triggered Subsystem's code is called (i.e., when the Triggered Subsystem is executed.

CONDITIONAL INPUT EXAMPLE REVISITED

FIG. 15 showed a block diagram with conditional inputs 262 and 266 for a switch 260. The Sorted Lists for the block diagram before and after the use of Execution Contexts for the block diagram may be shown as follows:

Sorted List without Use of ECs
  In1
  Gain
  Abs
  Gain1
  Sum1
  In2
  In3
  Log
  Gain2
  Reciprocal
  Gain3
  Sum2
  Switch
  Out1

Sorted List with Use of ECs
  In1
  In2
  In3
  Switch
    Sorted List for Input Port 1:
    Gain
    Abs
    Gain1
    Sum1
    Sorted List for Input Port 2:
    Log
    Gain2
    Reciprocal
    Gain3
    Sum2
    Switch Body
  Out1

It should be noted that when ECs are used, the Sorted List is hierarchical and the Switch block has two Sorted Lists, one each for the ECs it sets up on its input ports. The generated code for the same model before and after the use of ECs may be shown as follows:

Generated Code when ECs not Used:

```
/* Gain Block: '<Root>/Gain'
 * Gain value: rtP.Gain_Gain
 */
 rtb_temp1 = rtU.In1 * rtP.Gain_Gain;
/* Abs Block: '<Root>/Abs' */
 rtb_temp2 = fabs(rtU.In1);
/* Gain Block: '<Root>/Gain1'
 * Gain value: rtP.Gain1_Gain
 */
 rtb_temp2 *= rtP.Gain1_Gain;
/* Sum Block: '<Root>/Sum1' */
 rtb_temp1 = rtb_temp1 + rtb_temp2;
/* Math Block: '<Root>/Log'
 * Op: log10
 */
if (rtU.In3 <= 0.0) {
   rtb_temp2 = rtMinusInf;
} else {
   rtb_temp2 = log10(rtU.In3);
}
/* Gain Block: '<Root>/Gain2'
 * Gain value: rtP.Gain2_Gain
 */
 rtb_temp2 *= rtP.Gain2_Gain;
/* Math Block: '<Root>/Reciprocal'
 * Op: reciprocal
 */
 rtb_temp0 = 1.0/(rtU.In3);
/* Gain Block: '<Root>/Gain3'
 * Gain value: rtP.Gain3_Gain
 */
 rtb_temp0 *= rtP.Gain3_Gain;
```

-continued

```
/* Sum Block: '<Root>/Sum2' */
rtb_temp2 = rtb_temp2 + rtb_temp0;
/* Switch Block: '<Root>/Switch' */
if (rtU.In2 >= rtP.Switch_Threshold) {
    rtb_temp1 = rtb_temp1;
} else {
    rtb_temp1 = rtb_temp2;
}
/* Outport Block: '<Root>/Out1' */
rtY.Out1 = rtb_temp1;
```

Generated Code when ECs Used:

```
/* Switch Block: '<Root>/Switch' */
if (rtU.In2 >= rtP.Switch_Threshold) {
    /* Abs Block: '<Root>/Abs' */
    rtb_temp4 = fabs(rtU.In1);
    /* Gain Block: '<Root>/Gain1'
     * Gain value: rtP.Gain1_Gain
     */
    rtb_temp4 *= rtP.Gain1_Gain;
    /* Gain Block: '<Root>/Gain'
     * Gain value: rtP.Gain_Gain
     */
    rtb_Gain = rtU.In1 * rtP.Gain_Gain;
    /* Sum Block: '<Root>/Sum1' */
    rtb_Sum1 = rtb_Gain + rtb_temp4;
    rtb_Switch = rtb_Sum1;
} else {
    /* Math Block: '<Root>/Reciprocal'
     * Op: reciprocal
     */
    rtb_temp5 = 1.0/(rtU.In3);
    /* Gain Block: '<Root>/Gain3'
     * Gain value: rtP.Gain3_Gain
     */
    rtb_temp5 *= rtP.Gain3_Gain;
    /* Math Block: '<Root>/Log'
     * Op: log10
     */
    if (rtU.In3 <= 0.0) {
        rtb_temp6 = rtMinusInf;
    } else {
        rtb_temp6 = log10(rtU.In3);
    }
    /* Gain Block: '<Root>/Gain2'
     * Gain value: rtP.Gain2_Gain
     */
    rtb_temp6 *= rtP.Gain2_Gain;
    /* Sum Block: '<Root>/Sum2' */
    rtb_Sum2 = rtb_temp6 + rtb_temp5;
    rtb_Switch = rtb_Sum2;
}
/* Outport Block: '<Root>/Out1' */
rtY.Out1 = rtb_Switch;
```

It should be noted that when ECs are used, the code for the conditional statement for the Switch block encompasses the blocks that inherit ECs from the Switch's input ports. This makes the code more efficient in that the code for the blocks connected to one of the Switch block's conditional inputs execute only when that input is used to generate the Switch block's output.

There are many other types of block-diagram models of computation used in analysis and design of complex systems that are within the scope of the present invention. While the examples contained herein have focused primarily on time-based block diagrams, the invention also extends to other block diagram models of computation where the notion of conditional execution is defined. One such model is data-flow block diagrams. In data-flow block diagrams (as defined by Dennis and earlier authors) the availability of data drives the execution of blocks and the lines represent data dependencies between blocks. The notion of conditional execution has also been around for a number of years in data-flow block diagrams. In applying Execution Contexts to data-flow block diagrams one realizes modularity and execution efficiency gains.

Figure 26A:
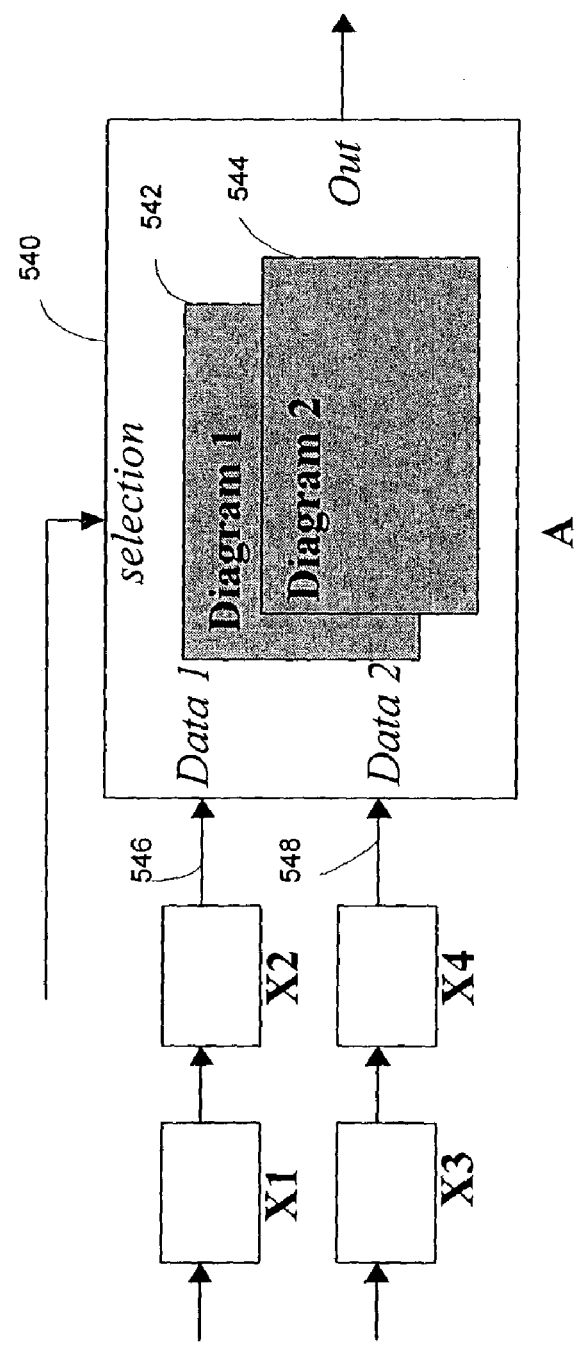
FIG. 26A depicts a data flow block diagram.

To illustrate this idea, consider the data-flow block diagram shown FIG. 26A. Note that in this block diagram, block A 540 contains two block-diagrams 542 and 544 one of which executes based on the integer value at the selection port. Block A 540 has two other data inputs 546 and 548, only one of which is relevant for each of the block-diagrams it contains. That is, block diagram1 542 within block A 540 uses the data from the data1 input 546 and the block diagram2 uses data from the data2 input 548. In traditional data flow simulations, data values must be available at the data1 input 546 and the data2 input 548 in order for block A 540 to begin executing. This is illustrated by the code generated for block A 540:

```
Data1 = <Result of executing X1, X2>
Data2 = <Result of executing X3, X4>
if (selection == 1) {
    Out = f(Data1);
} else {
    Out = g(Data2);
}
```

This code is inefficient because it explicitly computes two data values when only one will be used in one of the block diagrams inside A. While one can overcome this inefficiency in prior art by placing all blocks feeding A in one of the block diagrams inside A, this breaks modularity in system design.

Figure 26B:
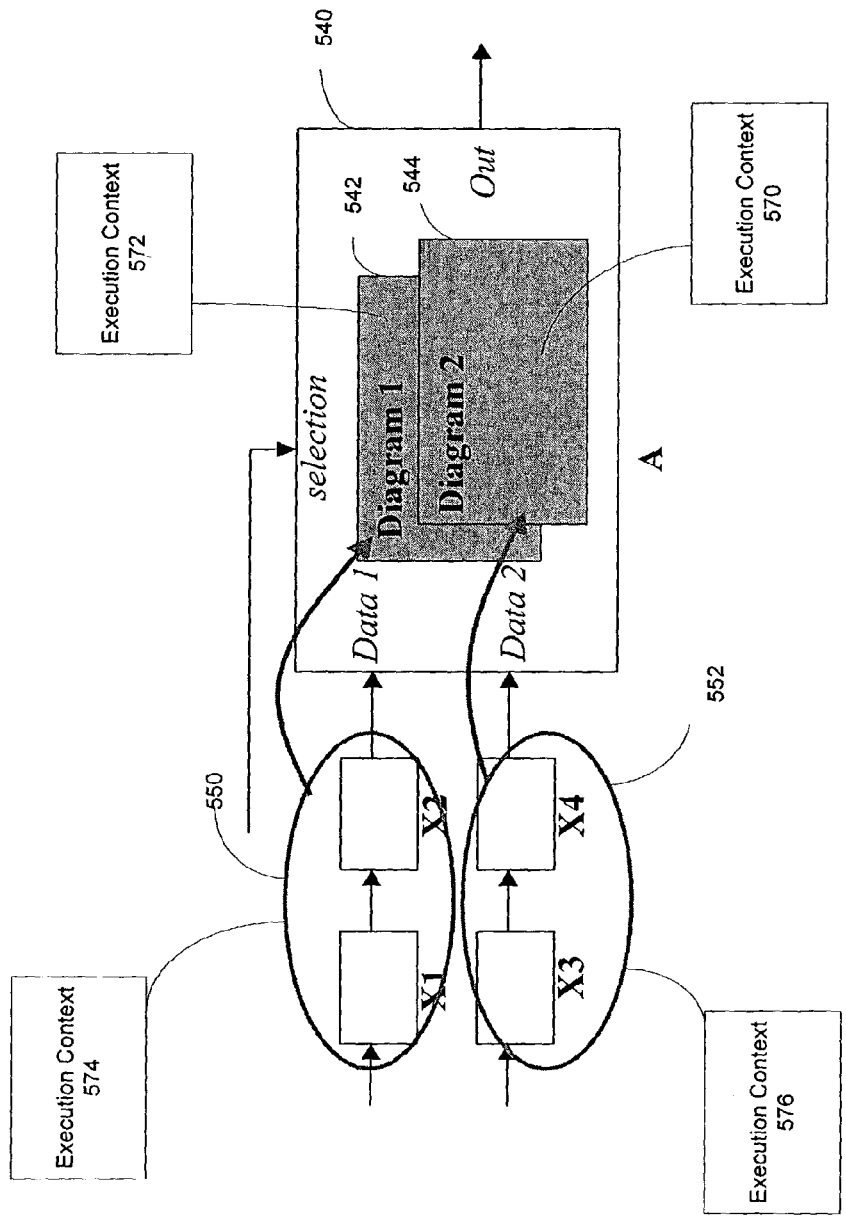
FIG. 26B depicts the diagram of FIG. 26A with associated Execution Contexts.

To achieve modularity and efficiency in data flow block diagrams, Execution Contexts can be used as shown in FIG. 26B. Each block diagram 542 and 544 inside block A 540 creates an Execution Context 570 and 572. Furthermore, blocks connected to the inputs of A 550 have an Execution Context 574 which inherit the Execution Context from A. This means that the group of blocks 550 connected to the data1 input 546 inherit the context for the first block diagram 572. The Execution Context 552 for the group of blocks 552 connected to the data2 input 548 inherit the Execution Context 570 for the second block diagram 544. This results in efficient execution as illustrated by the code generated for block A 540 when using Execution Contexts;

```
if (selection == 1) {
    Data1 = <Result of executing X1, X2>
    Out = f(Data1);
} else {
    Data2 = <Result of executing X3, X4>
    Out = g(Data2);
}
```

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention.

We claim:

1. A method comprising:
creating an execution context that is represented as a data structure associated with a first element in a time-based block diagram, the execution context containing information used to control execution of the first element based on a satisfaction of a pre-condition;
specifying that a second element in the time-based block diagram is an inheriting element that inherits the execution context associated with the first element;
propagating, during compilation of the time-based block diagram, the execution context from the first element to the inheriting second element, the propagating associating the execution context associated with the first element with the inheriting second element, the propagating including:
creating a hierarchical data structure for the block diagram that includes a reference to the first element,
identifying whether the inheriting second element can inherit the execution context via its input ports and/or output ports, and
grouping a reference to the inheriting second element with the reference to the first element in the hierarchical data structure for the block diagram;
determining an order of execution for the time-based block diagram using the execution context associated with the inheriting element;
executing the first element and the inheriting element according to the order of execution after the satisfaction of the pre-condition.

2. The method of claim 1 wherein the execution context associated with the inheriting element is associated with a conditional input port of a block in the time-based block diagram, the input port connected to at least one element external to the block, the input port reading signal values after the satisfaction of the specified pre-condition.

3. The method of claim 1 wherein the execution context associated with the inheriting element is associated with a non-virtual subsystem in the time-based block diagram, the execution context allowing the non-virtual subsystem to execute after the satisfaction of the pre-condition.

4. The method of claim 1 wherein the execution context associated with the inheriting element is associated with a conditional output port of a block in the time-based block diagram, the conditional output port connected to at least one element external to the block, the conditional output port generating signal values after a satisfaction of a specified pre-condition.

5. The method of claim 4 wherein the execution context associated with the first element is associated with a port.

6. The method of claim 1 wherein the execution context associated with the first element is associated with a non-virtual subsystem in the time-based block diagram.

7. The method of claim 6 further comprising:
identifying a union of elements that includes elements in the non-virtual subsystem and non-subsystem elements that inherited the execution context;
determining an order of execution for the union of elements; and
executing the union of elements according to the order of execution after the satisfaction of the pre-condition.

8. The method of claim 6 wherein the execution context information from the execution context associated with the first element is inherited by an execution context associated with a second non-virtual subsystem in the time-based block diagram, the execution context allowing the second non-virtual subsystem to execute after the satisfaction of the pre-condition.

9. The method of claim 1 further comprising:
identifying a strongly-connected section of the time-based block diagram;
propagating the execution context information associated with the first element to an execution context associated with the strongly-connected section; and
executing the strongly-connected section based on the satisfaction of the pre-condition.

10. The method of claim 1 further comprising:
determining prior to execution of the time-based block diagram that at least one section connected to at least one of a conditional input port of a block, a conditional output port of a block, or non-virtual subsystem in the time-based block diagram remains inactive during execution of the time-based block diagram; and
omitting processing of the at least one inactive section during execution of the time-based block diagram.

11. The method of claim 1 further comprising:
generating programming code, the code reflecting the pre-condition referenced by the execution context associated with the first element.

12. The method of claim 11 wherein the generated program code excludes at least one inactive section of the time-based block diagram, the inactive sections being determined prior to execution of the generated program code.

13. The method of claim 1 wherein a view of the time-based block diagram graphically depicts one or more inheriting elements associated with one or more execution contexts that inherit execution context information from the execution context associated with the first element.

14. The method of claim 13 wherein the view graphically depicts an order of execution of the one or more inheriting elements.

15. A system comprising:
means for creating an execution context that is represented as a data structure associated with a first element in a time-based block diagram, the execution context containing information used to control execution of the first element based on the satisfaction of a pre-condition;
means for specifying that a second element in the time-based block diagram is an inheriting element that inherits the execution context associated with the first element;
means for propagating, during compilation of the time-based block diagram, the execution context from the first element to the inheriting second element, the propagating associating the execution context associated with the first element with the inheriting second element, the propagating including:
creating a hierarchical data structure for the block diagram that includes a reference to the first element,
identifying whether the inheriting second element can inherit the execution context via its input ports and/or output ports, and
grouping a reference to the inheriting second element with the reference to the first element in the hierarchical data structure for the block diagram;
means for determining an order of execution for the time-based block diagram using the execution context associated with the inheriting element;

means for executing the first element and the inheriting element according to the order of execution after the satisfaction of the pre-condition.

16. A physical medium for use with a computing device, the medium holding computer-executable instructions for propagating execution context information, the medium comprising one or more instructions that when executed cause the computing device to:

create an execution context that is represented as a data structure associated with a first element in a time-based block diagram, the execution context containing information used to control execution of the first element based on a satisfaction of a pre-condition;

specify that a second element in the time based block diagram is an inheriting element that inherits the execution context associated with the first element;

propagate, during compilation of the time-based block diagram, the execution context from the first element to the inheriting second element, the propagating associating the execution context associated with the first element with the inheriting second element, the propagation including:

creating a hierarchical data structure for the block diagram that includes a reference to the first element, identifying whether the inheriting second element can inherit the execution context via its input ports and/or output ports, and grouping a reference to the inheriting second element with the reference to the first element in the hierarchical data structure for the block diagram;

determine an order of execution for the time-based block diagram using the execution context associated with the inheriting element; and execute the first element and the inheriting element according to the order of execution after the satisfaction of the pre-condition.

17. The medium of claim 16 wherein the execution context associated with the inheriting element is associated with a conditional input port of a block in the time-based block diagram, the input port connected to at least one element external to the block, the input port reading signal values after the satisfaction of the specified pre-condition.

18. The medium of claim 16 wherein the execution context associated with the inheriting element is associated with a non-virtual subsystem in the time-based block diagram, the execution context allowing the non-virtual subsystem to execute after the satisfaction of the pre-condition.

19. The medium of claim 16 wherein the execution context associated with the inheriting element is associated with a conditional output port of a block in the time-based block diagram, the conditional output port connected to at least one element external to the block, the conditional output port generating signal values after a satisfaction of a specified pre-condition.

20. The medium of claim 19 wherein the execution context associated with the first element is associated with a port.

21. The medium of claim 16 wherein the execution context associated with the first element is associated with a non-virtual subsystem in the time-based block diagram.

22. The medium of claim 21, wherein the medium further holds one or more instructions that when executed cause the computing device to:

identify a union of elements that includes elements in the non-virtual subsystem and non-subsystem elements that inherited the execution context;

determine an order of execution for the union of elements; and execute the union of elements according to the order of execution after the satisfaction of the pre-condition.

23. The medium of claim 21 wherein the execution context information from the execution context associated with the first element is inherited by an execution context associated with a second non-virtual subsystem in the time-based block diagram, the execution context allowing the second non-virtual subsystem to execute after the satisfaction of the pre-condition.

24. The medium of claim 16, wherein the medium further holds one or more instructions that when executed cause the computing device to:

identifying strongly-connected sections of the time-based block diagram;

propagating the execution context information associated with the first element to an execution context associated with the strongly-connected section; and executing the strongly-connected section based on the satisfaction of the pre-condition.

25. The medium of claim 16 wherein the medium further holds one or more instructions that when executed cause the computing device to:

determining prior to execution of the time-based block diagram that at least one section connected to at least one of a conditional input port of a block, a conditional output port of a block, or non-virtual subsystem in the time-based block diagram remains inactive during execution of the time-based block diagram; and omitting processing of the at least one inactive section during execution of the time-based block diagram.

26. The medium of claim 16 wherein the medium further holds one or more instructions that when executed cause the computing device to:

generating programming code, the code reflecting the pre-condition referenced by the execution context associated with the first element.

27. The medium of claim 26 wherein the generated program code excludes at least one inactive section of the time-based block diagram, the inactive sections being programmatically determined prior to execution of the generated program code.

28. The medium of claim 16 wherein a view of the time-based block diagram graphically depicts one or more inheriting elements associated with one or more execution contexts that inherit execution context information from the execution context associated with the first element.

29. The medium of claim 28 wherein the view graphically depicts an order of execution of the one or more inheriting elements.

30. The method of claim 1 wherein the specifying that specifies the second element as an inheriting element identifies lines connected to the inheriting element by which the execution context information may be inherited.

31. The method of claim 1 wherein the first element is a parent element and the second element is a child element.

32. The medium of claim 16 wherein the specification of the second element as an inheriting element identifies lines connected to the inheriting element by which the execution context information may be inherited.

33. The method of claim 16 wherein the first element is a parent element and the second element is a child element.

34. The system of claim 15 wherein the specifying that specifies the second element as an inheriting element identifies lines connected to the inheriting element by which the execution context information may be inherited.

35. The system of claim 15 wherein the first element is a parent element and the second element is a child element.

* * * * *